US012595351B2

(12) United States Patent
DeBruin et al.

(10) Patent No.: US 12,595,351 B2
(45) **Date of Patent: *Apr. 7, 2026**

(54) CHEMICAL RECYCLING OF MATERIALS COMPRISING WASTE AUTOMOTIVE CARPET

(71) Applicant: Eastman Chemical Company, Kingsport, TN (US)

(72) Inventors: Bruce Roger DeBruin, Gray, TN (US); Michael Paul Ekart, Kingsport, TN (US); David Milton Lange, Blountville, TN (US); Aaron Nathaniel Edens, Weber City, VA (US); Anne-Martine Sherbeck Jackson, Jonesborough, TN (US); Nathan Mitchell West, Kingsport, TN (US); Zhufang Liu, Kingsport, TN (US)

(73) Assignee: Eastman Chemical Company, Kingsport, TN (US)

( * ) Notice: Subject to any disclaimer, the term of this patent is extended or adjusted under 35 U.S.C. 154(b) by 621 days.

This patent is subject to a terminal disclaimer.

(21) Appl. No.: 17/996,010

(22) PCT Filed: Apr. 13, 2021

(86) PCT No.: PCT/US2021/026970

§ 371 (c)(1),
(2) Date: Oct. 12, 2022

(87) PCT Pub. No.: WO2021/211501

PCT Pub. Date: Oct. 21, 2021

(65) Prior Publication Data

US 2023/0183443 A1 Jun. 15, 2023

Related U.S. Application Data

(60) Provisional application No. 63/008,928, filed on Apr. 13, 2020.

(51) Int. Cl.
*C08J 11/24* (2006.01)

(52) U.S. Cl.
CPC ............ *C08J 11/24* (2013.01); *C08J 2367/02* (2013.01)

(58) Field of Classification Search
USPC ............................................................ 521/48
See application file for complete search history.

(56) References Cited

U.S. PATENT DOCUMENTS

| | | | |
|---|---|---|---|
| 3,321,510 | A | 5/1967 | Lotz et al. |
| 3,544,291 | A | 12/1970 | Schlinger et al. |
| 3,776,945 | A | 12/1973 | Ligorati et al. |
| 4,578,502 | A | 3/1986 | Cudmore |
| 4,609,680 | A | 9/1986 | Fujita et al. |
| 5,051,528 | A | 9/1991 | Naujokas et al. |
| 5,236,959 | A | 8/1993 | Oakley et al. |
| 5,298,530 | A | 3/1994 | Gamble et al. |
| 5,364,985 | A | 11/1994 | Hermanson |
| 5,413,681 | A | 5/1995 | Tustin et al. |
| 5,414,022 | A | 5/1995 | Toot, Jr. et al. |
| 5,432,203 | A | 7/1995 | DeBruin et al. |
| 5,498,749 | A | 3/1996 | Heise et al. |
| 5,532,404 | A | 7/1996 | Gallagher |
| 5,576,456 | A | 11/1996 | Gamble et al. |
| 5,710,315 | A | 1/1998 | Gallagher et al. |
| 5,712,410 | A | 1/1998 | Naujokas |
| 5,750,776 | A | 5/1998 | Harvie |
| 5,912,275 | A | 6/1999 | Hall et al. |
| 6,197,838 | B1 | 3/2001 | Schwartz, Jr. et al. |
| 6,262,294 | B1 | 7/2001 | Sako et al. |
| 6,706,843 | B1 † | 3/2004 | Ishihara |
| 7,078,440 | B2 | 7/2006 | Ishihara et al. |
| 7,910,657 | B2 † | 3/2011 | Cohoon-Brister |
| 10,465,058 | B2 † | 11/2019 | Layman |
| 10,544,276 | B2 | 1/2020 | Charra et al. |
| 10,808,096 | B2 | 10/2020 | Essaddam et al. |
| 2002/0011303 | A1 | 1/2002 | Eastman |
| 2005/0004390 | A1 | 1/2005 | Nakao et al. |
| 2006/0074136 | A1 | 4/2006 | Smith et al. |
| 2006/0074186 | A1 † | 4/2006 | Smith |

(Continued)

FOREIGN PATENT DOCUMENTS

| | | | |
|---|---|---|---|
| BR | 102013023494 | A2 † | 8/2015 |
| CN | 104 284 925 | B | 5/2017 |

(Continued)

OTHER PUBLICATIONS

Non-Final Office Communication received in U.S. Appl. No. 17/996,004 dated Aug. 21, 2025.
Non-Final Office Communication received in U.S. Appl. No. 17/996,000 dated Aug. 6, 2025.
Non-Final Office Communication received in U.S. Appl. No. 17/996,002 dated Aug. 6, 2025.
Non-Final Office Communication received in U.S. Appl. No. 17/996,003 dated Aug. 6, 2025.
Ji, Zhang; Comprehensive Utilization of Mineral Resources, p. 199, Metallurgical Industry Press, Sep. 2013 (original language).

(Continued)

*Primary Examiner* — Terressa Boykin
(74) *Attorney, Agent, or Firm* — Tammye L. Taylor Polk

(57) ABSTRACT

Chemical recycling facilities for processing mixed waste plastic are provided herein. Such facilities have the capability of processing mixed plastic waste streams and utilize a variety of recycling facilities, such as, for example, solvolysis facility, a pyrolysis facility, a cracker facility, a partial oxidation gasification facility, an energy recovery facility, and a solidification facility. Streams from one or more of these individual facilities may be used as feed to one or more of the other facilities, thereby maximizing recovery of valuable chemical components and minimizing unusable waste streams.

16 Claims, 12 Drawing Sheets

(56) References Cited

U.S. PATENT DOCUMENTS

| | | | |
|---|---|---|---|
| 2009/0099388 | A1 † | 4/2009 | Al Ghatta |
| 2009/0287017 | A1 † | 11/2009 | Al Ghatta |
| 2010/0133088 | A1 | 6/2010 | Hajek et al. |
| 2016/0229985 | A1 | 8/2016 | Phillips et al. |
| 2016/0326335 | A1 | 11/2016 | Schmidt et al. |
| 2017/0008826 | A1 | 1/2017 | Essaddam |
| 2019/0161595 | A1 | 5/2019 | Charra et al. |
| 2020/0190280 | A1 | 6/2020 | Lin et al. |
| 2021/0277202 | A1 | 9/2021 | Wilhelmus et al. |
| 2022/0127416 | A1 † | 4/2022 | Thinon et al. |

FOREIGN PATENT DOCUMENTS

| | | | |
|---|---|---|---|
| CN | 110 483 279 | A | 11/2019 |
| CN | 110590551 | A | 12/2019 |
| CN | 214000492 | U † | 8/2021 |
| DE | 19843112 | C2 | 7/2002 |
| DE | 102014220330 | A1 † | 4/2016 |
| EP | 0 604 897 | A1 | 7/1994 |
| EP | 0 662 466 | A1 | 7/1995 |
| EP | 1 234 812 | A1 | 8/2002 |
| JP | H07 197041 | A | 8/1995 |
| JP | 2000 169623 | A | 6/2000 |
| JP | 3218293 | B2 | 10/2001 |
| JP | 2001 347543 | A | 12/2001 |
| JP | 2002 086448 | A | 3/2002 |
| JP | 2002 166420 | A | 6/2002 |
| JP | 2002 167469 | A | 6/2002 |
| JP | 2003 119316 | A | 4/2003 |
| JP | 2004 231855 | A | 8/2004 |
| JP | 2004 284022 | A | 10/2004 |
| JP | 2006 316095 | A | 11/2006 |
| JP | 2011 136467 | A | 7/2011 |
| JP | 2011 150949 | A | 8/2011 |
| JP | 2004 217871 | A | 2/2013 |
| KR | 2002 0041829 | A | 6/2002 |
| KR | 2011 0080260 | A | 7/2011 |
| KR | 2012 0133036 | A | 12/2012 |
| KR | 2015 0053502 | A | 5/2015 |
| WO | WO2001 032597 | A1 | 5/2001 |
| WO | WO2009 010435 | A2 | 1/2009 |
| WO | WO2013 025186 | A1 | 2/2013 |
| WO | WO2013 066559 | A2 | 5/2013 |
| WO | WO2016 123558 | A1 | 8/2013 |
| WO | WO2016123558 | A * | 8/2016 |
| WO | WO2019 174656 | A1 | 9/2019 |
| WO | WO2021 126661 | A1 | 6/2021 |

OTHER PUBLICATIONS

Jianyang et al; Powder Engineering, p. 250, Wuhan: Wuhan University of Technology Press, Dec. 2008 (original language).

PETnology.com; "PET fines from recycled bottles: a valuable raw material"; published online in 2016.

Zhijun, Ren; Solid Waste Treatment, Disposal, and Resource Recovery Technology, p. 96, Harbin Institute of Technology Press, Apr. 2010 (original language).

Co-pending U.S. Appl. No. 18/697,882, filed Apr. 2, 2024; Anne-Martine Sherbeck Jackson et al.

Co-pending U.S. Appl. No. 17/996,004, filed Oct. 12, 2022; Bruce Roger DeBruin et al.; now U.S. Publication No. 2023-0220181.

Restriction Requirement Office Communication received in U.S. Appl. No. 17/996,004 dated May 28, 2025.

Co-pending U.S. Appl. No. 17/996,000, filed Oct. 12, 2022; Bruce Roger DeBruin et al.; now U.S. Publication No. 2023-0227622.

Co-pending U.S. Appl. No. 17/996,002, filed Oct. 12, 2022; Bruce Roger DeBruin et al.; now U.S. Publication No. 2023-0183439.

Co-pending U.S. Appl. No. 17/966,003, filed Oct. 12, 2022; Bruce Roger DeBruin et al.; now U.S. Publication No. 2023-0183441.

Co-pending U.S. Appl. No. 17/996,006, filed Oct. 12, 2022; Bruce Roger DeBruin et al.; now U.S. Publication No. 2023-0220180.

Non-Final Office Communication received in U.S. Appl. No. 17/996,006 dated Jun. 3, 2025.

Co-pending U.S. Appl. No. 17/996,008, filed Oct. 12, 2022; Bruce Roger DeBruin et al., now U.S. Publication No. 2023-0212370.

Non-Final Office Communication received in U.S. Appl. No. 17/996,008 dated Jun. 2, 2025.

Notification of Transmittal of the International Search Report and the Written Opinion of the International Searching Authority, or the Declaration date of mailing Jan. 27, 2023 received in International Application No. PCT/US2022/045598.

Notification of Transmittal of the International Search Report and the Written Opinion of the International Searching Authority, or the Declaration date of mailing Sep. 10, 2021, received in International Application No. PCT/US2021/026967.

Notification of Transmittal of the International Search Report and the Written Opinion of the International Searching Authority, or the Declaration date of mailing Sep. 3, 2021, received in International Application No. PCT/US2021/026975.

Notification of Transmittal of the International Search Report and the Written Opinion of the International Searching Authority, or the Declaration date of mailing Sep. 3, 2021, received in International Application No. PCT/US2021/026978.

Notification of Transmittal of the International Search Report and the Written Opinion of the International Searching Authority, or the Declaration date of mailing Aug. 27, 2021, received in International Application No. PCT/US2021/026981.

Notification of Transmittal of the International Search Report and the Written Opinion of the International Searching Authority, or the Declaration date of mailing Sep. 9, 2021, received in International Application No. PCT/US2021/026985.

Notification of Transmittal of the International Search Report and the Written Opinion of the International Searching Authority, or the Declaration date of mailing Sep. 16, 2021, received in International Application No. PCT/US2021/026963.

Notification of Transmittal of the International Search Report and the Written Opinion of the International Searching Authority, or the Declaration date of mailing Sep. 23, 2021, received in International Application No. PCT/US2021/026970.

Anonymous, "Going Full Circle", Recycling Today; Mar. 14, 2019, Retrieved from the internet: URL: https://www.recyclingtoday.com/article/eastman-pet-chemical-recycling solution/ retrieved on Dec. 20, 2022.

Anonymous, "Process-Circular Polymers by Ascend", Dec. 20, 2019, pp. 1-7; Retrieved from the internet URL: http://circularpolymers.com/process/ retrieved on Dec. 20, 2022.

Biermann, Lars et al.; "Development of a continuous PET depolymerization process as a basis for a back-to-monomer recycling method", Green Processing and Synthesis, vol. 10, No. 1; Jan. 1, 2021; pp. 361-373.

Brouwer, M.T. et al.; Predictive Model for the Dutch post-consumer plastic packaging recycling system and implications for the circular economy Waste Management; 2018; pp. 71,62-85; Wageningen University & Research.

Chen, Feifei et al.; Kinetics of Glycolysis of Poly(ethylene terephthalate) Under Microwave Irradiation; Journal Applied Polymer Science; 2012; 7 pages.

Damayanti and Ho-Shing Wu; "Strategic Possibility Routes of Recycled PET", Polymers, vol. 13, No. 9, Jan. 2, 2021, p. 1475.

De Marco , I. et al.; "Pyrolysis of the rejects of a waste packaging separation and classification plant"; Journal of Analytical and Applied Pyrolysis, vol. 85, No. 1-2; 2009; pp. 384-391.

Jiqiong, Liu et al.; "Principles and Technology of Iron and Steel Metallurgy"; Metallurgical Industry Press; May 1992; p. 186 (original language).

Karunadasa, Kohobhange S.P. et al.; "Thermal decomposition of calcium carbonate (calcite polymorph) as examined by in-situ high-temperature X-ray powder diffraction", Journal of Physics and Chemistry of Solids, vol. 134, May 20, 2019; pp. 21-28.

Lopez, A. et al.; "Pyrolysis of municipal plastic wastes: Influence of raw material composition"; Waste Management, vol. 30, No. 4; 2010; pp. 620-627.

(56) References Cited

OTHER PUBLICATIONS

Lopez-Fonseca, R. et al.; Kinetics of catalytic glycolysis of PET wastes with sodium carbonate; Chemical Engineering Journal, 168; 2011, pp. 312-320.

Third-Party Submission under 37 CFR 1.290 and Concise Description of Relevance dated Dec. 8, 2023 received in U.S. Appl. No. 17/996,004.

Third-Party Submission under 37 CFR 1.290 and Concise Description of Relevance dated Jan. 9, 2024 received in U.S. Appl. No. 17/996,004.

Third-Party Submission under 37 CFR 1.290 and Concise Description of Relevance dated Jan. 16, 2024 received in U.S. Appl. No. 17/996,000.

Third-Party Submission under 37 CFR 1.290 and Concise Description of Relevance dated Dec. 7, 2023 received in U.S. Appl. No. 17/996,002.

Third-Party Submission under 37 CFR 1.290 and Concise Description of Relevance dated Dec. 7, 2023 received in U.S. Appl. No. 17/996,003.

Third-Party Submission under 37 CFR 1.290 and Concise Description of Relevance dated Jan. 9, 2024 received in U.S. Appl. No. 17/996,006.

Third-Party Submission under 37 CFR 1.290 and Concise Description of Relevance dated Jan. 18, 2024 received in U.S. Appl. No. 17/996,008.

Third-Party Submission under 37 CFR 1.290 and Concise Description of Relevance dated Feb. 29, 2024 received in U.S. Appl. No. 17/996,008.

Third Party Submission under 37 CFR 1.290 and Concise Description of Relevance dated Sep. 19, 2023; received in U.S. Appl. No. 17/759,457. 1 of 2.

Third Party Submission under 37 CFR 1.290 and Concise Description of Relevance dated May 28, 2024 received in U.S. Appl. No. 17/996,000.

Tindall, G. William et al.; "Preparation of Polyester Samples for Composition Analysis"; Anal. Chem., vol. 63; 1991; pp. 1251-1256.

Tullo, Alex; "Eastman will build a PET recycling facility", Chemistry & Engineering News, vol. 8, pp. 10-10; Feb. 8, 2021; Retrieved from the internet URL: https://pubs.acs.org/doi/10.1021/cen-09905-buscon2.

Wang, En-Hong et al.; "Research Progress on the Recycling of Waste PET Bottles and the Engineering Plasticization Modification of its Recycled Materials"; Chemical Propellants and Polymer Materials, vol. 8, No. 1; Aug. 2010; pp. 28-33 (original language.

Yang, Jiang et al.; "Powder Engineering"; Wuhan: Wuhan University of Technology Press, Dec. 2008 (original language).

Brouwer, M. T., Thoden van Velzen, E. U., Augustinus, A., Soethoudt, H., De Meester, S., &Ragaert, K. (2018). Predictive model for the Dutch post-consumer plastic packaging recycling system and implications for the circular economy. Waste Management, 71, 62-85. DOI: 10.1016/j.wasman.2017.10.034.†

* cited by examiner
† cited by third party

Product Efficiency$_A$ = Product weight of A/feed rate of A
Contamination Efficiency$_B$ = Product weight of B/feed rate of B
Contamination Efficiency$_C$ = Product weight of C/feed rate of C
Product Purity$_A$ = Product weight of A/(product rate of A+B+C)

Contamination Efficiency$_A$ = weight of A/feed rate of A
Product Efficiency$_B$ = Product weight of B/feed rate of B
Product Efficiency$_C$ = Product weight of C/feed rate of C
Product Purity = (Product weight of B+C)/(product rate of A+B+C)

Per Unit Time

Per Unit Time

Feed

Light

Medium

Heavy

A

B

C

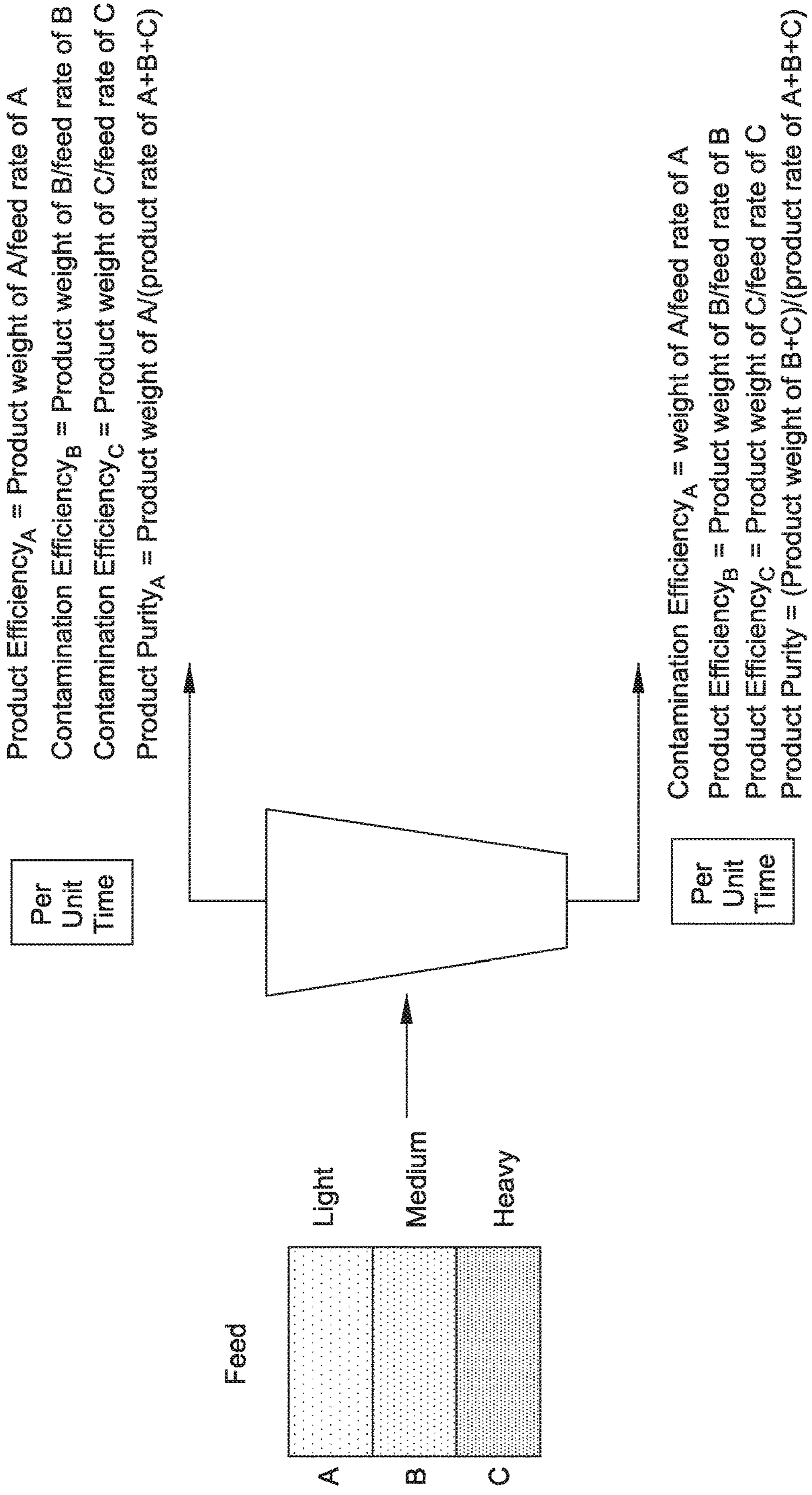

*Fig. 10.*

CHEMICAL RECYCLING OF MATERIALS COMPRISING WASTE AUTOMOTIVE CARPET

CROSS-REFERENCE TO RELATED APPLICATION(S)

This application is a national stage filing under 35 USC § 371 of International Application Number PCT/US2021/026970, filed on Apr. 13, 2021 which claims the benefit of the filing date to U.S. Provisional Application No. 63/008,928, filed on Apr. 13, 2020, the entire disclosures of which are incorporated by reference herein.

BACKGROUND

Waste materials, especially non-biodegradable waste materials, can negatively impact the environment when disposed of in landfills after a single use. Thus, from an environmental standpoint, it is desirable to recycle as much waste material as possible. However, there still exist streams of low value waste that are nearly impossible or economically unfeasible to recycle with conventional recycling technologies. In addition, some conventional recycling processes produce waste streams that are themselves not economically feasible to recover or recycle, resulting in additional waste streams that must be disposed of or otherwise handled.

Automotive carpet is one example of a material that would be desirable to recycle, both after its pre-consumer (waste from production) and post-consumer (used carpet from automobiles) use. Although automotive carpet includes high percentages of recyclable material (e.g., polyethylene terephthalate), it also includes additives such as fillers and adhesives and other plastics such as polyolefins, which make it difficult to recycle by conventional processes. As a result, waste automotive carpet is usually disposed of after a single use in a conventional landfill. It would be desirable to find a method and system for recycling waste automotive carpet that recovers valuable chemical components, while being both energy- and cost-efficient.

SUMMARY

In one aspect, the present technology concerns a method for processing waste polymer materials, the method comprising introducing a feed stream comprising waste automotive carpet material into a solvolysis facility.

In one aspect, the present technology concerns a method for processing waste polymeric materials, the method comprising: (a) introducing a feed comprising waste automotive carpet material and waste plastic into a solvolysis facility; and (b) subjecting the feed to solvolysis to provide a principal terephthalyl, a principal glycol, and at least one coproduct stream.

In one aspect, the present technology concerns a method for processing waste polymeric materials, the method comprising: (a) introducing a feed stream comprising waste automotive carpet into a solvolysis facility; (b) subjecting the feed stream to solvolysis to form a principal terephthalyl, a principal glycol, and at least one coproduct stream; and (c) introducing at least a portion of the coproduct stream into at least one of the following chemical processing facilities or zones: (i) a partial oxidation gasification facility; (ii) a pyrolysis facility; (iii) a cracking facility; (iv) an energy recovery facility; and (v) a liquification zone.

In one aspect, the present technology concerns a solvolysis composition comprising waste plastic comprising polyethylene terephthalate (PET), polyolefin (PO), and polyvinyl chloride (PVC); waste automotive carpet material; and a solvolysis solvent in which the waste plastic and the waste automotive carpet material are at least partially dissolved.

BRIEF DESCRIPTION OF THE DRAWINGS

FIG. 10 is a schematic diagram illustrating various definitions of the term "separation efficiency" as used herein.

DETAILED DESCRIPTION

We have discovered a system and method for recycling waste automotive carpet on a commercial scale. More particularly, we have discovered a method for chemically recycling automotive carpet using solvolysis, breaking down waste polyethylene terephthalate in the carpet into valuable streams of monomers, while effectively handing the adhesives, fillers, and other coproducts.

When a numerical sequence is indicated, it is to be understood that each number is modified the same as the first number or last number in the numerical sequence or in the sentence, e.g. each number is "at least," or "up to" or "not more than" as the case may be; and each number is in an "or" relationship. For example, "at least 10, 20, 30, 40, 50, 75 wt. % . . . " means the same as "at least 10 wt. %, or at least 20 wt. %, or at least 30 wt. %, or at least 40 wt. %, or at least 50 wt. %, or at least 75 wt. %," etc.; and "not more than 90 wt. %, 85, 70, 60 . . . " means the same as "not more than 90 wt. %, or not more than 85 wt. %, or not more than 70 wt. % . . . " etc.; and "at least 1%, 2%, 3%, 4%, 5%, 6%, 7%, 8%, 9% or 10% by weight . . . " means the same as "at least 1 wt. %, or at least 2 wt. %, or at least 3 wt. % . . . " etc.; and "at least 5, 10, 15, 20 and/or not more than 99, 95, 90 weight percent" means the same as "at least 5 wt. %, or at least 10 wt. %, or at least 15 wt. % or at least 20 wt. % and/or not more than 99 wt. %, or not more than 95 wt. %, or not more than 90 weight percent . . . " etc.

All concentrations or amounts are by weight unless otherwise stated.

Overall Chemical Recycling Facility

Figure 1A:
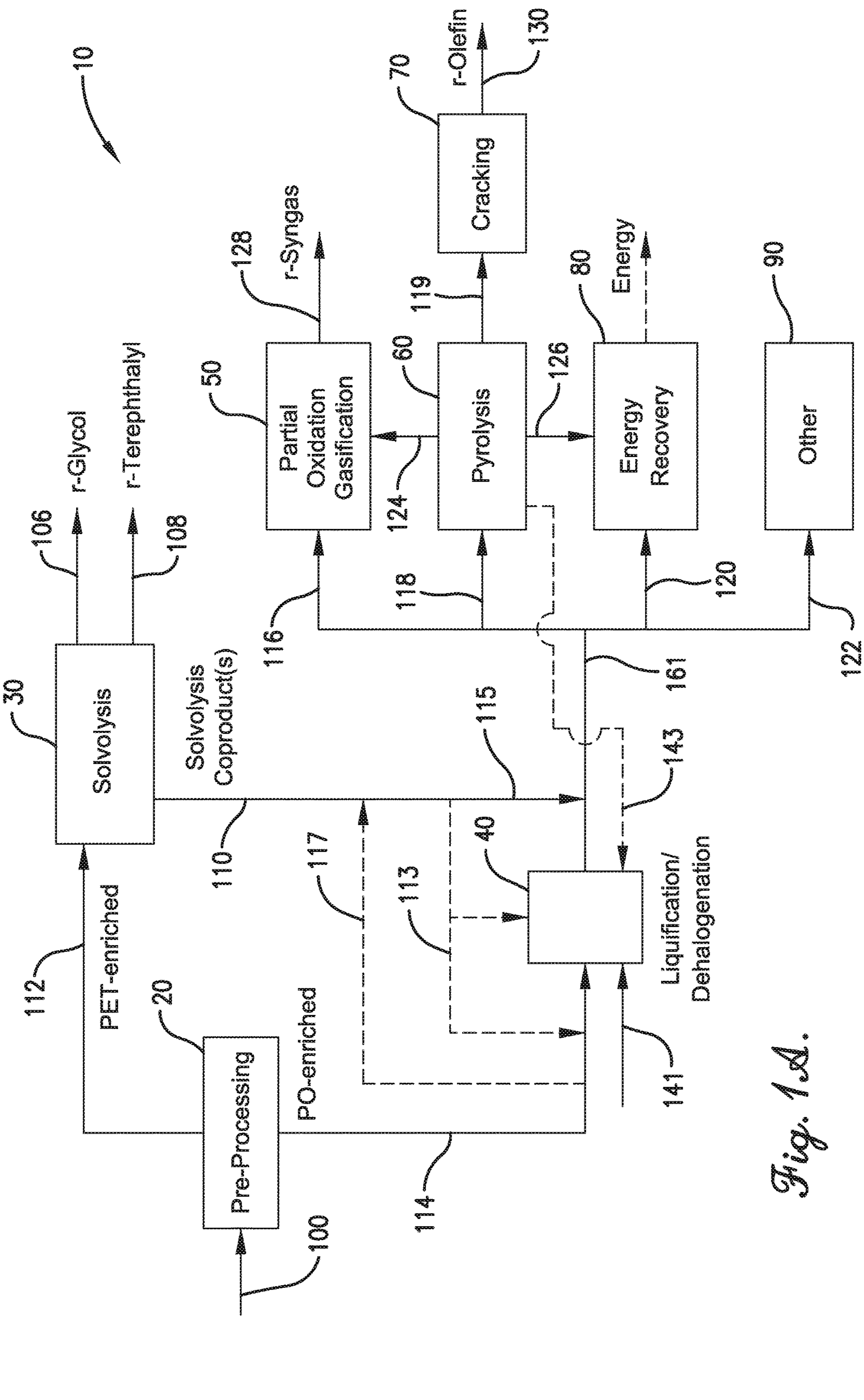
FIG. 1*a* is a block flow diagram illustrating the main steps of a process and facility for chemically recycling waste plastic according to embodiments of the present technology.
Figure 1B:
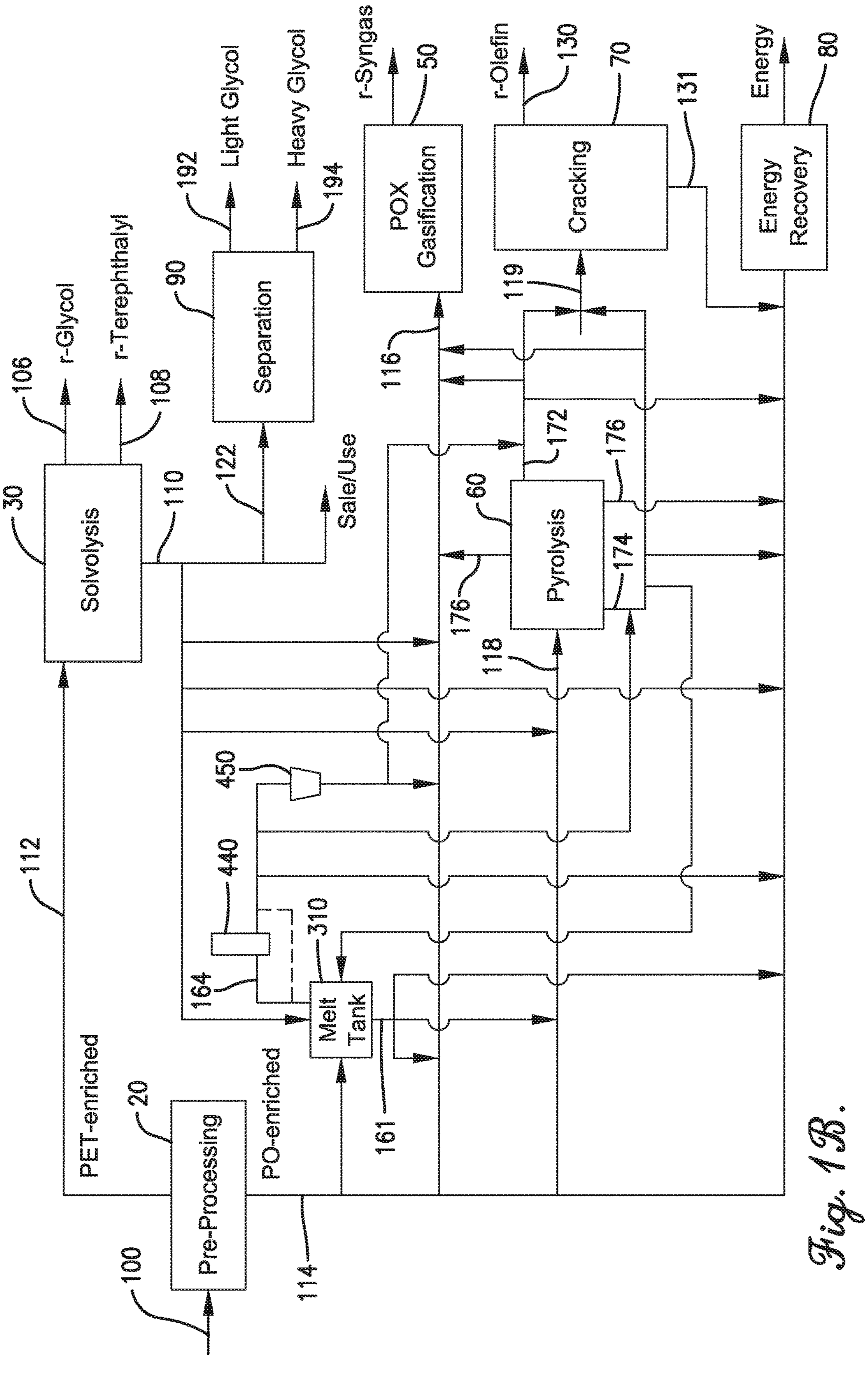
FIG. 1*b* is a block flow diagram illustrating the main steps of a process and facility for chemically recycling waste plastic, particularly illustrating additional aspects of a process/facility as shown in FIG. 1*a;*

Turning now to FIG. 1*a*, the main steps of a process and facility for chemically recycling waste plastic are shown. FIG. 1*b* provides a more specific embodiment of a chemical recycling facility as shown in FIG. 1*a*. It should be understood that FIGS. 1*a* and 1*b* depict single exemplary embodiments of the present technology. Certain features depicted in FIGS. 1*a* and 1 *b* may be omitted and/or additional features described elsewhere herein may be added to the system depicted in FIGS. 1*a* and 1 *b*.

As shown in FIGS. 1*a* and 1 *b*, these steps generally include a pre-processing step/facility 20, and at least one (or at least two or more) of a solvolysis step/facility 30, a partial oxidation (POX) gasification step/facility 50, a pyrolysis step/facility 60, a cracking step/facility 70, and an energy recovery step/facility 80. Optionally, in an embodiment or in combination with any embodiment mentioned herein, these steps may also include one or more other steps, such as, direct sale or use, landfilling, separation (as shown in FIG. 1*b*), and solidification, one or more of which is represented in FIG. 1*a* by block 90. Although shown as including all of these steps or facilities, it should be understood that chemical recycling processes and facilities according to an embodiment or in combination with any embodiment mentioned herein of the present technology can include at least two, three, four, five, or all of these facilities in various combinations for the chemical recycling of plastic waste and, in particular, mixed plastic waste. Chemical recycling processes and facilities as described herein may be used to convert waste plastic to recycle content products or chemical intermediates used to form a variety of end use materials. The waste plastic fed to the chemical recycling facility/process can be mixed plastic waste (MPW), pre-sorted waste plastic, and/or pre-processed waste plastic.

As used herein, the term "chemical recycling" refers to a waste plastic recycling process that includes a step of chemically converting waste plastic polymers into lower molecular weight polymers, oligomers, monomers, and/or non-polymeric molecules (e.g., hydrogen and carbon monoxide) that are useful by themselves and/or are useful as feedstocks to another chemical production process or processes. A "chemical recycling facility," is a facility for producing a recycle content product via chemical recycling of waste plastic. As used herein, the terms "recycle content" and "r-content" mean being or comprising a composition that is directly and/or indirectly derived from waste plastic.

As used herein, the term "directly derived" 'means having at least one physical component originating from waste plastic, while "indirectly derived" means having an assigned recycle content that i) is attributable to waste plastic, but ii) that is not based on having a physical component originating from waste plastic.

Chemical recycling facilities are not mechanical recycling facilities. As used herein, the terms "mechanical recycling" and "physical recycling" refer to a recycling process that includes a step of melting waste plastic and forming the molten plastic into a new intermediate product (e.g., pellets or sheets) and/or a new end product (e.g., bottles). Generally, mechanical recycling does not substantially change the chemical structure of the plastic being recycled. In one embodiment or in combination with any of the mentioned embodiments, the chemical recycling facilities described herein may be configured to receive and process waste streams from a mechanical recycling facility and/or that are not typically processable by a mechanical recycling facility.

Although described herein as being part of a single chemical recycling facility, it should be understood that one or more of the preprocessing facility 20, the solvolysis facility 30, the pyrolysis facility 60, the cracking facility 70, the partial oxidation (POX) gasification facility 50, and the energy recovery facility 80, or any of the other facility 90 such as solidification or separation, may be located in a different geographical location and/or be operated by a different commercial entity. Each of the preprocessing facility 20, the solvolysis facility 30, the pyrolysis facility 60, the cracking facility 70, the partial oxidation (POX) gasification facility 50, the energy recovery facility 80, or any other facility 90*s* may be operated by the same entity, while, in other cases, one or more of the preprocessing facility 20, the solvolysis facility 30, the pyrolysis facility 60, the cracking facility 70, the partial oxidation (POX) gasification facility 50, a solidification facility, the energy recovery facility 80, and one or more other facility 90 such as separation or solidification, may be operated by a different commercial entity.

In an embodiment or in combination with any embodiment mentioned herein, the chemical recycling facility 10 may be a commercial-scale facility capable of processing significant volumes of mixed plastic waste. As used herein, the term "commercial scale facility" refers to a facility having an average annual feed rate of at least 500 pounds per hour, averaged over one year. The average feed rate to the chemical recycling facility (or to any one of the preprocessing facility 20, the solvolysis facility 30, the pyrolysis facility 60, the cracking facility 70, the POX gasification facility 50, the energy recovery facility 80, and any other facility 90) can be at least 750, at least 1,000, at least 1,500, at least 2,000, at least 2,500, at least 3,000, at least 3,500, at least 4,000, at least 4,500, at least 5,000, at least 5,500, at least 6,000, at least 6,500, at least 7,500, at least 10,000, at least 12,500, at least 15,000, at least 17,500, at least 20,000, at least 22,500, at least 25,000, at least 27,500, at least 30,000 or at least 32,500 pounds per hour and/or not more than 1,000,000, not more than 750,000, not more than 500,000, not more than 450,000, not more than 400,000, not more than 350,000, not more than 300,000, not more than 250,000, not more than 200,000, not more than 150,000, not more than 100,000, not more than 75,000, not more than 50,000, or not more than 40,000 pounds per hour. When a facility includes two or more feed streams, the average annual feed rate is determined based on the combined weight of the feed streams.

Additionally, it should be understood that each of the preprocessing facility 20, the solvolysis facility 30, the pyrolysis facility 60, the cracking facility 70, the POX gasification facility 50, the energy recovery facility 80, and any other facility 90 may include multiple units operating in series or parallel. For example, the pyrolysis facility 60 may include multiple pyrolysis reactors/units operating in parallel and each receiving a feed comprising waste plastic. When a facility is made up of multiple individual units, the average annual feed rate to the facility is calculated as the sum of the average annual feed rates to all of the common types of units within that facility.

Additionally, in an embodiment or in combination with any embodiment mentioned herein, the chemical recycling facility 10 (or any one of the preprocessing facility 20, the solvolysis facility 30, the pyrolysis facility 60, the cracking facility 70, the POX gasification facility 50, the energy recovery facility 80, and any other facility 90) may be operated in a continuous manner. Additionally, or in the alternative, at least a portion of the chemical recycling facility 10 (or any of the preprocessing facility 20, the solvolysis facility 30, the pyrolysis facility 60, the cracking facility 70, the POX gasification facility 50, the energy recovery facility 80, and any other facility 90) may be operated in a batch or semi-batch manner. In some cases, the facility may include a plurality of tanks between portions of a single facility or between two or more different facilities to manage inventory and ensure consistent flow rates into each facility or portion thereof.

In addition, two or more of the facilities shown in FIGS. 1*a* and 1 *b* may also be co-located with one another. In an embodiment or in combination with any embodiment mentioned herein, at least two, at least three, at least four, at least five, at least six, or all of the facilities may be co-located. As used herein, the term "co-located" refers to facilities in which at least a portion of the process streams and/or supporting equipment or services are shared between the two facilities. When two or more of the facilities shown in FIGS. 1*a* and 1*b* are co-located, the facilities may meet at least one of the following criteria (i) through (v): (i) the facilities share at least one non-residential utility service; (ii) the facilities share at least one service group; (iii) the facilities are owned and/or operated by parties that share at least one property boundary; (iv) the facilities are connected by at least one conduit configured to carry at least one process material (e.g., solid, liquid and/or gas fed to, used by, or generated in a facility) from one facility to another; and (v) the facilities are within 40, within 35, within 30, within 20, within 15, within 12, within 10, within 8, within 5, within 2, or within 1 mile of one another, measured from their geographical center. At least one, at least two, at least three, at least four, or all of the above statements (i) through (v) may be true.

Regarding (i), examples of suitable utility services include, but are not limited to, steam systems (co-generation and distribution systems), cooling water systems, heat transfer fluid systems, plant or instrument air systems, nitrogen systems, hydrogen systems, non-residential electrical generation and distribution, including distribution above 8000V, non-residential wastewater/sewer systems, storage facilities, transport lines, flare systems, and combinations thereof.

Regarding (ii), examples of service groups and facilities include, but are not limited to, emergency services personnel (fire and/or medical), a third-party vendor, a state or local government oversight group, and combinations thereof. Government oversight groups can include, for example, regulatory or environmental agencies, as well as municipal and taxation agencies at the city, county, and state level.

Regarding (iii), the boundary may be, for example, a fence line, a property line, a gate, or common boundaries with at least one boundary of a third-party owned land or facility.

Regarding (iv), the conduit may be a fluid conduit that carries a gas, a liquid, a solid/liquid mixture (e.g., slurry), a solid/gas mixture (e.g., pneumatic conveyance), a solid/liquid/gas mixture, or a solid (e.g., belt conveyance). In some cases, two units may share one or more conduits selected from the above list. Fluid conduits may be used to transport process streams or utilities between the two units. For example, an outlet of one facility (e.g., the solvolysis facility 30) may be fluidly connected via a conduit with an inlet of another facility (e.g., the POX gasification facility 50). In some cases, an interim storage system for the materials being transported within the conduit between the outlet of one facility and the inlet of another facility may be provided. The interim storage system may comprise, for example, one or more tanks, vessels (open or closed), buildings, or containers that are configured to store the material carried by the conduit. In some cases, the interim storage between the outlet of one facility and the inlet of another can be not more than 90, not more than 75, not more than 60, not more than 40, not more than 30, not more than 25, not more than 20, not more than 15, not more than 10, not more than 5, not more than 2 days or not more than 1 day.

Turning again to FIGS. 1*a* and 1 *b*, a stream 100 of waste plastic, which can be mixed plastic waste (MPW), may be introduced into the chemical recycling facility 10. As used herein, the terms "waste plastic" and "plastic waste" refer to used, scrap, and/or discarded plastic materials, such as plastic materials typically sent to a landfill. Other examples of waste plastic (or plastic waste) include used, scrap, and/or discarded plastic materials typically sent to an incinerator. The waste plastic stream 100 fed to the chemical recycling facility 10 may include unprocessed or partially processed waste plastic. As used herein, the term "unprocessed waste plastic" means waste plastic that has not be subjected to any automated or mechanized sorting, washing, or comminuting. Examples of unprocessed waste plastic include waste plastic collected from household curbside plastic recycling bins or shared community plastic recycling containers. As used herein, the term "partially processed waste plastic" means waste plastic that has been subjected to at least one automated or mechanized sorting, washing, or comminuting step or process. Partially processed waste plastics may originate from, for example, municipal recycling facilities (MRFs) or reclaimers. When partially processed waste plastic is provided to the chemical recycling facility 10, one or more preprocessing steps may be skipped. Waste plastic may comprise at least one of post-industrial (or pre-consumer) plastic and/or post-consumer plastic.

As used herein, the terms "mixed plastic waste" and "MPW" refer to a mixture of at least two types of waste plastics including, but not limited to the following plastic types: polyethylene terephthalate (PET), one or more polyolefins (PO), and polyvinylchloride (PVC). In an embodiment or in combination with any embodiment mentioned herein, MPW includes at least two distinct types of plastic, with each type of plastic being present in an amount of at least 1, at least 2, at least 5, at least 10, at least 15, or at least 20 weight percent, based on the total weight of plastic in the MPW.

In an embodiment or in combination with any embodiment mentioned herein, MPW comprises at least 1, at least 2, at least 5, at least 10, at least 15, at least 20, at least 25, at least 30, at least 35, at least 40, at least 45, at least 50, at least 55, at least 60, at least 65, at least 70, at least 75, at least 80, at least 85, at least 90, at least 95, or at least 99 weight percent PET and/or at least 1, at least 2, at least 5, at least 10, at least 15, or at least 20 weight percent PO, based on the total weight of plastic in the MPW. In one embodiment or more embodiments, MPW may also include minor amounts of one or more types of plastic components other than PET and PO (and optionally PVC) that total less than 50, less than 45, less than 40, less than 35, less than 30, less than 25, less than 20, less than 15, less than 10, less than 5, less than 2, or less than 1 weight percent, based on the total weight of plastic in the MPW.

In an embodiment or in combination with any embodiment mentioned herein, the MPW comprises at least 20, at least 25, at least 30, at least 35, at least 40, at least 45, at least 50, at least 55, at least 60, at least 65, at least 70, at least 75, at least 80, at least 85, at least 90, or at least 95 weight percent PET, based on the total weight of the stream. Alternatively, or in addition, the MPW comprises not more than 99.9, not more than 99, not more than 97, not more than 92, not more than 90, not more than 85, not more than 80, not more than 75, not more than 70, not more than 65, not more than 60, not more than 55, not more than 50, not more than 45, not more than 40, not more than 35, not more than 30, not more than 25, not more than 20, not more than 15, not more than 10, or not more than 5 weight percent PET, based on the total weight of the stream.

The MPW stream can include non-PET components in an amount of at least 0.1, at least 0.5, at least 1, at least 2, at least 5, at least 7, at least 10, at least 15, at least 20, at least 25, at least 30, or at least 35 and/or not more than 80, not more than 75, not more than 70, not more than 65, not more than 60, not more than 55, not more than 50, not more than 45, not more than 40, not more than 35, not more than 30, not more than 25, not more than 20, not more than 15, not more than 10, or not more than 7 weight percent, based on the total weight of the stream. Non-PET components can be present in an amount between 0.1 and 50 weight percent, 1 and 20 weight percent, or 2 and 10 weight percent, based on the total weight of the stream. Examples of such non-PET components can include, but are not limited to, ferrous and non-ferrous metals, inerts (such as rocks, glass, sand, etc.), plastic inerts (such as titanium dioxide, silicon dioxide, etc.), olefins, adhesives, compatibilizers, biosludge, cellulosic materials (such as cardboard, paper, etc.), and combinations thereof.

In an embodiment or in combination with any embodiment mentioned herein, all or a portion of the MPW can originate from a municipal source or comprise municipal waste. The municipal waste portion of the MPW can include, for example, PET in an amount of from 45 to 95 weight percent, 50 to 90 weight percent, or 55 to 85 weight percent, based on the total weight of the municipal waste stream (or portion of the stream).

In an embodiment or in combination with any embodiment mentioned herein, all or a portion of the MPW can originate from a municipal recycling facility (MRF) and may include, for example, PET in an amount of from 65 to 99.9 weight percent, 70 to 99 weight percent, or 80 to 97 weight percent, based on the total weight of the stream. The non-PET components in such streams may include, for example, other plastics in an amount of at least 1, at least 2, at least 5, at least 7, or at least 10 weight percent and/or not more than 25, not more than 22, not more than 20, not more than 15, not more than 12, or not more than 10 weight percent, based on the total weight of the stream, or such may be present in an amount in the range of from 1 to 22 weight percent, 2 to 15 weight percent, or 5 to 12 weight percent, based on the total weight of the stream. In an embodiment or in combination with any embodiment mentioned herein, the non-PET components can include other plastics in an amount in the range of from 2 to 35 weight percent, 5 to 30 weight percent, or 10 to 25 weight percent, based on the total weight of the stream, particularly when, for example, the MPW includes colored sorted plastics.

In an embodiment or in combination with any embodiment mentioned herein, all or a portion of the MPW can originate from a reclaimer facility and may include, for example, PET in an amount of from 85 to 99.9 weight percent, 90 to 99.9 weight percent, or 95 to 99 weight percent, based on the total weight of the stream. The non-PET components in such streams may include, for example, other plastics in an amount of at least 1, at least 2, at least 5, at least 7, or at least 10 weight percent and/or not more than 25, not more than 22, not more than 20, not more than 15, not more than 12, or not more than 10 weight percent, based on the total weight of the stream, or such may be present in an amount in the range of from 1 to 22 weight percent, 2 to 15 weight percent, or 5 to 12 weight percent, based on the total weight of the stream.

As used herein, the term "plastic" may include any organic synthetic polymers that are solid at 25° C. and 1 atmosphere of pressure. In an embodiment or in combination with any embodiment mentioned herein, the polymers may have a number average molecular weight (Mn) of at least 75, or at least 100, or at least 125, or at least 150, or at least 300, or at least 500, or at least 1000, or at least 5,000, or at least 10,000, or at least 20,000, or at least 30,000, or at least 50,000 or at least 70,000 or at least 90,000 or at least 100,000 or at least 130,000 Daltons. The weight average molecular weight (Mw) of the polymers can be at least 300, or at least 500, or at least 1000, or at least 5,000, or at least 10,000, or at least 20,000, or at least 30,000 or at least 50,000, or at least 70,000, or at least 90,000, or at least 100,000, or at least 130,000, or at least 150,000, or at least 300,000 Daltons.

Examples of suitable plastics can include, but are not limited to, aromatic and aliphatic polyesters, polyolefins, polyvinyl chloride (PVC), polystyrene, polytetrafluoroethylene, acrylobutadienestyrene (ABS), cellulosics, epoxides, polyamides, phenolic resins, polyacetal, polycarbonates, polyphenylene-based alloys, poly(methyl methacrylate), styrene-containing polymers, polyurethane, vinyl-based polymers, styrene acrylonitrile, thermoplastic elastomers other than tires, and urea containing polymers and melamines.

Examples of polyesters can include those having repeating aromatic or cyclic units such as those containing a repeating terephthalate, isophthalate, or naphthalate units such as PET, modified PET, and PEN, or those containing repeating furanate repeating units. Polyethylene terephthalate (PET) is also an example of a suitable polyester. As used herein, "PET" or "polyethylene terephthalate" refers to a homopolymer of polyethylene terephthalate, or to a polyethylene terephthalate modified with one or more acid and/or glycol modifiers and/or containing residues or moieties of other than ethylene glycol and terephthalic acid, such as isophthalic acid, 1,4-cyclohexanedicarboxylic acid, diethylene glycol, 2,2,4,4-tetramethyl-1,3-cyclobutanediol (TMCD), cyclohexanedimethanol (CHDM), propylene glycol, isosorbide, 1,4-butanediol, 1,3-propane diol, and/or neopentyl glycol (NPG).

Also included within the definition of the terms "PET" and "polyethylene terephthalate" are polyesters having repeating terephthalate units (whether or not they contain repeating ethylene glycol-based units) and one or more residues or moieties of a glycol including, for example, TMCD, CHDM, propylene glycol, or NPG, isosorbide, 1,4-butanediol, 1,3-propane diol, and/or diethylene glycol, or combinations thereof. Examples of polymers with repeat terephthalate units can include, but are not limited to, polypropylene terephthalate, polybutylene terephthalate, and copolyesters thereof. Examples of aliphatic polyesters can include, but are not limited to, polylactic acid (PLA), polyglycolic acid, polycaprolactones, and polyethylene adipates. The polymer may comprise mixed aliphatic-aromatic copolyesters including, for example, mixed terephthalates/adipates.

In an embodiment or in combination with any embodiment mentioned herein, the waste plastic may comprise at least one type of plastic that has repeat terephthalate units with such a plastic being present in an amount of at least 1, at least 2, at least 5, at least 10, at least 15, at least 20, at least 25, or at least 30 and/or not more than 45, not more than 40, not more than 35, not more than 30, not more than 25, not more than 20, not more than 15, not more than 10, not more than 5, or not more than 2 weight percent, based on the total weight of the stream, or it can be present in the range of from 1 to 45 weight percent, 2 to 40 weight percent, or 5 to 40 weight percent, based on the total weight of the stream. Similar amounts of copolyesters having multiple cyclohexane dimethanol moieties, 2,2,4,4-tetramethyl-1,3-cyclobutanediol moieties, or combinations thereof may also be present.

In an embodiment or in combination with any embodiment mentioned herein, the waste plastic may comprise at least one type of plastic that has repeat terephthalate units with such a plastic being present in an amount of at least 30, at least 35, at least 40, at least 45, at least 50, at least 55, at least 60, at least 65, at least 70, at least 75, at least 80, at least 85, or at least 90 and/or not more than 99.9, not more than 99, not more than 97, not more than 95, not more than 90, or not more than 85 weigh percent, based on the total weight of the stream, or it can be present in the range of from 30 to 99.9 weight percent, 50 to 99.9 weight percent, or 75 to 99 weight percent, based on the total weight of the stream.

In an embodiment of in combination with any embodiment mentioned herein, the waste plastic may comprise terephthalate repeat units in an amount of at least 1, at least 5, at least 10, at least 15, at least 20, at least 25, at least 30, at least 35, at least 40, or at least 45 and/or not more than 75, not more than 72, not more than 70, not more than 60, or not more than 65 weight percent, based on the total weight of the plastic in the waste plastic stream, or it may include terephthalate repeat units in an amount in the range of from 1 to 75 weight percent, 5 to 70 weight percent, or 25 to 75 weight percent, based on the total weight of the stream.

Examples of specific polyolefins may include low density polyethylene (LDPE), high density polyethylene (HDPE), atactic polypropylene, isotactic polypropylene, syndiotactic polypropylene, crosslinked polyethylene, amorphous polyolefins, and the copolymers of any one of the aforementioned polyolefins. The waste plastic may include polymers including linear low-density polyethylene (LLDPE), polymethylpentene, polybutene-1, and copolymers thereof. The waste plastic may comprise flashspun high density polyethylene.

The waste plastic may include thermoplastic polymers, thermosetting polymers, or combinations thereof. In an embodiment or in combination with any embodiment mentioned herein, the waste plastic can include at least 0.1, at least 1, at least 2, at least 5, at least 10, at least 15, at least 20, at least 25, or at least 30 and/or not more than 45, not more than 40, not more than 35, not more than 30, not more than 25, not more than 20, not more than 15, not more than 10, not more than 5, or not more than 2 weight percent of one or more thermosetting polymers, based on the total weight of the stream, or it can be present in an amount of 0.1 to 45 weight percent, 1 to 40 weight percent, 2 to 35 weight percent, or 2 to 20 weight percent, based on the total weight of the stream.

Alternatively, or in addition, the waste plastic may include at least 0.1, at least 1, at least 2, at least 5, at least 10, at least 15, at least 20, at least 25, or at least 30 and/or not more than 45, not more than 40, not more than 35, not more than 30, not more than 25, not more than 20, not more than 15, not more than 10, not more than 5, or not more than 2 weight percent of cellulose materials, based on the total weight of the stream, or it can be present in an amount in the range of from 0.1 to 45 weight percent, 1 to 40 weight percent, or 2 to 15 weight percent, based on the total weight of the stream. Examples of cellulose materials may include cellulose acetate, cellulose diacetate, cellulose triacetate, cellulose acetate propionate, cellulose acetate butyrate, as well as regenerated cellulose such as viscose. Additionally, the cellulose materials can include cellulose derivatives having an acyl degree of substitution of less than 3, not more than 2.9, not more than 2.8, not more than 2.7, or not more than 2.6 and/or at least 1.7, at least 1.8, or at least 1.9, or from 1.8 to 2.8, or 1.7 to 2.9, or 1.9 to 2.9.

In an embodiment or in combination with any embodiment mentioned herein, the waste plastic may comprise STYROFOAM or expanded polystyrene.

The waste plastic may originate from one or more of several sources. In an embodiment or in combination with any embodiment mentioned herein, the waste plastic may originate from plastic bottles, diapers, eyeglass frames, films, packaging materials, carpet (residential, commercial, and/or automotive), textiles (clothing and other fabrics) and combinations thereof.

In an embodiment or in combination with any embodiment mentioned herein, the waste plastic (e.g., MPW) fed to the chemical recycling facility may include one or more plastics having or obtained from plastics having a resin ID code numbered 1-7 with the chasing arrow triangle established by the SPI. The waste plastic may include one or more plastics that are not generally mechanically recycled. Such plastics can include, but are not limited to, plastics with the resin ID code 3 (polyvinyl chloride), resin ID code 5 (polypropylene), resin ID code 6 (polystyrene), and/or resin ID code 7 (other). In an embodiment or in combination with any embodiment mentioned herein, plastics having at least 1, at least 2, at least 3, at least 4, or at least 5 of the resin ID codes 3-7 or 3, 5, 6, 7, or a combination thereof may be present in the waste plastic in an amount of at least 0.1, at least 0.5, at least 1, at least 2, at least 3, at least 5, at least 7, at least 10, at least 12, at least 15, at least 20, at least 25, at least 30, at least 35, or at least 40 and/or not more than 90, not more than 85, not more than 80, not more than 75, not more than 70, not more than 65, not more than 60, not more than 55, not more than 50, not more than 45, not more than 40, or not more than 35 weight percent, based on the total weight of all plastics, or it could be in an amount of 0.1 to 90 weight percent, 1 to 75 weight percent, or 2 to 50 weight percent, based on the total weight of plastics.

In an embodiment or in combination with any embodiment mentioned herein, at least 5, at least 10, at least 15, at least 20, at least 25, at least 30, or at least 35 and/or not more than 60, not more than 55, not more than 50, not more than 45, not more than 40, not more than 35, not more than 30, not more than 25, not more than 20, not more than 15, not more than 10, or not more than 5 weight percent of the total plastic components in the waste plastic fed to the chemical recycling facility may comprise plastics not having a resin ID code 3, 5, 6, and/or 7 (e.g., where a plastic is not classified). At least 0.1, at least 0.5, at least 1, at least 2, at least 3, at least 4, at least 5, at least 10, at least 15, at least 20, at least 25, at least 30, or at least 35 and/or not more than 60, not more than 55, not more than 50, not more than 45, not more than 40, not more than 35, not more than 30, not more than 25, not more than 20, not more than 15, not more than 10, or not more than 5 weight percent of the total plastic components in the waste plastic fed to the chemical recycling facility 10 may comprise plastics not having a resin ID code 4-7, or it can be in the range of 0.1 to 60 weight percent, 1 to 55 weight percent, or 2 to 45 weight percent, based on the total weight of plastic components.

In an embodiment or in combination with any embodiment mentioned herein, the waste plastic (e.g., MPW) fed to the chemical recycling facility may comprise plastic that is not classified as resin ID codes 3-7 or ID codes 3, 5, 6, or 7. The total amount of plastic not classified as resin ID code 3-7 or ID codes 3, 5, 6, or 7 plastics in the waste plastic can be at least 0.1, at least 0.5, at least 1, at least 2, at least 3, at least 4, at least 5, at least 10, at least 15, at least 20, at least 25, at least 30, at least 35, at least 40, at least 45, at least 50, at least 55, at least 60, at least 65, at least 70, or at least 75 and/or not more than 95, not more than 90, not more than 85, not more than 80, not more than 75, not more than 70, not more than 65, not more than 60, not more than 55, not more than 50, not more than 45, not more than 40, or not more than 35 weight percent, based on the total weight of plastic in the waste plastic stream, or it can be in the range of from 0.1 to 95 weight percent, 0.5 to 90 weight percent, or 1 to 80 weight percent, based on the total weight of plastic in the waste plastic stream.

In one embodiment or in combination with any of the mentioned embodiments, the MPW comprises plastics having or obtained from plastics having at least 30, at least 35, at least 40, at least 45, at least 50, at least 55, at least 60, at least 65, at least 70, at least 75, at least 80, at least 85, at least 90, at least 95, or at least 99 weight percent of at least one, at least two, at least three, or at least four different kinds of resin ID codes.

In one embodiment or in combination with any of the mentioned embodiments, the MPW comprises multi-component polymers. As used herein, the term "multi-component polymers" refers to articles and/or particulates comprising at least one synthetic or natural polymer combined with, attached to, or otherwise physically and/or chemically associated with at least one other polymer and/or non-polymer solid. The polymer can be a synthetic polymer or plastic, such as PET, olefins, and/or nylons. The non-polymer solid can be a metal, such as aluminum, or other non-plastic solids as described herein. The multi-component polymers can include metalized plastics.

In one embodiment or in combination with any of the mentioned embodiments, the MPW comprises multi-component plastics in the form of multi-layer polymers. As used herein, the term "multi-layer polymers" refers to multi-component polymers comprising PET and at least one other polymer and/or non-polymer solid physically and/or chemically associated together in two or more physically distinct layers. A polymer or plastic is considered a multi-layered polymer even though a transition zone may exist between two layers, such as may be present in adhesively adhered layers or co-extruded layers. An adhesive between two layers is not deemed to be a layer. The multi-layer polymers may comprise a layer comprising PET and a one or more additional layers at least one of which is a synthetic or natural polymer that is different from PET, or a polymer which has no ethylene terephthalate repeating units, or a polymer which has no alkylene terephthalate repeating units (a "non-PET polymer layer"), or other non-polymer solid.

Examples of non-PET polymer layers include nylons, polylactic acid, polyolefins, polycarbonates, ethylene vinyl alcohol, polyvinyl alcohol, and/or other plastics or plastic films associated with PET-containing articles and/or particulates, and natural polymers such as whey proteins. The multi-layer polymers may include metal layers, such as aluminum, provided that at least one additional polymer layer is present other than the PET layer. The layers may be adhered with adhesive bonding or other means, physically adjacent (i.e., articles pressed against the film), tackified (i.e., the plastics heated and stuck together), co-extruded plastic films, or otherwise attached to the PET-containing articles. The multi-layer polymers may comprise PET films associated with articles containing other plastics in the same or similar manner. The MPW may comprise multi-component polymers in the form of PET and at least one other plastic, such as polyolefins (e.g., polypropylene) and/or other synthetic or natural polymers, combined in a single physical phase. For example, the MPW comprises a heterogenous mixture comprising a compatibilizer, PET, and at least one other synthetic or natural polymer plastic (e.g., non-PET plastic) combined in a single physical phase. As used herein, the term "compatibilizer" refers to an agent capable of combining at least two otherwise immiscible polymers together in a physical mixture (i.e., blend).

In one embodiment or in combination with any of the mentioned embodiments, the MPW comprises not more than 20, not more than 10, not more than 5, not more than 2, not more than 1, or not more than 0.1 weight percent nylons, on a dry plastic basis. In one embodiment or in combination with any of the mentioned embodiments, the MPW comprises from 0.01 to 20, from 0.05 to 10, from 0.1 to 5, or from 1 to 2 weight percent nylons, on a dry plastic basis.

In one embodiment or in combination with any of the mentioned embodiments, the MPW comprises not more than 40, not more than 20, not more than 10, not more than 5, not more than 2, or not more than 1 weight percent multi-component plastics, on a dry plastic basis. In one embodiment or in combination with any of the mentioned embodiments, the MPW comprises from 0.1 to 40, from 1 to 20, or from 2 to 10 weight percent multi-component plastics, on a dry plastic basis. In one embodiment or in combination with any of the mentioned embodiments, the MPW comprises not more than 40, not more than 20, not more than 10, not more than 5, not more than 2, or not more than 1 weight percent multi-layer plastics, on a dry plastic basis. In one embodiment or in combination with any of the mentioned embodiments, the MPW comprises from 0.1 to 40, from 1 to 20, or from 2 to 10 weight percent multi-layer plastics, on a dry plastic basis.

In one embodiment or in combination with any of the mentioned embodiments, the MPW feedstock to the chemical recycling facility 10 in stream 100 comprises not more than 20, not more than 15, not more than 12, not more than 10, not more than 8, not more than 6, not more than 5, not more than 4, not more than 3, not more than 2, or not more than 1 weight percent of biowaste materials, with the total weight of the MPW feedstock taken as 100 weight percent on a dry basis. The MPW feedstock comprises from 0.01 to 20, from 0.1 to 10, from 0.2 to 5, or from 0.5 to 1 weight percent of biowaste materials, with the total weight of the MPW feedstock taken as 100 weight percent on a dry basis. As used herein, the term "biowaste" refers to material derived from living organisms or of organic origin. Exemplary biowaste materials include, but are not limited to, cotton, wood, saw dust, food scraps, animals and animal parts, plants and plant parts, and manure.

In one embodiment or in combination with any of the mentioned embodiments, the MPW feedstock comprises not more than 20, not more than 15, not more than 12, not more than 10, not more than 8, not more than 6, not more than 5, not more than 4, not more than 3, not more than 2, or not more than 1 weight percent of manufactured cellulose products, with the total weight of the MPW feedstock taken as 100 weight percent on a dry basis. The MPW feedstock comprises from 0.01 to 20, from 0.1 to 10, from 0.2 to 5, or from 0.5 to 1 weight percent of manufactured cellulose products, with the total weight of the MPW feedstock taken as 100 weight percent on a dry basis. As used herein, the term "manufactured cellulose products" refers to nonnatural (i.e., manmade or machine-made) articles, and scraps thereof, comprising cellulosic fibers. Exemplary manufactured cellulose products include, but are not limited to, paper and cardboard.

In an embodiment or in combination with any embodiment mentioned herein, the waste plastic (e.g., MPW) fed to the chemical recycling facility can include at least 0.001, at least 0.01, at least 0.05, at least 0.1, or at least 0.25 weight percent and/or not more than 10, not more than 5, not more than 4, not more than 3, not more than 2, not more than 1, not more than 0.75, or not more than 0.5 weight percent of polyvinyl chloride (PVC) based on the total weight of plastics in the waste plastic feed.

Additionally, or in the alternative, the waste plastic (e.g., MPW) fed to the chemical recycling facility can include at least 0.1, at least 1, at least 2, at least 4, or at least 6 weight percent and/or not more than 25, not more than 15, not more than 10, not more than 5, or not more than 2.5 weight percent of non-plastic solids. Non-plastic solids may include inert filler materials (e.g., calcium carbonate, hydrous aluminum silicate, alumina trihydrate, calcium sulfate), rocks, glass, and/or additives (e.g., thixotropes, pigments and colorants, fire retardants, suppressants, UV inhibitors & stabilizers, conductive metal or carbon, release agents such as zinc stearate, waxes, and silicones).

In one embodiment or in combination with any of the mentioned embodiments, the MPW may comprise at least 0.01, at least 0.1, at least 0.5, or at least 1 and/or not more than 25, not more than 20, not more than 25, not more than 10, not more than 5, or not more than 2.5 weight percent of liquids, based on the total weight of the MPW stream or composition. The amount of liquids in the MPW can be in the range of from 0.01 to 25 weight percent, from 0.5 to 10 weight percent, or 1 to 5 weight percent, based on the total weight of the MPW stream 100.

In one embodiment or in combination with any of the mentioned embodiments, the MPW may comprise at least 35, at least 40, at least 45, at least 50, or at least 55 and/or not more than 65, not more than 60, not more than 55, not more than 50, not more than 45, not more than 40, or not more than 35 weight percent of liquids, based on the total weight of the waste plastic. The liquids in the waste plastic can be in the range of from 35 to 65 weight percent, 40 to 60 weight percent, or 45 to 55 weight percent, based on the total weight of the waste plastic.

In one embodiment or in combination with any of the mentioned embodiments, the amount of textiles (including textile fibers) in the MPW stream in line 100 can be at least 0.1 weight percent, or at least 0.5 weight percent, or at least 1 weight percent, or at least 2 weight percent, or at least 5 weight percent, or at least 8 weight percent, or at least 10 weight percent, or at least 15 weight percent, or at least 20 weight percent material obtained from textiles or textile fibers, based on the weight of the MPW. The amount of textiles (including textile fibers) in the MPW in stream 100 is not more than 50, not more than 40, not more than 30, not more than 20, not more than 15, not more than 10, not more than 8, not more than 5, not more than 2, not more than 1, not more than 0.5, not more than 0.1, not more than 0.05, not more than 0.01, or not more than 0.001 weight percent, based on the weight of the MPW stream 100. The amount of textiles in the MPW stream 100 can be in the range of from 0.1 to 50 weight percent, 5 to 40 weight percent, or 10 to 30 weight percent, based on the total weight of the MPW stream 100.

The MPW introduced into the chemical recycling facility 10 may contain recycle textiles. Textiles may contain natural and/or synthetic fibers, rovings, yarns, nonwoven webs, cloth, fabrics and products made from or containing any of the aforementioned items. Textiles can be woven, knitted, knotted, stitched, tufted, may include pressed fibers such as in felting, embroidered, laced, crocheted, braided, or may include nonwoven webs and materials. Textiles can include fabrics, and fibers separated from a textile or other product containing fibers, scrap or off-spec fibers or yarns or fabrics, or any other source of loose fibers and yarns. A textile can also include staple fibers, continuous fibers, threads, tow bands, twisted and/or spun yarns, gray fabrics made from yarns, finished fabrics produced by wet processing gray fabrics, and garments made from the finished fabrics or any other fabrics. Textiles include apparels, interior furnishings, and industrial types of textiles. Textiles can include post-industrial textiles (pre-consumer) or post-consumer textiles or both.

In one embodiment or in combination with any of the mentioned embodiments, textiles can include apparel, which can generally be defined as things humans wear or made for the body. Such textiles can include sports coats, suits, trousers and casual or work pants, shirts, socks, sportswear, dresses, intimate apparel, outerwear such as rain jackets, cold temperature jackets and coats, sweaters, protective clothing, uniforms, and accessories such as scarves, hats, and gloves. Examples of textiles in the interior furnishing category include furniture upholstery and slipcovers, carpets and rugs, curtains, bedding such as sheets, pillow covers, duvets, comforters, mattress covers; linens, tablecloths, towels, washcloths, and blankets. Examples of industrial textiles include transportation (auto, airplane, train, bus) seats, floor mats, trunk liners, and headliners; outdoor furniture and cushions, tents, backpacks, luggage, ropes, conveyor belts, calendar roll felts, polishing cloths, rags, soil erosion fabrics and geotextiles, agricultural mats and screens, personal protective equipment, bullet proof vests, medical bandages, sutures, tapes, and the like.

The nonwoven webs that are classified as textiles do not include the category of wet laid nonwoven webs and articles made therefrom. While a variety of articles having the same function can be made from a dry or wet laid process, an article made from a dry laid nonwoven web is classified as a textile. Examples of suitable articles that may be formed from dry laid nonwoven webs as described herein can include those for personal, consumer, industrial, food service, medical, and other end uses. Specific examples can include, but are not limited to, baby wipes, flushable wipes, disposable diapers, training pants, feminine hygiene products such as sanitary napkins and tampons, adult incontinence pads, underwear, or briefs, and pet training pads. Other examples include a variety of different dry or wet wipes, including those for consumer (such as personal care or household) and industrial (such as food service, health care, or specialty) use. Nonwoven webs can also be used as padding for pillows, mattresses, and upholstery, and batting for quilts and comforters. In the medical and industrial fields, nonwoven webs of the present invention may be used for consumer, medical, and industrial face masks, protective clothing, caps, and shoe covers, disposable sheets, surgical gowns, drapes, bandages, and medical dressings.

Additionally, nonwoven webs as described herein may be used for environmental fabrics such as geotextiles and tarps, oil and chemical absorbent pads, as well as building materials such as acoustic or thermal insulation, tents, lumber and soil covers and sheeting. Nonwoven webs may also be used for other consumer end use applications, such as for, carpet backing, packaging for consumer, industrial, and agricultural goods, thermal or acoustic insulation, and in various types of apparel.

The dry laid nonwoven webs as described herein may also be used for a variety of filtration applications, including transportation (e.g., automotive or aeronautical), commercial, residential, industrial, or other specialty applications. Examples can include filter elements for consumer or industrial air or liquid filters (e.g., gasoline, oil, water), including nanofiber webs used for microfiltration, as well as end uses like tea bags, coffee filters, and dryer sheets. Further, nonwoven webs as described herein may be used to form a variety of components for use in automobiles, including, but not limited to, brake pads, trunk liners, carpet tufting, and under padding.

The textiles can include single type or multiple type of natural fibers and/or single type or multiple type of synthetic fibers. Examples of textile fiber combinations include all natural, all synthetic, two or more type of natural fibers, two or more types of synthetic fibers, one type of natural fiber and one type of synthetic fiber, one type of natural fibers and two or more types of synthetic fibers, two or more types of natural fibers and one type of synthetic fibers, and two or more types of natural fibers and two or more types of synthetic fibers.

Natural fibers include those that are plant derived or animal derived. Natural fibers can be cellulosics, hemicellulosics, and lignins. Examples of plant derived natural fibers include hardwood pulp, softwood pulp, and wood flour; and other plant fibers including those in wheat straw, rice straw, abaca, coir, cotton, flax, hemp, jute, bagasse, kapok, papyrus, ramie, rattan, vine, kenaf, abaca, henequen, sisal, soy, cereal straw, bamboo, reeds, esparto grass, bagasse, Sabai grass, milkweed floss fibers, pineapple leaf fibers, switch grass, lignin-containing plants, and the like. Examples of animal derived fibers include wool, silk, mohair, cashmere, goat hair, horsehair, avian fibers, camel hair, angora wool, and alpaca wool.

Synthetic fibers are those fibers that are, at least in part, synthesized or derivatized through chemical reactions, or regenerated, and include, but are not limited to, rayon, viscose, mercerized fibers or other types of regenerated cellulose (conversion of natural cellulose to a soluble cellulosic derivative and subsequent regeneration) such as lyocell (also known as TENCEL™), Cupro, Modal, acetates such as polyvinyl acetate, polyamides including nylon, polyesters such as PET, olefinic polymers such as polypropylene and polyethylene, polycarbonates, poly sulfates, poly sulfones, polyethers such as polyether-urea known as Spandex or elastane, polyacrylates, acrylonitrile copolymers, polyvinylchloride (PVC), polylactic acid, polyglycolic acid, sulfopolyester fibers, and combinations thereof.

Prior to entering the chemical recycling facility, the textiles can be size reduced via chopping, shredding, harrowing, confrication, pulverizing, or cutting to make size reduced textiles. The textiles can also be densified (e.g., pelletized) prior to entering the chemical recycling facility. Examples of processes that densify include extrusion (e.g., into pellets), molding (e.g., into briquettes), and agglomerating (e.g., through externally applied heat, heat generated by frictional forces, or by adding one or more adherents, which can be non-virgin polymers themselves). Alternatively, or in addition, the textiles can be in any of the forms mentioned herein and may be exposed to one or more of the previously mentioned steps in the pre-processing facility 20 prior to being processed in the remaining facilities of the chemical recycling facility 10 shown in FIGS. 1*a* and 1 *b*.

In an embodiment or in combination with any embodiment mentioned herein, polyethylene terephthalate (PET) and one or more polyolefins (PO) in combination make up at least 50, at least 55, at least 60, at least 65, at least 70, at least 75, at least 80, at least 85, at least 90, at least 95, or at least 99 weight percent of the waste plastic (e.g., MPW) fed to the chemical recycling facility in stream 100 of FIGS. 1*a* and 1 *b*. Polyvinylchloride (PVC) can make up at least 0.001, at least 0.01, at least 0.05, at least 0.1, at least 0.25, or at least 0.5 weight percent and/or not more than 10, not more than 5, not more than 4, not more than 3, not more than 2, not more than 1, not more than 0.75, or not more than 0.5 weight percent of the waste plastic, based on the total weight of the plastic in the waste plastic introduced into the chemical recycling facility 10.

In an embodiment or in combination with any embodiment mentioned herein, the waste plastic can comprise at least 5, at least 10, at least 15, at least 20, at least 25, at least 30, at least 35, at least 40, at least 45, at least 50, at least 55, at least 60, at least 65, at least 70, at least 75, at least 80, at least 85, at least 90, or at least 95 weight percent of PET, based on the total weight of the plastic in the waste plastic introduced into the chemical recycling facility 10.

In an embodiment or in combination with any embodiment mentioned herein, the waste plastic can comprise at least 5, at least 10, at least 15, at least 20, at least 25, at least 30, at least 35, at least 40 and/or not more than 95, not more than 90, not more than 85, not more than 80, not more than 75, not more than 70, not more than 65, not more than 60, not more than 55, not more than 50, not more than 45, not more than 40, or not more than 35 weight percent PO, based on the total weight of the plastic in the waste plastic, or PO can be present in an amount in the range of from 5 to 75 weight percent, 10 to 60 weight percent, or 20 to 35 weight percent, based on the total weight of plastic in the waste plastic introduced into the chemical recycling facility 10.

The waste plastic (e.g., MPW) introduced into the chemical recycling facility may be provided from a variety of sources, including, but not limited to, municipal recycling facilities (MRFs) or reclaimer facilities or other mechanical or chemical sorting or separation facilities, manufacturers or mills or commercial production facilities or retailers or dealers or wholesalers in possession of post-industrial and pre-consumer recyclables, directly from households/businesses (i.e., unprocessed recyclables), landfills, collection centers, convenience centers, or on docks or ships or warehouses thereon. In an embodiment or in combination with any embodiment mentioned herein, the source of waste plastic (e.g. MPW) does not include deposit state return facilities, whereby consumers can deposit specific recyclable articles (e.g., plastic containers, bottles, etc.) to receive a monetary refund from the state. In an embodiment or in combination with any embodiment mentioned herein, the source of waste plastic (e.g. MPW) does include deposit state return facilities, whereby consumers can deposit specific recyclable articles (e.g., plastic containers, bottles, etc.) to receive a monetary refund from the state. Such return facilities are commonly found, for example, in grocery stores.

In an embodiment or in combination with any embodiment mentioned herein, the waste plastic may be provided as a waste stream from another processing facility, for example a municipal recycling facility (MRF) or reclaimer facility, or as a plastic-containing mixture comprising waste plastic sorted by a consumer and left for collection at a curbside, or at a central convenience station. In one or more of such embodiments, the waste plastic comprises one or more MRF products or co-products, reclaimer co-products, sorted plastic-containing mixtures, and/or PET-containing waste plastic from a plastic article manufacturing facility comprising at least 10, at least 20, at least 30, at least 40, at least 50, at least 60, at least 70, at least 80, or at least 90 weight percent PET and/or not more than 99.9, not more than 99, not more than 98, not more than 97, not more than 96, or not more than 95 weight percent PET, on a dry plastics basis, or it can be in the range of from 10 to 99.9 weight percent, 20 to 99 weight percent, 30 to 95 weight percent, or 40 to 90 weight percent PET, on a dry plastics basis.

In one or more of such embodiments, the waste plastic comprises a quantity of a PET-containing reclaimer coproduct or plastic-containing mixture comprising at least 1, at least 10, at least 30, at least 50, at least 60, at least 70, at least 80, or at least 90 weight percent and/or not more than 99.9, not more than 99, or not more than 90 weight percent PET, on a dry plastic basis, or it can be in the range of from 1 to 99.9 weight percent, 1 to 99 weight percent, or 10 to 90 weight percent PET, on a dry plastic basis. Reclaimer facilities may also include processes that produce high purity PET (at least 99 or at least 99.9 weight percent) reclaimer co-products but in a form that is undesirable to mechanical recycling facilities. As used herein, the term "reclaimer co-product" refers to any material separated or recovered by the reclaimer facility that is not recovered as a clear rPET product, including colored rPET. The reclaimer co-products described above and below are generally considered to be waste products and may sent to landfills.

In one or more of such embodiments, the waste plastic comprises a quantity of reclaimer wet fines comprising at least 20, at least 40, at least 60, at least 80, at least 90, at least 95, or at least 99 weight percent and/or not more than 99.9 weight percent PET, on a dry plastic basis. In one or more of such embodiments, the waste plastic comprises a quantity of colored plastic-containing mixture comprising at least 1, at least 10, at least 20, at least 40, at least 60, at least 80, or at least 90 and/or not more than 99.9 or not more than 99 weight percent PET, on a dry plastic basis. In one or more of such embodiments, the waste plastic comprises a quantity of eddy current waste stream comprising metal and at least 0.1, at least 1, at least 10, at least 20, at least 40, at least 60, or at least 80 weight percent and/or not more than 99.9, not more than 99, or not more than 98 weight percent PET, on a dry plastic basis. In one or more of such embodiments, the waste plastic comprises a quantity of reclaimer flake reject comprising at least 0.1, at least 1, at least 10, at least 20, at least 40, at least 60, or at least 80 weight percent and/or not more than 99.9, not more than 99, or not more than 98 weight percent PET, on a dry plastic basis, or it could be in the range of from 0.1 to 99.9 weight percent, 1 to 99 weight percent, or 10 to 98 weight percent PET, on a dry plastic basis. In one or more of such embodiments, the waste plastic comprises a quantity of dry fines comprising at least 50, at least 60, at least 70, at least 80, at least 90, at least 95, at least 99, at least 99.9 weight percent PET, on a dry plastic basis.

The chemical recycling facility 10 may also include infrastructure for receiving waste plastic (e.g., MPW) as described herein to facilitate delivery of the waste plastic by any suitable type of vehicle including, for example, trains, trucks, and/or ships. Such infrastructure may include facilities to assist with offloading the waste plastic from the vehicle, as well as storage facilities and one or more conveyance systems for transporting the waste plastic from the offloading zone to the downstream processing zones. Such conveyance systems may include, for example, pneumatic conveyors, belt conveyors, bucket conveyors, vibrating conveyors, screw conveyors, cart-on-track conveyors, tow conveyors, trolley conveyors, front-end loaders, trucks, and chain conveyors.

The waste (e.g., MPW) introduced into the chemical recycling facility 10 may be in several forms including, but not limited to, whole articles, particulates (e.g., comminuted, pelletized, fiber plastic particulates), bound bales (e.g., whole articles compressed and strapped), unbound articles (i.e., not in bales or packaged), containers (e.g., box, sack, trailer, railroad car, loader bucket), piles (e.g., on a concrete slab in a building), solid/liquid slurries (e.g., pumped slurry of plastics in water), and/or loose materials conveyed physically (e.g., particulates on a conveyor belt) or pneumatically (e.g., particulates mixed with air and/or inert gas in a convey pipe).

As used herein, the term "waste plastic particulates" refers to waste plastic having a D90 of less than 1 inch. In an embodiment or in combination with any embodiment mentioned herein, the waste plastic particulates can be MPW particulates. A waste plastic or MPW particulate can include, for example, comminuted plastic particles that have been shredded or chopped, or plastic pellets. When whole or nearly whole articles are introduced into the chemical recycling facility 10 (or preprocessing facility 20), one or more comminuting or pelletizing steps may be used therein to form waste plastic particulates (e.g., MPW particulates). Alternatively, or in addition, at least a portion of the waste plastic introduced into the chemical recycling facility 10 (or preprocessing facility 20) may already be in the form of particulates.

The general configuration and operation of each of the facilities that may be present in the chemical recycling facility shown in FIGS. 1*a* and 1*b* will now be described in further detail below, beginning with the preprocessing facility. Optionally, although not shown in FIGS. 1*a* and 1 *b*, at least one of the streams from the chemical recycling facility may be sent to an industrial landfill or other similar type of processing or disposal facility.

Preprocessing

As shown in FIGS. 1*a* and 1 *b*, the stream of unprocessed and/or partially processed waste plastic, such as mixed plastic waste (MPW), may first be introduced into a preprocessing facility 20 via stream 100. In preprocessing facility 20, the stream may undergo one or more processing steps to prepare it for chemical recycling. As used herein, the term "preprocessing" refers to preparing waste plastic for chemical recycling using one or more of the following steps: (i) comminuting; (ii) particulating; (iii) washing; (iv) drying; and/or (v) separation. As used herein, the term "preprocessing facility" refers to a facility that includes all equipment, lines, and controls necessary to carry out the preprocessing of waste plastic. Preprocessing facilities as described herein may employ any suitable method for carrying out the preparation of waste plastic for chemical recycling using one or more of the above steps, which are described in further detail below.

Comminuting & Particulating

In an embodiment or in combination with any embodiment mentioned herein, the waste plastic (e.g., MPW) may be provided in bales of unsorted or presorted plastic, or in other large, aggregated forms. The bales or aggregated plastics undergo an initial process in which they are broken apart. Plastic bales can be sent to a debaler machine that comprises, for example, one or more rotating shafts equipped with teeth or blades configured to break the bales apart, and in some instances shred, the plastics from which the bales are comprised. In one or more other embodiments, the bales or aggregated plastics can be sent to a guillotine machine where they are chopped into smaller sized pieces of plastic. The debaled and/or guillotined plastic solids can then be subjected to a sorting process in which various non-plastic, heavy materials, such as glass, metal, and rocks, are removed. This sorting process can be performed manually or by a machine. Sorting machines may rely upon optical sensors, magnets, eddy currents, pneumatic lifts or conveyors that separate based on drag coefficient, or sieves to identify and remove the heavy materials.

In an embodiment or in combination with any embodiment mentioned herein, the waste plastic feedstock comprises plastic solids having a D90 that is greater than one inch, greater than 0.75 inch, or greater than 0.5 inch, such as used containers. Alternatively, or in addition, the waste plastic feedstock may also comprise a plurality of plastic solids that, at one time, had at least one dimension of greater than one inch, but the solids may have been compacted, pressed, or otherwise aggregated into a larger unit, such as a bale. In such embodiments wherein at least a portion, or all, of the plastic solids have at least one dimension greater than one inch, greater than 0.75 inch, or 0.5 inch, the feedstock may be subjected to a mechanical size reduction operation, such as grinding/granulating, shredding, guillotining, chopping, or other comminuting process to provide MPW particles having a reduced size. Such mechanical size reduction operations can include a size reduction step other than crushing, compacting, or forming plastic into bales.

In one or more other embodiments, the waste plastic may already have undergone some initial separation and/or size-reduction process. In particular, the waste plastic may be in the form of particles or flakes and provided in some kind of container, such as a sack or box. Depending upon the composition of these plastic solids and what kind of preprocessing they may have been subjected to, the plastic feedstock may bypass the debaler, guillotine, and/or heavies removal station and proceed directly to the granulating equipment for further size reduction.

In an embodiment or in combination with any embodiment mentioned herein, the debaled or broken apart plastic solids may be sent to comminution or granulating equipment in which the plastic solids are ground, shredded, or otherwise reduced in size. The plastic materials can be made into particles having a D90 particle size of less than 1 inch, less than ¾ inch, or less than ½ inch. In one or more other embodiments, the D90 particle size of the plastic materials exiting the granulating equipment is from 1/16 inch to 1 inch, ⅛ inch to ¾ inch, ¼ inch to ⅝ inch, or ⅜ inch to ½ inch.

Washing & Drying

In an embodiment or in combination with any embodiment mentioned herein, the unprocessed or partially processed waste plastic provided to the chemical recycling facility may comprise various organic contaminants or residues that may be associated with the previous use of the waste plastic. For example, the waste plastic may comprise food or beverage soils, especially if the plastic material was used in food or beverage packaging. Accordingly, the waste plastic may also contain microorganism contaminants and/or compounds produced by the microorganisms. Exemplary microorganisms that may be present on the surfaces of the plastic solids making up the waste plastic include *E. coli, salmonella, C. dificile, S. aureus, L. monocytogenes, S. epidermidis, P. aeruginosa*, and *P. fluorescens.*

Various microorganisms can produce compounds that cause malodors. Exemplary odor-causing compounds include hydrogen sulfide, dimethyl sulfide, methanethiol, putrescine, cadaverine, trimethylamine, ammonia, acetaldehyde, acetic acid, propanoic acid, and/or butyric acid. Thus, it can be appreciated that the waste plastic could present odor nuisance concerns. Therefore, the waste plastic may be stored within an enclosed space, such as a shipping container, enclosed railcar, or enclosed trailer until it can be processed further. In certain embodiments, the unprocessed or partially processed waste plastic, once it reaches the site where processing (e.g., comminuting, washing, and sorting) of the waste plastic is to occur, can be stored with the enclosed spaces for no more than one week, no more than 5 days, no more than 3 days, no more than 2 days, or no more than 1 day.

In an embodiment or in combination with any embodiment mentioned herein, the preprocessing facility 20 may also include equipment for or the step of treating the waste plastic with a chemical composition that possesses antimicrobial characteristics, thereby forming treated particulate plastic solids. In some embodiments, this may include treating the waste plastic with sodium hydroxide, high pH salt solutions (e.g., potassium carbonate), or other antimicrobial composition.

Additionally, in an embodiment or in combination with any embodiment mentioned herein, the waste plastic (e.g., MPW) may optionally be washed to remove inorganic, non-plastic solids such as dirt, glass, fillers and other non-plastic solid materials, and/or to remove biological components such as bacteria and/or food. The resulting washed waste plastic may also be dried to a moisture content of not more than 5, not more than 3, not more than 2, not more than 1, not more than 0.5, or not more than 0.25 weight percent water (or liquid), based on the total weight of the waste plastic. The drying can be done in any suitable manner, including by the addition of heat and/or air flow, mechanical drying (e.g., centrifugal), or by permitting evaporation of the liquid to occur over a specified time.

Separation

In an embodiment or in combination with any embodiment mentioned herein, the preprocessing facility 20 or step of the chemical recycling process or facility 10 may include at least one separation step or zone. The separation step or zone may be configured to separate the waste plastic stream into two or more streams enriched in certain types of plastics. Such separation is particularly advantageous when the waste plastic fed to the preprocessing facility 20 is MPW.

Figure 2:
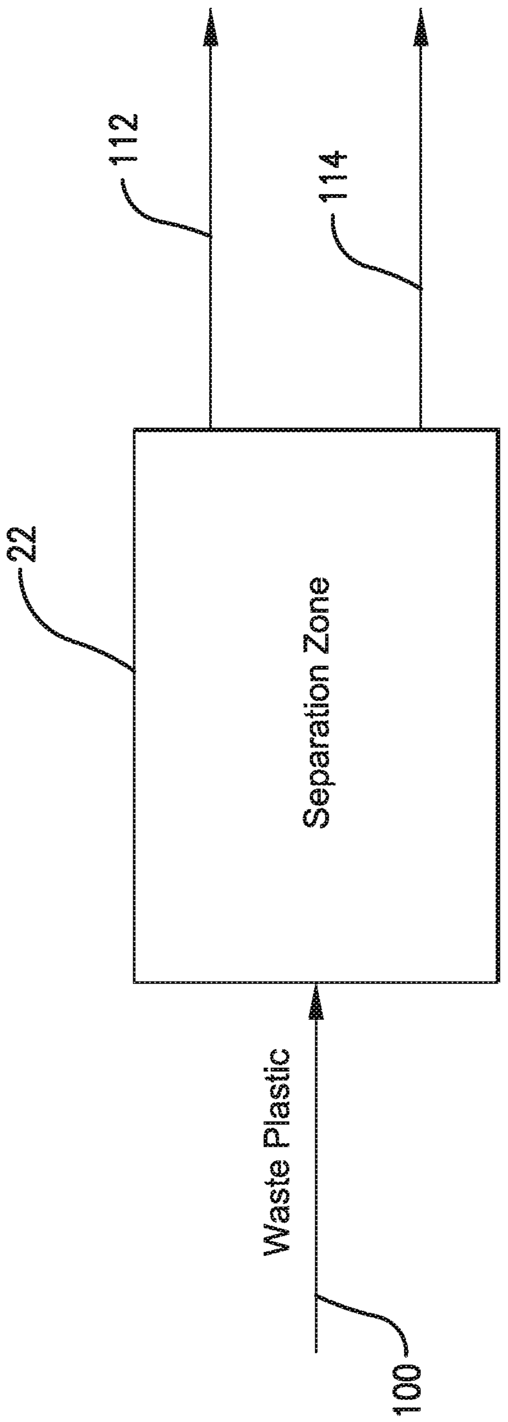
FIG. 2 is a block flow diagram illustrating a separation process and zone for separating mixed plastic waste according to embodiments of the present technology.

In an embodiment or in combination with any embodiment mentioned herein, the separation zone 22 (see FIG. 2) of the preprocessing facility 20 may separate the waste plastic (e.g., MPW) into a PET-enriched stream 112 and a PET-depleted stream 114 as shown in FIG. 2. As used herein, the term "enriched" means having a concentration (on an undiluted dry weight basis) of a specific component that is greater than the concentration of that component in a reference material or stream. As used herein, the term "depleted" means having a concentration (on an undiluted dry weight basis) of a specific component that is less than the concentration of that component in a reference material or stream. As used herein, all weight percentages are given on an undiluted dry weight basis, unless otherwise noted.

When the enriched or depleted component is a solid, concentrations are on an undiluted dry solids weight basis; when the enriched or depleted component is a liquid, concentrations are on an undiluted dry liquid weight basis; and when the enriched or depleted component is a gas, concentrations are on an undiluted dry gas weight basis. In addition, enriched and depleted can be expressed in mass balance terms, rather than as a concentration. As such, a stream enriched in a specific component can have a mass of the component that is greater than the mass of the component in a reference stream (e.g., feed stream or other product stream), while a stream depleted in a specific component can have a mass of the component that is less than the mass of the component in a reference stream (e.g., feed stream or other product stream).

Referring again to FIG. 2, the PET-enriched stream 112 of waste plastic withdrawn from the preprocessing facility 20 (or separation zone 22) may have a higher concentration or mass of PET than the concentration or mass of PET in the waste plastic feed stream 100 introduced into the preprocessing facility 20 (or separation zone 22). Similarly, the PET-depleted stream 114 withdrawn from the preprocessing facility 20 (or separation zone 22) may be PET-depleted and have a lower concentration or mass of PET than the concentration or mass of PET in the waste plastic introduced into the preprocessing facility 20 (or separation zone 22). The PET-depleted stream 114 may also be PO-enriched and have a higher concentration or mass of PO than the concentration or mass of PO in the waste plastic (e.g., MPW) stream introduced into the preprocessing facility 20 (or separation zone 22).

In an embodiment or in combination with any embodiment mentioned herein, when a MPW stream 100 is fed to the preprocessing facility 20 (or separation zone 22), the PET-enriched stream may be enriched in concentration or mass of PET relative to the concentration or mass of PET in the MPW stream, or the PET-depleted stream, or both, on an undiluted solids dry weight basis. For example, if the PET-enriched stream is diluted with liquid or other solids after separation, the enrichment would be on the basis of a concentration in the undiluted PET-enriched stream, and on a dry basis. In one embodiment or in combination with any of the mentioned embodiments, the PET-enriched stream 112 has a percent PET enrichment relative to the MPW feed stream (Feed-Based % PET Enrichment), the PET-depleted product stream 114 (Product-Based % PET Enrichment), or both that is at least 10, at least 20, at least 40, at least 50, at least 60, at least 80, at least 100, at least 125, at least 150, at least 175, at least 200, at least 225, at least 250, at least 300, at least 350, at least 400, at least 500, at least 600, at least 700, at least 800, at least 900, or at least 1000% as determined by the formula:

$$\text{Feed-Based \% PET Enrichment} = \frac{PETe - PETm}{PETm} \times 100$$

and

-continued $$\text{Product-Based \% PET Enrichment} = \frac{PETe - PETd}{PETd} \times 100$$

where PETe is the concentration of PET in the PET-enriched product stream 112 on an undiluted dry weight basis;

PETm is the concentration of PET in the MPW feed stream 100 on a dry weight basis; and PETd is the concentration of PET in the PET-depleted product stream 114 on a dry weight basis.

In an embodiment or in combination with any embodiment mentioned herein, when a stream comprising MPW 100 is fed to the preprocessing facility 20 (or separation zone 22), the PET-enriched stream is also enriched in halogens, such as fluorine (F), chlorine (Cl), bromine (Br), iodine (I), and astatine (At), and/or halogen-containing compounds, such as PVC, relative to the concentration or mass of halogens in the MPW feed stream 100, or the PET-depleted product stream 114, or both. In one embodiment or in combination with any of the mentioned embodiments, the PET-enriched stream 112 has a percent PVC enrichment relative to the MPW feed stream 100 (Feed-Based % PVC Enrichment), the PET-depleted product stream (Product-Based % PVC Enrichment), or both that is at least 1, at least 3, at least 5, at least 7, at least 10, at least 15, at least 20, at least 40, at least 50, at least 60, at least 80, at least 100, at least 125, at least 150, at least 175, at least 200, at least 225, at least 250, at least 300, at least 350, at least 400, or at least 500% as determined by the formula:

$$\text{Feed-Based \% } PVC \text{ Enrichment} = \frac{PVCe - PVCm}{PVCm} \times 100$$

and $$\text{Product-Based \% } PVC \text{ Enrichment} = \frac{PVCe - PVCd}{PVCd} \times 100$$

where PVCe is the concentration of PVC in the PET-enriched product stream 112 on an undiluted dry weight basis;

PVCm is the concentration of PVC in the MPW feed stream 100 on an undiluted dry weight basis; and where PVCd is the concentration of PVC in the PET-depleted product stream 114 on an undiluted dry weight basis.

In one embodiment or in combination with any of the mentioned embodiments, when a MPW stream 100 is fed to the preprocessing facility 20 (or separation zone 22), the PET-depleted stream 114 is enriched in polyolefins relative to the concentration or mass of polyolefins in the MPW feed stream 100, the PET-enriched product stream 112, or both, on an undiluted solids dry basis. In one embodiment or in combination with any of the mentioned embodiments, the PET-depleted stream 114 has a percent polyolefin enrichment relative to the MPW feed stream 100 (Feed-Based % PO Enrichment), or relative to the PET-enriched product stream 112 (Product-Based % PO Enrichment), or both that is at least 10, at least 20, at least 40, at least 50, at least 60, at least 80, at least 100, at least 125, at least 150, at least 175, at least 200, at least 225, at least 250, at least 300, at least 350, at least 400, at least 500, at least 600, at least 700, at least 800, at least 900, or at least 1000% as determined by the formula:

$$\text{Feed-Based \% } PO \text{ Enrichment} = \frac{POd - POm}{POm} \times 100$$

and $$\text{Product-Based \% } PO \text{ Enrichment} = \frac{POd - POe}{POe} \times 100$$

where POd is the concentration of polyolefins in the PET-depleted product stream 114 on an undiluted dry weight basis;

POm is the concentration of PO in the MPW feed stream 100 on a dry weight basis; and POe is the concentration of PO in the PET-enriched product stream 112 on a dry weight basis.

In one embodiment or in combination with any other embodiments, when a MPW stream 100 is fed to the preprocessing facility 20 (or separation zone 22), the PET-depleted stream 114 is also depleted in halogens, such as fluorine (F), chlorine (Cl), bromine (Br), iodine (I), and astatine (At), and/or halogen-containing compounds, such as PVC, relative to the concentration or mass of halogens in the MPW stream 100, the PET-enriched stream 112, or both. In one embodiment or in combination with any of the mentioned embodiments, the PET-depleted stream 114 has a percent PVC depletion, relative to the MPW feed stream 100 (Feed-Based % PVC Depletion) or the PET-enriched product stream 112 (Product-Based % PVC Depletion) that is at least 1, at least 3, at least 5, at least 7, at least 10, at least 15, at least 20, at least 25, at least 30, at least 35, at least 40, at least 50, at least 60, at least 65, at least 70, at least 75, at least 80, at least 85, or at least 90% as determined by the formula:

$$\text{Feed-Based \% } PVC \text{ Depletion} = \frac{PVCm - PVCd}{PVCm} \times 100$$

and $$\text{Product-Based \% } PVC \text{ Depletion} = \frac{PVCe - PVCd}{PVCe} \times 100$$

where PVCm is the concentration of PVC in the MPW feed stream 100 on an undiluted dry weight basis;

PVCd is the concentration of PVC in the PET-depleted product stream 114 on an undiluted dry weight basis; and PVCe is the concentration of PVC in the PET-enriched product stream 112 on an undiluted dry weight basis.

The PET-depleted stream 114 is depleted in PET relative to the concentration or mass of PET in the MPW stream 100, the PET-enriched stream 112, or both. In one embodiment or in combination with any of the mentioned embodiments, the PET-depleted stream 114 has a percent PET depletion, relative to the MPW feed stream 100 (Feed-Base % PET Depletion) or the PET-enriched product stream 112 (Product-Based % PET Depletion) that is at least 1, at least 3, at least 5, at least 7, at least 10, at least 15, at least 20, at least 25, at least 30, at least 35, at least 40, at least 50, at least 60, at least 65, at least 70, at least 75, at least 80, at least 85, or at least 90% as determined by the formula:

$$\text{Feed-Based \% PET Depletion} = \frac{PETm - PETd}{PETm} \times 100$$

and

-continued $$\text{Product-Based \% PET Depletion} = \frac{PETe - PETd}{PETe} \times 100$$

where PETm is the concentration of PET in the MPW feed stream 100 on an undiluted dry weight basis;

PETd is the concentration of PET in the PET-depleted product stream 114 on an undiluted dry weight basis; and PETe is the concentration of PET in the PET-enriched product stream 112 on an undiluted dry weight basis.

The percentage enrichment or depletion in any of the above embodiments can be an average over 1 week, or over 3 days, or over 1 day, and the measurements can be conducted to reasonably correlate the samples taken at the exits of the process to MPW bulk from which the sample of MPW is taking into account the residence time of the MPW to flow from entry to exit. For example, if the average residence time of the MPW is 2 minutes, then the outlet sample would be taken two minutes after the input sample, so that the samples correlate to one another.

In an embodiment or in combination with any embodiment mentioned herein, the PET-enriched stream exiting the separation zone 22 or the preprocessing facility 20 may include at least 50, at least 55, at least 60, at least 65, at least 70, at least 75, at least 80, at least 85, at least 90, at least 95, at least 97, at least 99, at least 99.5, or at least 99.9 weight percent PET, based on the total weight of plastic in the PET-enriched stream 112. The PET-enriched stream 112 may also be enriched in PVC and can include, for example, at least 0.1, at least 0.5, at least 1, at least 2, at least 3, at least 5 and/or not more than 10, not more than 8, not more than 6, not more than 5, not more than 3 weight percent of halogens, including PVC, based on the total weight of plastic in the PET-enriched stream, or it can be in the range of 0.1 to 10 weight percent, 0.5 to 8 weight percent, or 1 to 5 weight percent, based on the total weight of plastic in the PET-enriched stream. The PET-enriched stream may include at least 50, at least 55, at least 60, at least 65, at least 70, at least 75, at least 80, at least 85, at least 90, at least 95, at least 99, or at least 99.5 weight percent of the total amount of PET introduced into the preprocessing facility 20 (or separation zone 22).

The PET-enriched stream 112 may also be depleted in PO and/or heavier plastics such as polytetrafluoroethylene (PTFE), polyamide (PA 12, PA 46, PA 66), polyacrylamide (PARA), polyhydroxybutyrate (PHB), polycarbonate polybutylene terephthalate blends (PC/PBT), polyvinyl chloride (PVC), polyimide (PI), polycarbonate (PC), polyethersulfone (PESU), polyether ether ketone (PEEK), polyamide imide (PAI), polyethylenimine (PEI), polysulfone (PSU), polyoxymethylene (POM), polyglycolides (poly(glycolic acid), PGA), polyphenylene sulfide (PPS), thermoplastic styrenic elastomers (TPS), amorphous thermoplastic polyimide (TPI), liquid crystal polymer (LCP), glass fiber-reinforced PET, chlorinated polyvinyl chloride (CPVC), polybutylene terephthalate (PBT), polyphthalamide (PPA), polyvinylidene chloride (PVDC), ethylene tetrafluoroethylene (ETFE), polyvinylidene fluoride (PVDF), fluorinated ethylene propylene (FEP), polymonochlorotrifluoroethylene (PCTFE), and perfluoroalkoxy (PFA), any of which may include carbon, glass, and/or mineral fillers, and which have a density higher than PET and PVC.

In an embodiment or in combination with any embodiment mentioned herein, the PET-enriched stream 112 may comprise not more than 45, not more than 40, not more than 35, not more than 30, not more than 25, not more than 20, not more than 15, not more than 10, not more than 5, not more than 2, not more than 1, not more than 0.5 weight percent PO, based on the total weight of plastic in the PET-enriched stream 112. The PET-enriched stream 112 may comprise not more than 10, not more than 8, not more than 5, not more than 3, not more than 2, or not more than 1 weight percent of the total amount of PO introduced into the preprocessing facility 20 (or separation zone 22). The PET-enriched stream 112 may comprise not more than 45, not more than 40, not more than 35, not more than 30, not more than 25, not more than 20, not more than 15, not more than 10, not more than 5, not more than 2, not more than 1 weight percent of components other than PET, based on the total weight of the PET-enriched stream 112.

Additionally, or in the alternative, the PET-enriched stream 112 can include not more than 2, not more than 1, not more than 0.5, or not more than 0.1 weight percent of adhesives on a dry basis. Typical adhesives include carpet glue, latex, styrene butadiene rubber, and the like. Additionally, the PET-enriched stream 112 can include not more than 4, not more than 3, not more than 2, not more than 1, not more than 0.5, or not more than 0.1 weight percent plastic fillers and solid additives on a dry basis. Exemplary fillers and additives include silicon dioxide, calcium carbonate, talc, silica, glass, glass beads, alumina, and other solid inerts, which do not chemically react with the plastics or other components in the processes described herein.

In an embodiment or in combination with any embodiment mentioned herein, the PET-depleted (or PO-enriched) stream 114 exiting the separation zone 22 or the preprocessing facility 20 may include at least 50, at least 55, at least 60, at least 65, at least 70, at least 75, at least 80, at least 85, at least 90, at least 95, at least 97, at least 99, or at least 99.5 weight percent PO, based on the total weight of plastic in the PET-depleted (or PO-enriched) stream 114. The PET-depleted (or PO-enriched stream) may be depleted in PVC and can include, for example, not more than 5, not more than 2, not more than 1, not more than 0.5, not more than 0.1, not more than 0.05, or not more than 0.01 weight percent of halogens, including chorine in PVC, based on the total weight of plastic in the PET-depleted (or PO-enriched) stream. The PET-depleted or PO-enriched stream may include at least 50, at least 55, at least 60, at least 65, at least 70, at least 75, at least 80, at least 85, at least 90, at least 95, at least 99, or at least 99.9 weight percent of the total amount of PO introduced into the preprocessing facility 20 or separation facility 22.

The PO-enriched stream 114 may also be depleted in PET and/or other plastics, including PVC. In an embodiment or in combination with any embodiment mentioned herein, the PET-depleted (or PO-enriched stream) may comprise not more than 45, not more than 40, not more than 35, not more than 30, not more than 25, not more than 20, not more than 15, not more than 10, not more than 5, not more than 2, not more than 1, not more than 0.5 weight percent PET, based on the total weight of plastic in the PET-depleted or PO-enriched stream. The PO-enriched (or PET-depleted) stream 114 may comprise not more than 10, not more than 8, not more than 5, not more than 3, not more than 2, or not more than 1 weight percent of the total amount of PET introduced into the preprocessing facility.

In an embodiment or in combination with any embodiment mentioned herein, the PET-depleted or PO-enriched stream 114 may also comprise not more than 45, not more than 40, not more than 35, not more than 30, not more than 25, not more than 20, not more than 15, not more than 10, not more than 5, not more than 2, not more than 1 weight percent of components other than PO, based on the total weight of PET-depleted or PO-enriched stream 114. The PET-depleted or PO-enriched stream 114 comprises not more than 4, not more than 2, not more than 1, not more than 0.5, or not more than 0.1 weight percent of adhesives, based on the total weight of the stream.

In an embodiment or in combination with any embodiment mentioned herein, the PET-depleted or PO-enriched stream 114 may have a melt viscosity of at least 1, at least 5, at least 50, at least 100, at least 200, at least 300, at least 400, at least 500, at least 600, at least 700, at least 800, at least 900, at least 1000, at least 1500, at least 2000, at least 2500, at least 3000, at least 3500, at least 4000, at least 4500, at least 5000, at least 5500, at least 6000, at least 6500, at least 7000, at least 7500, at least 8000, at least 8500, at least 9000, at least 9500, or at least 10,000 poise, measured using a Brookfield R/S rheometer with V80-40 vane spindle operating at a shear rate of 10 rad/s and a temperature of 350° C. Alternatively, or in addition, the PET-depleted or PO-enriched stream may have a melt viscosity of not more than 25,000, not more than 24,000, not more than 23,000, not more than 22,000, not more than 21,000, not more than 20,000, not more than 19,000, not more than 18,000, or not more than 17,000 poise, (measured at 10 rad/s and 350° C.). Or the stream may have a melt viscosity in the range of from 1 to 25,000 poise, 500 to 22,000 poise, or 1000 to 17,000 poise (measured at 10 rad/s and 350° C.).

Any suitable type of separation device, system, or facility may be employed to separate the waste plastic into two or more streams enriched in certain types of plastics such as, for example, the PET-enriched stream 112 and the PO-enriched stream 114. Examples of suitable types of separation include mechanical separation and density separation, which may include sink-float separation and/or centrifugal density separation. As used herein, the term "sink-float separation" refers to a density separation process where the separation of materials is primarily caused by floating or sinking in a selected liquid medium, while the term "centrifugal density separation" refers to a density separation process where the separation of materials is primarily caused by centrifugal forces. In general, the term "density separation process" refers to a process for separating materials based, at least in part, upon the respective densities of the materials into at least a higher-density output and a lower-density output and includes both sink-float separation and centrifugal density separation.

When sink-float separation is used, the liquid medium can comprise water. Salts, saccharides, and/or other additives can be added to the liquid medium, for example to increase the density of the liquid medium and adjust the target separation density of the sink-float separation stage. The liquid medium can comprise a concentrated salt solution. In one or more such embodiments, the salt is sodium chloride. In one or more other embodiments, however, the salt is a non-halogenated salt, such as acetates, carbonates, citrates, nitrates, nitrites, phosphates, and/or sulfates. The liquid medium can comprise a concentrated salt solution comprising sodium bromide, sodium dihydrogen phosphate, sodium hydroxide, sodium iodide, sodium nitrate, sodium thiosulfate, potassium acetate, potassium bromide, potassium carbonate, potassium hydroxide, potassium iodide, calcium chloride, cesium chloride, iron chloride, strontium chloride, zinc chloride, manganese sulfate, magnesium sulfate, zinc sulfate, and/or silver nitrate. In an embodiment or in combination with any embodiment mentioned herein, the salt is a caustic component. The salt may comprise sodium hydroxide, potassium hydroxide, and/or potassium carbonate. The concentrated salt solution may have a pH of greater than 7, greater than 8, greater than 9, or greater than 10.

In an embodiment or in combination with any embodiment mentioned herein, the liquid medium can comprise a saccharide, such as sucrose. The liquid medium can comprise carbon tetrachloride, chloroform, dichlorobenzene, dimethyl sulfate, and/or trichloro ethylene. The particular components and concentrations of the liquid medium may be selected depending on the desired target separation density of the separation stage. The centrifugal density separation process may also utilize a liquid medium as described above to improve separation efficiency at the target separation density.

In an embodiment or in combination with any embodiment mentioned herein, the waste plastic separation methods comprise at least two density separation stages. In certain such embodiments, the methods generally comprise introducing waste plastic particulates into the first density separation stage and feeding an output from the first density separation stage into the second density separation stage. The density separation stages can be any system or unit operation that performs a density separation process, as defined herein. At least one of the density separation stages comprises a centrifugal force separation stage or a sink-float separation stage. Each of the first and second density separation stages comprises a centrifugal force separation stage and/or a sink-float separation stage.

To produce a PET-enriched material stream, one of the density separation stages may comprise a low-density separation stage and the other generally comprises a high-density separation stage. As defined herein, the low-density separation stage has a target separation density less than the target separation density of the high-density separation stage. The low-density separation stage has a target separation density less than the density of PET, and the high-density separation stage has a target separation density greater than the density of PET.

As used herein, the term "target separation density" refers to a density above which materials subjected to a density separation process are preferentially separated into the higher-density output and below which materials are separated in the lower-density output. The target separation density specifies a density value, wherein it is intended that all plastics and other solid materials having a density higher than the value are separated into the higher-density output and all plastics and other solid materials having a density lower than the value are separated into the lower-density output. However, the actual separation efficiency of the materials in a density separation process may depend on various factors, including residence time and relative closeness of the density of a particular material to the target density separation value, as well as factors related to the form of the particulate such as, for example, area-to-mass ratio, degree of sphericity, and porosity.

In an embodiment or in combination with any embodiment mentioned herein, the low-density separation stage has a target separation density that is less than 1.35, less than 1.34, less than 1.33, less than 1.32, less than 1.31, or less than 1.30 g/cc and/or at least 1.25, at least 1.26, at least 1.27, at least 1.28, or at least 1.29 g/cc. The high-density separation stage has a target separation density that is at least 0.01, at least 0.025, at least 0.05, at least 0.075, at least 0.1, at least 0.15, or at least 0.2 g/cc greater than the target separation density of the low-density separation stage. The target separation density of the high-density separation stage is at least 1.31, at least 1.32, at least 1.33, at least 1.34, at least 1.35, at least 1.36, at least 1.37, at least 1.38, at least 1.39, or at least 1.40 g/cc and/or not more than 1.45, not more than 1.44, not more than 1.43, not more than 1.42, or not more than 1.41 g/cc. The target separation density of the low-density separation stage is in the range of 1.25 to 1.35 g/cc and the target separation density of said high-density separation stage is in the range of 1.35 to 1.45 g/cc.

Referring again to FIGS. 1*a* and 1 *b*, both the PET-enriched stream 112 and the PO-enriched stream 114 may be introduced into one or more downstream processing facilities (or undergo one or more downstream processing steps) within the chemical recycling facility 10. In an embodiment or in combination with any embodiment mentioned herein, at least a portion of the PET-enriched stream 112 may be introduced into a solvolysis facility 30, while at least a portion of the PO-enriched stream 114 may be directly or indirectly introduced into one or more of a pyrolysis facility 60, a cracking facility 70, a partial oxidation (POX) gasification facility 50, an energy recovery facility 80, or other facility 90, such as a solidification or separation facility. Additional details of each step and type of facility, as well as the general integration of each of these steps or facilities with one or more of the others according to an embodiment or in combination with any embodiment mentioned herein of the present technology are discussed in further detail below.

Solvolysis

In an embodiment or in combination with any embodiment mentioned herein, at least a portion of a PET-enriched stream 112 from the preprocessing facility 20 may be introduced into a solvolysis facility 30. As used herein, the term "solvolysis" or "ester solvolysis" refers to a reaction by which an ester-containing feed is chemically decomposed in the presence of a solvent to form a principal carboxyl product and a principal glycol product. A "solvolysis facility" is a facility that includes all equipment, lines, and controls necessary to carry out solvolysis of waste plastic and feedstocks derived therefrom.

When the ester being subjected to solvolysis comprises PET, the solvolysis performed in the solvolysis facility may be PET solvolysis. As used herein, the term "PET solvolysis" refers to a reaction by which a polyester terephthalate-containing feed is chemically decomposed in the presence of a solvent to form a principal terephthalyl product and a principal glycol product. As used herein, the term "principal terephthalyl" refers to the main or key terephthalyl product being recovered from the solvolysis facility. As used herein, the term "principal glycol" refers to the main glycol product being recovered from the solvolysis facility. As used herein, the term "glycol" refers to a component comprising two or more —OH functional groups per molecule. As used herein, the term "terephthalyl" refers to a molecule including the following group:

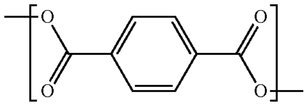

Figure 3:
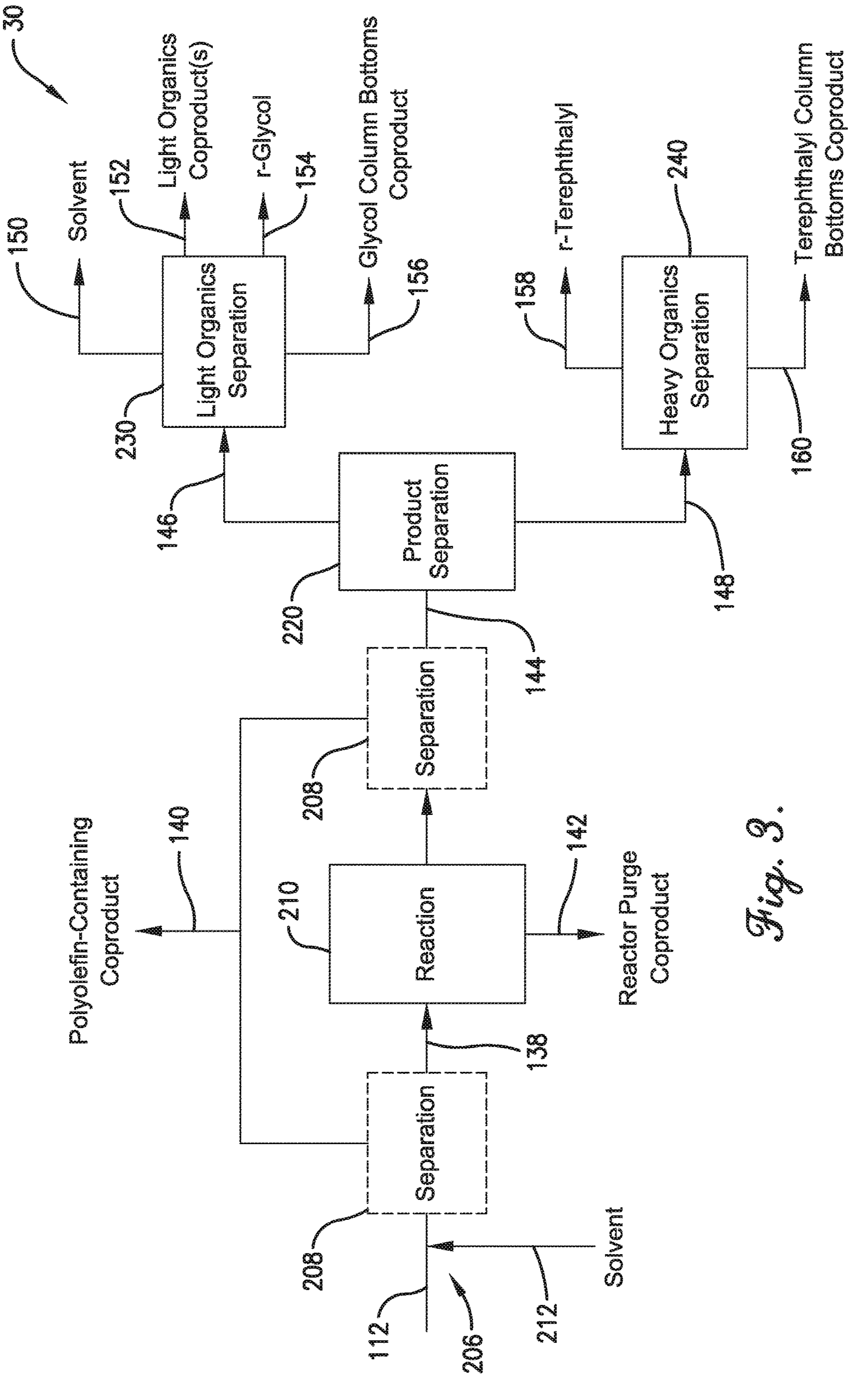
FIG. 3 is a block flow diagram illustrating the main steps of a process and facility for PET solvolysis according to embodiments of the present technology.

In an embodiment or in combination with any embodiment mentioned herein, the principal terephthalyl product comprises a terephthalyl, such as terephthalic acid or dimethyl terephthalate (or oligomers thereof), while the principal glycol comprises a glycol, such as ethylene glycol and/or diethylene glycol. The main steps of a PET solvolysis facility 30 according to an embodiment or in combination with any embodiment mentioned herein of the present technology are generally shown in FIG. 3.

In an embodiment or in combination with any embodiment mentioned herein, the principal solvent used in solvolysis comprises a chemical compound having at least one —OH group. Examples of suitable solvents can include, but are not limited to, (i) water (in which case the solvolysis may be referred to as "hydrolysis"), (ii) alcohols (in which case the solvolysis may be referred to as "alcoholysis"), such as methanol (in which case the solvolysis may be referred to as "methanolysis") or ethanol (in which case the solvolysis may be referred to as "ethanolysis"), (iii) glycols such as ethylene glycol or diethylene glycol (in which case the solvolysis may be referred to as "glycolysis"), or (iv) ammonia (in which case the solvolysis may be referred to as "ammonolysis").

In an embodiment or in combination with any embodiment mentioned herein, the solvolysis solvent can include at least 50, at least 55, at least 60, at least 65, at least 70, at least 75, at least 80, at least 85, at least 90, at least 95, at least or at least 99 weight percent of the principal solvent, based on the total weight of the solvent stream. In an embodiment or in combination with any embodiment mentioned herein, the solvent may comprise not more than 45, not more than 40, not more than 35, not more than 30, not more than 25, not more than 20, not more than 15, not more than 10, not more than 5, not more than 2, or not more than 1 weight percent of other solvents or components, based on the total weight of the solvent stream.

When the solvolysis facility 30 utilizes a glycol, such as ethylene glycol, as the principal solvent, the facility may be referred to as a glycolysis facility. In an embodiment or in combination with any embodiment mentioned herein, the chemical recycling facility of FIGS. 1*a* and 1 *b* may comprise a glycolysis facility. In a glycolysis facility, PET can be chemically decomposed to form ethylene glycol (EG) as the principal glycol and dimethyl terephthalate (DMT) as the principal terephthalyl. When the PET comprises waste plastic, both the EG and DMT formed in the solvolysis facility may comprise recycle content ethylene glycol (r-EG) and recycle content dimethyl terephthalate (r-DMT). When formed by glycolysis, the EG and DMT can be present in a single product stream.

When a solvolysis facility utilizes methanol as the principal solvent, the facility may be referred to as a methanolysis facility. The chemical recycling facility of FIGS. 1*a* and 1 *b* may include a methanolysis facility. In a methanolysis facility, an example of which is schematically depicted in FIG. 3, PET can be chemically decomposed to form ethylene glycol (EG) as the principal glycol and dimethyl terephthalate (DMT) as the principal terephthalyl. When the PET comprises waste plastic, both the EG and DMT formed in the solvolysis facility may comprise recycle content ethylene glycol (r-EG) and recycle content dimethyl terephthalate (r-DMT).

In an embodiment or in combination with any embodiment mentioned herein, the stream of recycle content glycol 154 (r-glycol) withdrawn from the solvolysis facility 30 may comprise at least 45, at least 50, at least 55, at least 60, at least 65, at least 70, at least 75, at least 80, at least 85, at least 90, or at least 95 weight percent of the principal glycol formed in the solvolysis facility. It may also include not more than 99.9, not more than 99, not more than 95, not more than 90, not more than 85, not more than 80, or not more than 75 weight percent of the principal glycol (such as EG), and/or may include at least 0.5, at least 1, at least 2, at least 5, at least 7, at least 10, at least 12, at least 15, at least 20, or at least 25 weight percent and/or not more than 45, not more than 40, not more than 35, not more than 30, not more than 25, not more than 20, or not more than 15 weight percent of components other than the principal glycol, based on the total weight of the stream, or these may be present in amounts in the range of from 0.5 to 45 weight percent, 1 to 40 weight percent, or 2 to 15 weight percent, based on the total weight of the stream. The r-glycol may be present in the stream 154 in an amount in the range of from 45 to 99.9 weight percent, 55 to 99.9 weight percent, or 80 to 99.9 weight percent, based on the total weight of the stream 154.

In an embodiment or in combination with any embodiment mentioned herein, the stream of recycle content principal terephthalyl (r-terephthalyl) 158 withdrawn from the solvolysis facility may comprise at least 45, at least 50, at least 55, at least 60, at least 65, at least 70, at least 75, at least 80, at least 85, at least 90, or at least 95 weight percent of the principal terephthalyl (such as DMT) formed in the solvolysis facility 30. It may also include not more than 99, not more than 95, not more than 90, not more than 85, not more than 80, or not more than 75 weight percent of the principal terephthalyl, or the principal terephthalyl may be present in an amount of 45 to 99 weight percent, 50 to 90 weight percent, or 55 to 90 weight percent, based on the total weight of the stream. Additionally, or in the alternative, the stream can include at least 0.5, at least 1, at least 2, at least 5, at least 7, at least 10, at least 12, at least 15, at least 20, or at least 25 weight percent and/or not more than 45, not more than 40, not more than 35, not more than 30, not more than 25, not more than 20, or not more than 15 weight percent of components other than the principal terephthalyl, based on the total weight of the stream. The r-terephthalyl (or terephthalyl) may be present in the stream 154 in an amount in the range of from 45 to 99.9 weight percent, 55 to 99.9 weight percent, or 80 to 99.9 weight percent, based on the total weight of the stream 154.

In addition to providing a recycle content principal glycol stream, a recycle content principal terephthalyl stream, the solvolysis facility may also provide one or more solvolysis coproduct streams, shown as stream 110 in FIGS. 1*a* and 1 *b*, which may also be withdrawn from one or more locations within the solvolysis facility. As used herein, the term "coproduct" or "solvolysis coproduct" refers to any compound from a solvolysis facility that is not the principal carboxyl (terephthalyl) product of the solvolysis facility, the principal glycol product of the solvolysis facility, or the principal solvent fed to the solvolysis facility. Solvolysis coproduct streams can comprise at least 40, at least 45, at least 50, at least 55, at least 60, at least 65, at least 70, at least 75, at least 80, at least 85, at least 90, at least 95, or at least 99 weight percent of one or more solvolysis coproducts, based on the total weight of the stream.

Solvolysis coproducts can comprise a heavy organic solvolysis coproduct stream or a light organic solvolysis coproduct stream. As used herein, the term "heavy organic solvolysis coproduct" refers to a solvolysis coproduct with a boiling point higher than the boiling point of the principal terephthalyl product of the solvolysis facility, while the term "light organics solvolysis coproduct" refers to a solvolysis coproduct with a boiling point lower than the boiling point of the principal terephthalyl product of the solvolysis facility.

When the solvolysis facility is a methanolysis facility, one or more methanolysis coproducts may be withdrawn from the facility. As used herein, the term "methanolysis coproduct" refers to any compound from a methanolysis facility that is not DMT, EG, or methanol. Methanolysis coproduct streams can comprise at least 40, at least 45, at least 50, at least 55, at least 60, at least 65, at least 70, at least 75, at least 80, at least 85, at least 90, at least 95, or at least 99 weight percent of one or more methanolysis coproducts, based on the total weight of the stream. In an embodiment or in combination with any embodiment mentioned herein, methanolysis coproduct streams can comprise a heavy organic methanolysis coproduct or light organic methanolysis coproduct. As used herein, the term “heavy organic methanolysis coproduct” refers to a methanolysis coproduct with a boiling point greater than DMT, while the term “light methanolysis coproduct” refers to a methanolysis coproduct with a boiling point less than DMT.

In an embodiment or in combination with any embodiment mentioned herein, the solvolysis facility may produce at least one heavy organic solvolysis coproduct stream. The heavy organic solvolysis coproduct stream may include at least 40, at least 45, at least 50, at least 55, at least 60, at least 65, at least 70, at least 75, at least 80, at least 85, at least 90, or at least 95 weight percent of organic compounds having a boiling point higher than the boiling point of the principal terephthalyl (such as DMT) produced from the solvolysis facility 30, based on the total weight of organics in the stream (excluding DMT). In an embodiment or in combination with any embodiment mentioned herein, the heavy organic solvolysis coproduct stream can include not more than 40, not more than 35, not more than 30, not more than 25, not more than 20, not more than 15, not more than 5, not more than 3, not more than 2, not more than 1 weight percent of light organic components (excluding DMT) or of DMT, based on the total weight of the stream.

Additionally, or in the alternative, the solvolysis facility may produce at least one light organics solvolysis coproduct stream. The light organics solvolysis coproduct stream may include at least 40, at least 45, at least 50, at least 55, at least 60, at least 65, at least 70, at least 75, at least 80, at least 85, at least 90, or at least 95 weight percent of organic compounds having a boiling point lower than the boiling point of the principal terephthalyl (such as DMT) produced from the solvolysis facility 30, based on the total weight of organics in the stream (excluding DMT). In an embodiment or in combination with any embodiment mentioned herein, the light organic solvolysis coproduct stream comprises not more than 40, not more than 35, not more than 30, not more than 25, not more than 20, not more than 15, not more than 5, not more than 3, not more than 2, not more than 1 weight percent of light organic components (excluding DMT) or of DMT, based on the total weight of the stream.

Turning again to FIG. 3, in operation, a feed stream 112 including, for example, mixed plastic waste, may be introduced with a stream of solvent 212 (separately or together via a blending zone 206) into the solvolysis facility 30. In an embodiment or in combination any embodiment mentioned herein, the feed stream 112 to the solvolysis facility 30 can include waste plastic in an amount of at least 5, at least 10, at least 15, at least 20, at least 25, at least 30, at least 35, at least 40, at least 45, at least 50, at least 55, at least 60, at least 65, at least 70, at least 75, at least 80, at least 85, at least 90, or at least 95 weight percent and/or not more than 99, not more than 95, not more than 90, not more than 85, not more than 80, not more than 75, not more than 70, not more than 65, not more than 60, not more than 55, not more than 50, not more than 45, not more than 40, not more than 35, not more than 30, not more than 25, not more than 20, not more than 15, or not more than 10 weight percent based on the total weight of the feed stream 112, or it can be present in an amount of from 5 to 99 weight percent, 10 to 95 weight percent, or 15 to 90 weight percent, based on the total weight of the feed stream 112. Amounts of waste plastic within these ranges may also be present in compositions or various streams within the solvolysis facility (e.g., the reactor or blending zone).

The waste plastic introduced into the solvolysis facility 30 can comprise mixed waste plastic and may include, for example, a mixture of polyethylene terephthalate (PET), polyolefin (PO), and polyvinyl chloride (PVC). For example, in one or more embodiments, the waste plastic fed into the solvolysis facility 30 can include at least 1, at least 5, at least 10, at least 15, at least 20, at least 25, at least 30, at least 35, at least 40, at least 45, at least 50, at least 55, at least 60, at least 65, at least 70, at least 75, at least 80, at least 85, at least 90, or at least 95 and/or not more than 99.9, not more than 99, not more than 95, not more than 90, not more than 85, not more than 80, not more than 75, not more than 70, not more than 65, not more than 60, not more than 55, not more than 50, not more than 45, not more than 40, not more than 35, not more than 30, or not more than 25 weight percent of PET on a dry basis, based on the total weight of the feed stream 112, or the stream can include PET in an amount of 1 to 99.9 weight percent, 2 to 99 weight percent, or 5 to 95 weight percent, based on the total weight of the stream 112.

Alternatively, or in addition, the waste plastic introduced into the solvolysis facility can include at least 5, at least 10, at least 15, at least 20, at least 25, at least 30, at least 35, at least 40, or at least 45 and/or not more than 90, not more than 80, not more than 70, not more than 65, not more than 60, not more than 55, not more than 50, not more than 45, not more than 40, not more than 35, not more than 30, not more than 25, not more than 20, not more than 15, or not more than 10 weight percent of polyolefins on a dry basis, based on the total weight of the feed stream 112, or the stream can include polyolefin in an amount in the range of from 5 to 90 weight percent, 10 to 80 weight percent, or 15 to 50 weight percent, based on the total weight of the stream 112.

Further, in one or more embodiments, the waste plastic fed to the solvolysis facility can include at least 0.001, at least 0.01, at least 0.05, at least 0.1, or at least 0.25 weight percent and/or not more than 10, not more than 8, not more than 6, not more than 5, not more than 4, not more than 3, not more than 2, not more than 1, not more than 0.75, or not more than 0.5 weight percent of halogens on a dry basis, based on the total weight of plastics in the feed stream, or it can be in the range of from 0.001 to 10 weight percent, 0.1 to 8 weight percent, or 0.25 to 3 weight percent, based on the total weight of the stream 112.

Prior to being introduced into the solvolysis facility 30, the waste plastic may be sorted in a preprocessing facility 20, as shown in FIGS. 1*a* and 1*b* and as discussed previously, or it may not be sorted and may be directly introduced into the solvolysis facility 30. When sorted into a PET-enriched waste plastic stream (such as stream 112 shown in FIGS. 1*a* and 1*b*) and a PO-enriched waste plastic stream (such as stream 114 shown in FIGS. 1*a* and 1*b*) as discussed previously, at least a portion of the PET-enriched stream 112 may be introduced into the solvolysis facility 30, while at least a portion or all of the PO-enriched stream 114 may be introduced into one or more of the chemical processing facilities including (i) a partial oxidation (POX) facility 50; (ii) a pyrolysis facility 60; (iii) a cracking facility 70; (iv) an energy recovery facility 80; and (v) a liquification zone 40, as discussed in further detail herein.

In an embodiment or in combination with any embodiment mentioned herein, the feed stream 112 introduced into the solvolysis facility 30 may comprise waste automotive carpet material, alone or in combination with other waste plastic. For example, the feed stream 112 may comprise at least 1, at least 5, at least 10, at least 15, at least 20, at least 25, or at least 30 and/or less than 50, less than 45, less than 40, less than 35, less than 30, less than 25, less than 20, less than 15, less than 10, less than 5, or less than 2 weight percent of waste automotive carpet material, based on the total weight of said feed stream 112, or it can include waste automotive carpet material in an amount in the range of from 1 to 50 weight percent, 5 to 40 weight percent, or 10 to 30 weight percent, based on the total weight of the stream.

Alternatively, the feed stream may comprise at least 50, at least 55, at least 60, at least 65, at least 70, at least 75, at least 80, at least 85, at least 90, or at least 95 and/or not more than 99, not more than 95, not more than 90, not more than 85, not more than 80, not more than 75, not more than 70, not more than 65, or not more than 60 weight percent of waste automotive carpet material, based on the total weight of the feed stream 112, or the feed stream can include waste automotive carpet material in an amount in the range of from 50 to 99 weight percent, 55 to 95 weight percent, or 60 to 90 weight percent, based on the total weight of the stream 112.

Automotive carpet material may be formed from or comprise predominantly polyester materials. It can, for example, comprise at least 50, at least 55, at least 60, at least 65, at least 70, at least 75, at least 80, at least 85, at least 90, at least 95, or at least 99 weight percent of polyester, based on the total weight of the waste automotive carpet material. The polyester could be or comprise PET and, may optionally include PET modified with one or more other diacids and/or glycols. Examples of modifying diacids and glycols can include, but are not limited to, isophthalic acid, adipic acid, 1,4-cyclohexanedicarboxylic acid, diethylene glycol, neopentyl glycol, and 1,4-cyclohexanedimethanol, as well as any other modifying diacids and glycols mentioned herein.

Unlike non-automotive carpet (e.g., consumer or industrial carpet), which may include other polymeric components such as nylon and polyolefins, waste automotive carpet may comprise not more than not more than 25, not more than 20, not more than 15, not more than 10, not more than 8, not more than 5, not more than 4.5, not more than 4, not more than 3.5, not more than 3, not more than 2.5, not more than 2, not more than 1.5, not more than 1, not more than 0.75, not more than 0.5, not more than 0.25, or not more than 0.1 weight percent of non-polyester components, based on the total weight of the feed stream. Such non-polyester components (polymers) can include, but are not limited to, at least one of polyamides, polyolefins, acrylics, cellulose acetate, and natural materials. Specific examples include nylon 6, nylon 6,6, polypropylene, polyethylene, poly(ethylene-co-vinyl acetate), wool, and cotton.

Additionally, the waste automotive carpet material may include one or more additional fillers and/or additives. For example, the waste automotive carpet material may comprise at least 0.01, at least 0.05, at least 0.10, at least 0.50, at least 0.75, at least 1, at least 1.25, at least 1.5, at least 1.75, or at least 2 and/or not more than 15, not more than 12, not more than 10, not more than 8, not more than 5, not more than 4.5, not more than 4, not more than 3.5, not more than 3, not more than 2.5, not more than 2, not more than 1.5, not more than 1, not more than 0.75, or not more than 0.50 weight percent of one or more fillers, based on the total weight of the waste automotive carpet material. Such fillers may include any suitable inert solids and can, for example, include calcium carbonate, barium sulfate, titanium dioxide, metal-based inerts, and combinations thereof.

Additionally, the waste automotive carpet material may include other additives such as dyes, antioxidants, stabilizers, colorants, odorants, adhesion promoters, lubricants, and combinations thereof. For example, the waste automotive carpet material can include carbon black in an amount of 0.01, at least 0.05, at least 0.10, at least 0.50, at least 0.75, at least 1, at least 1.25, at least 1.5, at least 1.75, or at least 2 and/or not more than 15, not more than 12, not more than 10, not more than 8, not more than 5, not more than 4.5, not more than 4, not more than 3.5, not more than 3, not more than 2.5, not more than 2, not more than 1.5, not more than 1, not more than 0.75, or not more than 0.50 weight percent, based on the total weight of the waste automotive carpet, or it could be present in an amount in the range of from 0.01 to 15 weight percent, 0.05 to 10 weight percent, or 0.50 to 5 weight percent, based on the total weight of the waste automotive carpet.

In an embodiment or in combination with any embodiment mentioned herein, the waste automotive carpet may also include at least one halogen or residues of at least one material comprising a halogen. Such a component can be present in an amount of at least 0.01, at least 0.05, at least 0.10, at least 0.50, at least 0.75, at least 1, at least 1.25, at least 1.5, at least 1.75, or at least 2 and/or not more than 5, not more than 4.5, not more than 4, not more than 3.5, not more than 3, not more than 2.5, not more than 2, not more than 1.5, not more than 1, not more than 0.75, or not more than 0.50 weight percent, based on the total weight of the waste automotive carpet, or it could be present in an amount in the range of from 0.01 to 5 weight percent, 0.05 to 2.5 weight percent, or 0.50 to 1 weight percent, based on the total weight of the waste automotive carpet.

Further, the waste automotive carpet material may comprise adhesives such as those used for adhering the carpet tufts to its backing. In one or more embodiments, the waste automotive carpet material can comprise at least 0.1, at least 0.5, at least 1, at least 2, at least 3, at least 4, at least 5 and/or not more than 15, not more than 12, not more than 10, not more than 8, not more than 6, not more than 5, not more than 4, not more than 3, not more than 2, or not more than 1 weight percent of an adhesive material, based on the total weight of the waste automotive carpet material in the feed stream 112, or it can include adhesive material in an amount in the range of from 0.1 to 15 weight percent, 0.5 to 12 weight percent, or 1 to 10 weight percent, based on the total weight of the waste automotive carpet material in the feed stream 112.

Additionally, or in the alternative, the waste automotive carpet material 112 may comprise material from carpet tufts, carpet backing, and combinations thereof. The material itself can be in the form of fibers or it may be densified to provide a densified waste automotive carpet material. As used herein, the term "densified" refers to a material that has undergone one or more processing steps to increase its bulk density to at least 0.20 $g/cm^3$. In an embodiment or in combination with any embodiment mentioned herein, the bulk density of the densified automotive carpet material can be at least 0.22, at least 0.25, at least 0.27, at least 0.30, at least 0.32, or at least 0.35 $g/cm^3$ and/or not more than 0.50, not more than 0.47, not more than 0.45, not more than 0.42, not more than 0.40, or not more than 0.37 $g/cm^3$, or it can be in the range of from 0.20 to 0.50 $g/cm^3$, 0.22 to 0.47 $g/cm^3$, or 0.27 to 0.45 $g/cm^3$.

The densified carpet material may have undergone one or more processing steps including, for example, cutting, chopping or other size reduction, separation of two or more different types of components, heating (and optionally melting), and pelletizing or solidifying. The densified waste automotive carpet material can comprise particulates, pellets, granules, chunks, or particles having a D90 particle size of at least 0.1, at least 0.5, at least 1, at least 1.5, at least 2, at least 2.5, at least 3, at least 3.5, at least 4, at least 4.5, or at least 5 mm and/or not more than 10, not more than 8, not more than 6, not more than 5, not more than 3, not more than 2, not more than 1, or not more than 0.5 mm, or it can be in the range of from 0.1 to 10 mm, 0.5 to 8 mm, or 1 to 6 mm. Typically, the densified waste automotive carpet materials can include not more than 20, not more than 15, not more than 10, not more than 5, not more than 3, not more than 2, not more than 1, or not more than 0.5 weight percent of carpet fibers, based on the total weight of the densified waste automotive carpet materials.

In an embodiment or in combination with any embodiment mentioned herein, the waste automotive carpet in the feed stream 112 to the solvolysis facility 30 can include pre-consumer and/or post-consumer waste automotive carpet. For example, at least 5, at least 10, at least 15, at least 20, at least 25, at least 30, at least 35, at least 40, at least 45, at least 50, at least 55, at least 60, at least 65, at least 70, at least 75, at least 80, at least 85, or at least 90 and/or not more than 99, not more than 95, not more than 90, not more than 85, not more than 80, not more than 75, not more than 70, not more than 65, not more than 60, not more than 55, not more than 50, not more than 45, not more than 40, or not more than 35 weight percent of the waste automotive carpet can be pre-consumer, based on the total weight of the waste automotive carpet in the feed stream 112, or it can be present in an amount of from 5 to 99 weight percent, 10 to 90 weight percent, or 25 to 75 weight percent, based on the total weight of the waste automotive carpet in the feed stream 112. Examples of pre-consumer waste automotive carpet can include carpet scraps produced during the manufacture of new vehicles.

Additionally, or in the alternative, at least 5, at least 10, at least 15, at least 20, at least 25, at least 30, at least 35, at least 40, at least 45, at least 50, at least 55, at least 60, at least 65, at least 70, at least 75, at least 80, at least 85, or at least 90 and/or not more than 99, not more than 95, not more than 90, not more than 85, not more than 80, not more than 75, not more than 70, not more than 65, not more than 60, not more than 55, not more than 50, not more than 45, not more than 40, or not more than 35 weight percent of said waste automotive carpet can be post-consumer, based on the total weight of the waste automotive carpet in the feed stream 112, or it can be present in an amount of from 5 to 99 weight percent, 10 to 90 weight percent, or 25 to 75 weight percent, based on the total weight of the waste automotive carpet in the feed stream 112. Examples of post-consumer waste automotive carpet can include carpet (and/or carpet mats) removed from a vehicle at the end of its useful life.

Turning again to FIG. 3, the feed stream in line 112, after being combined with a stream of solvent 212 in blending zone 206, may first be passed through an optional non-PET separation zone 208, wherein at least 50, at least 55, at least 60, at least 65, at least 70, at least 75, at least 80, at least 85, at least 90, or at least 95 weight percent of the total weight of components other than PET are separated out of the stream. The non-PET components may have a boiling point lower than PET and may be removed from the zone 208 as a vapor. Alternatively, or in addition, at least a portion of the non-PET components may have a slightly higher or lower density than PET and may be separated out by forming a two-phase (or multi-phase) liquid stream, then removing one or both non-PET phases. Finally, in some embodiments, the non-PET components may be separated out as solids from a PET-containing liquid phase.

In an embodiment or in combination with any embodiment mentioned herein, at least 50, at least 55, at least 60, at least 65, at least 70, at least 75, at least 80, at least 85, at least 90, or at least 95 percent of the non-PET components separated from the PET-containing stream comprise polyolefins such as polyethylene and/or polypropylene. As indicated generally by the dashed lines in FIG. 3, all or a part of the non-PET separation zone 208 may be upstream of the reaction zone 210, while all or a part of the non-PET separation zone 208 may be downstream of the reaction zone 210. Separation techniques such as extraction, solid/liquid separation, decanting, cyclone or centrifugal separation, manual removal, magnetic removal, eddy current removal, chemical degradation, vaporization and degassing, distillation, and combinations thereof may be used to separate the non-PET components from the PET-containing stream in the non-PET separation zone 208.

As shown in FIG. 3, the PET-containing stream 138 exiting the non-PET separation zone 208 may comprise not more than 25, not more than 20, not more than 15, not more than 10, not more than 5, not more than 2, not more than 1, or not more than 0.5 weight percent of components other than the PET (or its oligomeric and monomeric degradation products) and solvent, based on the total weight of the PET-containing stream. The PET-containing stream 138 exiting the non-PET separation zone 208 may comprise not more than 25, not more than 20, not more than 15, not more than 10, not more than 5, not more than 2, or not more than 1 weight percent of other types of plastics (such as polyolefins). The PET-containing stream 138 exiting the non-PET separation zone 208 may include not more than 45, not more than 40, not more than 35, not more than 30, not more than 25, not more than 20, not more than 10, not more than 5, or not more than 2 weight percent of the total amount of non-PET components introduced into the non-PET separation zone 208.

The non-PET components may be removed from the solvolysis (or methanolysis) facility 30 as generally shown in FIG. 3 as a polyolefin-containing coproduct stream 140. The polyolefin-containing coproduct stream (or decanter olefin coproduct stream) 140 may comprise at least 35, at least 40, at least 45, at least 50, at least 55, at least 60, at least 65, at least 70, at least 75, at least 80, at least 85, at least 90, at least 92, at least 95, at least 97, at least 99, or at least 99.5 weight percent of polyolefin, based on the total weight of the coproduct stream 140.

The polyolefin present in the polyolefin-containing coproduct stream may comprise predominantly polyethylene, predominantly polypropylene, or a combination of polyethylene and polypropylene. The polyolefin in the polyolefin-containing coproduct stream comprises at least 70, at least 75, at least 80, at least 85, at least 90, at least 92, at least 94, at least 95, at least 97, at least 98, or at least 99 weight percent of polyethylene, based on the total weight of the polyolefin in the polyolefin-containing coproduct stream 140. Alternatively, the polyolefin in the polyolefin-containing coproduct stream comprises at least 70, at least 75, at least 80, at least 85, at least 90, at least 92, at least 94, at least 95, at least 97, at least 98, or at least 99 weight percent of polypropylene, based on the total weight of the polyolefin in the polyolefin-containing coproduct stream 140.

The polyolefin-containing coproduct stream comprises not more than 10, not more than 5, not more than 2, not more than 1, not more than 0.75, not more than 0.50, not more than 0.25, not more than 0.10, or not more than 0.05 weight percent of PET, based on the total weight of the polyolefin-containing coproduct stream 140. Additionally, the polyolefin-containing coproduct stream comprises at least 0.01, at least 0.05, at least 0.10, at least 0.50, at least 1, or at least 1.5 and/or not more than 40, not more than 35, not more than 30, not more than 25, not more than 20, not more than 15, not more than 10, not more than 5, or not more than 2 weight percent of components other than polyolefin, based on the total weight of the polyolefin-containing coproduct stream 140.

Overall, the polyolefin-containing coproduct stream 140 comprises at least 40, at least 45, at least 50, at least 55, at least 60, at least 65, at least 70, at least 75, at least 80, at least 85, at least 90, at least 95, or at least 99 weight percent of organic compounds, based on the total weight of the polyolefin-containing coproduct stream 140. The polyolefin-containing coproduct stream 140 can include at least 0.5, at least 1, at least 2, at least 3, at least 5, at least 10, or at least 15 and/or not more than 40, not more than 35, not more than 30, not more than 25, not more than 20, not more than 15, not more than 10, not more than 5, not more than 2, or not more than 1 weight percent of inorganic components, based on the total weight of the polyolefin-containing coproduct stream 140.

In an embodiment or in combination with any embodiments mentioned herein, the polyolefin-containing coproduct stream can have a viscosity of at least 1, at least 10, at least 25, at least 50, at least 75, at least 90, at least 100, at least 125, at least 150, at least 200, at least 250, at least 300, at least 350, at least 400, at least 450, at least 500, at least 550, at least 600, at least 650, at least 700, at least 750, at least 800, at least 850, at least 900, or at least 950 poise and/or not more than 25,000, not more than 24,000, not more than 23,000, not more than 22,000, not more than 21,000, not more than 20,000, not more than 19,000, not more than 18,000, not more than 17,000, not more than 16,000, not more than 15,000, not more than 14,000, not more than 13,000, not more than 12,000, not more than 11,000, not more than 10,000, not more than 9000, not more than 8000, not more than 7000, not more than 6000, not more than 5000, not more than 4500, not more than 4000, not more than 3500, not more than 3000, not more than 2500, not more than 2000, not more than 1750, not more than 1500, not more than 1250, not more than 1200, not more than 1150, not more than 1100, not more than 1050, not more than 1000, not more than 950, not more than 900, not more than 800, not more than 750 poise, measured using a Brookfield R/S rheometer with V80-40 vane spindle operating at a shear rate of 10 rad/s and a temperature of 250° C. The polyolefin-containing coproduct stream can have a viscosity in the range of from 1 to 25,000 poise, 100 to 10,000 poise, or 1000 to 5000 poise, measured at 10 rad/s and 250° C.

The polyolefin-containing coproduct stream can comprise at least 0.1, at least 0.5, at least 1, at least 1.5, at least 2, at least 2.5, at least 3, at least 3.5, at least 4, at least 4.5, at least 5, at least 8, at least 10, at least 12, at least 15, at least 18, at least 20, at least 22, or at least 25 weight percent and/or not more than 50, not more than 45, not more than 40, not more than 35, not more than 30, not more than 25, not more than 20, not more than 15, not more than 10, not more than 5, or not more than 2 weight percent of one or more non-reactive solids, based on the total weight of the polyolefin-containing coproduct stream 140. Non-reactive solids refer to solid components that do not chemically react with PET. Examples of non-reactive solids include, but are not limited to, sand, dirt, glass, plastic fillers, and combinations thereof.

The polyolefin-containing coproduct stream 140 comprises at least 100, at least 250, at least 500, at least 750, at least 1000, at least 1500, at least 2000, at least 2500, at least 5000, at least 7500 ppm by weight or at least 1, at least 1.5, at least 2, at least 5, at least 10, at least 15, at least 20, or at least 25 weight percent) and/or not more than 50, not more than 45, not more than 40, not more than 35, not more than 30, not more than 25, not more than 20, not more than 15, not more than 10, not more than 5, not more than 2, or not more than 1 weight percent of one or more fillers, based on the total weight of the polyolefin-coproduct stream 140. The polyolefin-containing coproduct stream 140 can include fillers in an amount of 100 ppm to 50 weight percent, 500 ppm to 10 weight percent, or 1000 ppm to 5 weight percent.

Examples of fillers can include, but are not limited to, thixotropic agents such as fumes silica and clay (kaolin), pigments, colorants, fire retardants such as alumina trihydrate, bromine, chlorine, borate, and phosphorous, suppressants such as wax based materials, UV inhibitors or stabilizers, conductive additives such as metal particles, carbon particles, or conductive fibers, release agents such as zinc stearate, waxes, and silicones, calcium carbonate, and calcium sulfate.

In an embodiment or in combination with any embodiment mentioned herein, the polyolefin-containing coproduct stream 140 can have a density of at least 0.75, at least 0.80, at least 0.85, at least 0.90, at least 0.95, at least 0.99 and/or not more than 1.5, not more than 1.4, not more than 1.3, not more than 1.2, not more than 1.1, not more than 1.05, or not more than 1.01 g/cm$^3$, measured at a temperature of 25° C. The density can be from 0.80 to 1.4, from 0.90 to 1.2, or 0.95 to 1.1 g/cm$^3$. When removed from the non-PET separation zone 208, the polyolefin-containing coproduct stream 140 may have a temperature of at least 200, at least 205, at least 210, at least 215, at least 220, at least 225, at least 230, or at least 235° C. and/or not more than 350, not more than 340, not more than 335, not more than 330, not more than 325, not more than 320, not more than 315, not more than 310, not more than 305, or not more than 300° C. The polyolefin-containing coproduct stream 140 can comprise at least 50, at least 55, at least 60, at least 65, at least 70, at least 75, at least 80, at least 85, at least 90, or at least 95 weight percent of components boiling higher than the principal terephthalyl or DMT, based on the total weight of the stream.

As generally shown in FIGS. 1*a* and 1*b* and discussed in further detail herein, all or a portion of the polyolefin-containing coproduct stream may be introduced into one or more downstream chemical recycling facilities alone or in combination with one or more other coproduct streams, streams resulting from one or more of the other downstream chemical recycling facilities, and/or streams of waste plastic, including mixed plastic waste that is unprocessed, partially processed, and/or processed.

In an embodiment or in combination with any embodiment mentioned herein, when the feed stream 112 to the solvolysis facility 30 shown in FIG. 3 includes waste automotive carpet material, the solvolysis facility 30 can further comprise a filter located upstream and/or downstream of the solvolysis reactor. This filter may be present, for example, in the non-PET separation zone 208 located upstream and/or downstream of the reactor 210. The filter may be any suitable filter for removing at least a portion of the inorganic material present in the feed stream 112 to the reactor 210.

In an embodiment or in combination with any embodiment mentioned herein, a predominantly liquid stream 112 from an upstream liquification zone (such as, for example, blending vessel 206 shown in FIG. 3) may be passed through the filter prior to being introduced into the solvolysis facility 30. The feed stream to the solvolysis facility (which may include a predominantly liquified stream from the liquification zone and/or solid waste plastic) may be combined with a solvent to form a solvolysis reactor feed stream, which may then be introduced into the solvolysis reactor 210. In an embodiment or in combination with any embodiment mentioned herein, the filter may be located downstream of the reactor 210 and can filter at least one predominantly liquid stream withdrawn from the reactor 210. Such streams can include, for example, a reactor stream 141 passed from the reactor 210 back to the blending vessel 206.

When present, the filter can remove at least 50, at least 55, at least 60, at least 65, at least 70, at least 75, at least 80, at least 85, at least 90, or at least 95 percent by weight of the inorganic material in the stream introduced into said filter. Although the stream introduced into the filter may include inorganic materials in an amount of at least 1, at least 2, at least 3, at least 5, at least 8, at least 10, at least 12, at least 15, at least 18, or at least 20 and/or not more than 50, not more than 45, not more than 40, not more than 35, not more than 30, not more than 25, not more than 20, not more than 15, or not more than 10 weight percent, based on the total weight of said predominantly liquid stream 112 introduced into said filter. The stream removed from the filter may include not more than 10, not more than 8, not more than 6, not more than 5, not more than 3, not more than 2, not more than 1, not more than 0.5, not more than 0.1, or not more than 0.05 weight percent of inorganic materials, based on the total weight of said predominantly liquid stream exiting the filter. Such a filter may be used when, for example, the amount of waste automotive carpet material in the feed to the solvolysis facility is greater than 35, greater than 40, greater than 45, greater than 50, greater than 55, greater than 60, greater than 65, greater than 70, or greater than 75 weight percent, based on the total weight of the feed stream to the chemical recycling facility 10.

Turning again to FIG. 3, the PET-containing stream 138 (which comprises dissolved PET as well as its degradation products) exiting the non-PET separation zone 208 (upstream of the reaction zone 210) may then be transferred to a reaction zone 210, wherein at least 50, at least 55, at least 60, at least 65, at least 70, at least 75, at least 80, at least 85, at least 90, or at least 95 percent of the decomposition of the PET introduced into the reaction zone occurs. In some embodiments, the reaction medium within reaction zone 210 may be agitated or stirred and one or more temperature control devices (such as heat exchangers) may be employed to maintain a target reaction temperature. In an embodiment or in combination with any embodiment mentioned herein, the target reaction temperature in the reaction zone 210 can be at least 50, at least 55, at least 60, at least 65, at least 70, at least 75, at least 80, or at least 85° C. and/or not more than 350, not more than 345, not more than 340, not more than 335, not more than 330, not more than 325, not more than 320, not more than 315, not more than 310, not more than 300, or not more than 295° C., or it can be in the range of from 50 to 350° C., 65 to 345° C., or 85 to 335° C.

In an embodiment or in combination with any embodiment mentioned herein, the solvolysis process can be a low-pressure solvolysis process and the pressure in the solvolysis reactor (or reaction zone) 210 can be within 5, within 10, within 15, within 20, within 25, within 30, within 35, within 40, within 45, or within 50 psi of atmospheric, or it may be within 55, within 75, within 90, within 100, within 125, within 150, within 200, or within 250 psi of atmospheric. The pressure in the solvolysis reactor (or reaction zone) 210 can be within 0.35, within 0.70, within 1, within 1.4, within 1.75, within 2, within 2.5, within 2.75, within 3, within 3.5, within 3.75, within 5, or within 6.25 bar gauge (bar) and/or not more than 6.9, not more than 8.6, or not more than 10.35 bar of atmospheric. The pressure in the solvolysis reactor (or reaction zone) 210 can be at least 100 psig (6.7 barg), at least 150 psig (10.3 barg), at least 200 psig (13.8 barg), at least 250 psig (17.2 barg), at least 300 psig (20.7 barg), at least 350 psig (24.1 barg), at least 400 psig (27.5 barg) and/or not more than 725 psig (50 barg), not more than 650 psig (44.7 barg), not more than 600 psig (41.3 barg), not more than 550 psig (37.8 barg), not more than 500 psig (34.5 barg), not more than 450 psig (31 barg), not more than 400 psig (27.6 barg), or not more than 350 psig (24.1 barg).

In an embodiment or in combination with any embodiment mentioned herein, the solvolysis process carried out in reaction zone 210 or facility 30 can be a high-pressure solvolysis process and the pressure in the solvolysis reactor can be at least 50 barg (725 psig), at least 70 barg (1015 psig), at least 75 barg (1088 psig), at least 80 barg (1161 psig), at least 85 barg (1233 psig), at least 90 barg (1307 psig), at least 95 barg (1378 psig), at least 100 barg (1451 psig), at least 110 barg (1596 psig), at least 120 barg (1741 psig), or at least 125 barg (1814 psig) and/or not more than 150 barg (2177 barg), not more than 145 barg (2104 psig), not more than 140 barg (2032 psig), not more than 135 barg (1959 psig), not more than 130 barg (1886 psig), or not more than 125 barg (1814 psig).

In an embodiment or in combination with any embodiment mentioned herein, the average residence time of the reaction medium in the reaction zone 210 can be at least 1, at least 2, at least 5, at least 10, or at least 15 minutes and/or not more than 12, not more than 11, not more than 10, not more than 9, not more than 8, not more than 7, not more than 6, not more than 5, or not more than 4 hours. At least 50, at least 55, at least 60, at least 65, at least 70, at least 75, at least 80, at least 85, at least 90, at least 95, or at least 99 percent of the total weight of PET introduced into the solvolysis or methanolysis facility 30 can be decomposed upon leaving the reaction zone 210 in the reactor effluent stream 144.

In an embodiment or in combination with any embodiment mentioned herein, a reactor purge stream 142 may be removed from the reaction zone 210 and at least a portion may be passed to one or more downstream facilities within the chemical recycling facility 10 as a reactor purge coproduct stream 142. The reactor purge coproduct stream 142 may have a boiling point higher than the boiling point of the principal terephthalyl (or DMT in the case or methanolysis) produced from the solvolysis facility 30.

In an embodiment or in combination with any embodiment mentioned herein, the reactor purge coproduct stream 142 comprises at least 25, at least 30, at least 35, at least 40, at least 45, at least 50, at least 55, at least 60, at least 65, at least 70, at least 75, at least 80, at least 85, at least 90, at least 95, or at least 99 weight percent of the principal terephthalyl, based on the total weight of the stream 142. When the solvolysis facility is a methanolysis facility, the reactor purge coproduct stream 142 may comprise at least 1, at least 5, at least 10, at least 15, at least 20, at least 25, at least 30, at least 35, at least 40, at least 45, at least 50, at least 55, at least 60, at least 65, at least 70, at least 75, at least 80, at least 85, at least 90, at least 95, or at least 99 weight percent of DMT, based on the total weight of the stream 142.

In addition, the reactor purge coproduct stream 142 may include at least 100 ppm and not more than 25 weight percent of one or more non-terephthalyl solids, based on the total weight of the stream 142. In an embodiment or in combination with any embodiment mentioned herein, the total amount of non-terephthalyl solids in the reactor purge coproduct stream 142 can be at least 150, at least 200, at least 250, at least 300, at least 350, at least 400, at least 500, at least 600, at least 700, at least 800, at least 900, at least 1000, at least 1500, at least 2000, at least 2500, at least 3000, at least 3500, at least 4000, at least 4500, at least 5000, at least 5500, at least 6000, at least 7000, at least 8000, at least 9000, at least 10,000, or at least 12,500 ppm and/or not more than 25, not more than 22, not more than 20, not more than 18, not more than 15, not more than 12, not more than 10, not more than 8, not more than 5, not more than 3, not more than 2, or not more than 1 weight percent, based on the total weight of the stream.

In an embodiment or in combination with any embodiment mentioned herein, the reactor purge coproduct stream 142 has a total solids content of at least 100, at least 250, at least 500, at least 750, at least 1000, at least 1500, at least 2000, at least 2500, at least 3000, at least 3500, at least 4000, at least 4500, at least 5000, at least 5500, at least 6000, at least 6500, at least 7000, at least 7500, at least 8000, at least 8500, at least 9000, at least 9500 ppm by weight or at least 1, at least 2, at least 5, at least 8, at least 10, or at least 12 weight percent and/or not more than 25, not more than 22, not more than 20, not more than 17, not more than 15, not more than 12, not more than 10, not more than 8, not more than 6, not more than 5, not more than 3, not more than 2, or not more than 1 weight percent or not more than 7500, not more than 5000, or not more than 2500 ppm by weight, based on the total weight of the stream.

Examples of solids can include, but are not limited to, non-volatile catalyst compounds. In an embodiment or in combination with any embodiment mentioned herein, the reactor purge coproduct stream can include at least 100, at least 250, at least 500, at least 750, at least 1000, at least 1500, at least 2000, at least 2500, at least 3000, at least 3500, at least 4000, at least 4500, at least 5000, at least 7500, at least 10,000, or at least 12,500 ppm and/or not more than 60,000, not more than 50,000, not more than 40,000, not more than 35,000, not more than 30,000, not more than 25,000, not more than 20,000, not more than 15,000, or not more than 10,000 ppm of non-volatile catalyst metals.

Examples of suitable non-volatile catalyst metals can include, but are not limited to, titanium, zinc, manganese, lithium, magnesium, sodium, methoxide, alkali metals, alkaline earth metals, tin, residual esterification or ester exchange catalysts, residual polycondensation catalysts, aluminum, depolymerization catalysts, and combinations thereof. As discussed in further detail herein, all or a portion of the reactor purge coproduct stream 142 may be introduced into one or more downstream chemical recycling facilities alone or in combination with one or more other coproduct streams, streams resulting from one or more of the other downstream chemical recycling facilities, and/or streams of waste plastic, including mixed plastic waste that is unprocessed, partially processed, and/or processed.

The reactor purge coproduct stream 142 can comprise not more than 25, not more than 20, not more than 15, not more than 10, not more than 5, not more than 2, or not more than 1 weight percent of components with a boiling point higher than the boiling point of DMT (or other terephthalyl). Additionally, or in the alternative, the reactor purge coproduct stream 142 can have a melting temperature of at least 5, at least 10, at least 15, at least 20, or at least 25° C. and/or not more than 50, not more than 45, not more than 40, not more than 35, not more than 30, not more than 25, not more than 20, or not more than 15° C. lower than the temperature of the reactor, or the melting temperature of the coproduct stream 142 can be lower than the reactor temperature by an amount in the range of from 5 to 50° C., 10 to 45° C., or 10 to 40° C.

The temperature of the reactor purge coproduct stream 142 when withdrawn from the reaction zone and/or when introduced into one or more of the downstream facilities can be at least 130, at least 135, at least 140, at least 145, at least 150, at least 155, at least 160, at least 165, at least 170, at least 175, at least 180, at least 185, at least 190, at least 195, at least 200, at least 205, at least 210, at least 215, at least 220, at least 225, at least 230, at least 245, at least 250, at least 255, at least 260, at least 265, at least 270, at least 275, at least 280, at least 285, at least 290, at least 295, at least 300, at least 325, or at least 350° C.

Additionally, or in the alternative, the temperature of the reactor purge coproduct stream 142 when withdrawn from the reaction zone and/or when introduced into one or more of the downstream facilities can be not more than 400, not more than 375, not more than 350, not more than 345, not more than 340, not more than 335, not more than 330, not more than 325, not more than 320, not more than 315, not more than 310, not more than 305, not more than 300, not more than 295, not more than 290, not more than 285, not more than 280, not more than 275, not more than 270, not more than 265, not more than 260, not more than 255, or not more than 250° C. When the reactor is purged, it may be done continuously or intermittently, and the resulting reactor purge coproduct stream may be introduced into one of the downstream facilities in a continuous or intermittent manner.

In an embodiment or in combination with any embodiment mentioned herein, as generally shown in FIG. 3, the effluent stream 144 from the reaction zone 210 in a solvolysis facility 30 may optionally be sent through a non-PET separation zone 208 located downstream of the reactor, as discussed previously. The resulting effluent stream 144 from the reactor or, when present, the non-PET separation zone 208, may be passed through a product separation zone 220, wherein at least 50, at least 55, at least 60, at least 65, at least 70, at least 75, at least 80, at least 85, at least 90, at least 95, or at least 99 weight percent of the heavy organic materials are separated from the feed stream 144 to form streams of predominantly light organic materials 146 and heavy organic materials 148. Any suitable method of separating such streams can be used and may include, for example, distillation, extraction, decanting, crystallization, membrane separation, solid/liquid separation such as, for example, filtration (e.g., a belt filter), and combinations thereof. The resulting heavy organic and light organic streams may be sent to downstream separation zones for further purification and/or recovery of desirable end products and of coproducts.

As shown in FIG. 3, the heavy organic stream 148 withdrawn from the product separation zone 220, which may include for example at least 55, at least 60, at least 65, at least 70, at least 75, at least 80, at least 85, at least 90, at least 95, or at least 99 weight percent of heavy organic components, based on the total weight of the stream, may be introduced into a heavy organics separation zone 240. In the heavy organics separation zone 240, a primary terephthalyl product stream 158 may be separated from a terephthalyl bottoms or "sludge" coproduct stream 160. Such separation may be accomplished by, for example, distillation, extraction, decantation, membrane separation, melt crystallization, zone refining, and combinations thereof. The result is a stream 158 comprising at least 50, at least 55, at least 60, at least 65, at least 70, at least 75, at least 80, at least 85, at least 90, at least 95, or at least 99 weight percent of the principal terephthalyl (or DMT), based on the total weight of the stream. In an embodiment or in combination with any embodiment mentioned herein, at least a portion or all of the primary terephthalyl can comprise recycle content terephthalyl (r-terephthalyl), such as recycle content DMT (r-DMT).

Also withdrawn from the heavy organics separation zone 240 is a terephthalyl bottoms coproduct stream (also called "terephthalyl column bottoms coproduct stream" or "terephthalyl sludge coproduct stream" or "terephthalyl dregs coproduct stream") coproduct stream 160 may also be removed from the heavy organics separation zone 240. When the solvolysis facility is a methanolysis facility, the stream can be referred to as a DMT bottoms coproduct stream, a DMT column bottoms coproduct stream, a DMT sludge coproduct stream, or a DMT dregs stream.

In an embodiment or in combination with any embodiment mentioned herein, this coproduct stream can include, for example, at least 60, at least 65, at least 70, at least 75, at least 80, at least 85, at least 90, at least 92, at least 95, at least 97, at least 98, at least 99, or at least 99.5 weight percent of oligomers comprising moieties of the polyester undergoing solvolysis, based on the total weight of the composition such as, for example, PET oligomers. As used herein, the terms "polyester moieties" or "moieties of polyester," refer to portions or residues of a polyester, or reaction products of the polyester portions or residues. These oligomers can have a number average chain length of at least 2, at least 3, at least 4, at least 5, at least 6, at least 7, or at least 8 monomer units (acid and glycol) and/or not more than 30, not more than 27, not more than 25, not more than 22, not more than 20, not more than 17, not more than 15, not more than 12, or not more than 10 monomer units (acid and glycol) and may include moieties of the polyester being processed (e.g., PET).

The terephthalyl column bottoms coproduct stream 160 can comprise at least 0.01, at least 0.05, at least 0.10, at least 0.50, at least 1, or at least 1.5 weight percent and/or not more than 40, not more than 35, not more than 30, not more than 25, not more than 20, not more than 15, not more than 10, not more than 5, or not more than 2 weight percent of components other than oligomer, based on the total weight of the stream. Such components can be present in an amount in the range of 0.01 to 40 weight percent, 0.05 to 35 weight percent, or 1.5 to 10 weight percent, based on the total weight of the stream.

In an embodiment or in combination with any embodiments mentioned herein, the oligomers further comprise moieties of at least one ester other than dimethyl terephthalate, at least one carboxylic acid other than terephthalic acid or DMT, and/or at least one glycol other than ethylene glycol. For example, the oligomers may further comprise moieties of one or more of diethylene glycol, triethylene glycol, 1,4-cyclohexane-dimethanol, propane-1,3-diol, butane-1,4-diol, pentane-1,5-diol, hexane-1,6-diol, neopentyl glycol, 3-methylpentanediol-(2,4), 2-methylpentanediol-(1,4), 2,2,4-trimethylpentane-diol-(1,3), 2-ethylhexanediol-(1,3), 2,2-diethylpropane-diol-(1,3), hexanediol-(1,3), 1,4-di-(hydroxyethoxy)-benzene, 2,2-bis-(4-hydroxycyclohexyl)-propane, 2,4-dihydroxy-1,1,3,3-tetramethyl-cyclobutane, 2,2,4,4 tetramethylcyclobutanediol, 2,2-bis-(3-hydroxyethoxyphenyl)-propane, 2,2-bis-(4-hydroxypropoxyphenyl)-propane, isosorbide, hydroquinone, BDS-(2,2-(sulfonylbis)4,1-phenyleneoxy))bis(ethanol), phthalic acid, isophthalic acid, naphthalene-2,6-dicarboxylic acid, cyclohexanedicarboxylic acid, cyclohexanediacetic acid, diphenyl-4,4'-dicarboxylic acid, dipheny-3,4'-dicarboxylic acid, neopentyl glycol, 1,4-cyclohexanedicarboxylic acid, succinic acid, glutaric acid, adipic acid, azelaic acid, sebacic acid, and combinations thereof. The terephthalyl bottoms coproduct stream may also comprise principal terephthalyl or, in the case of methanolysis, DMT, in an amount of at least 35, at least 40, at least 45, at least 50, at least 55, at least 60, at least 65, at least 70, at least 75, at least 80, at least 85, at least 90, or at least 95 weight percent and/or not more than 99, not more than 95, not more than 90, not more than 85, not more than 80, not more than 75, not more than 70, not more than 65, not more than 60, not more than 55, not more than 50, not more than 45, or not more than 40 weight percent, based on the total weight of the coproduct stream. Other examples of possible principal glycols (depending on the PET or other polymer being processed) may include, but are not limited to, diethylene glycol, neopentyl glycol, 1,4-cyclohexanedimethanol, and 2,2,4,4-tetramethyl-1,3-cyclobutanediol.

In an embodiment or in combination with any embodiment mentioned herein, the terephthalyl column bottoms (or the DMT column bottoms) coproduct stream 160 may comprise oligomers and at least one substituted terephthalyl component. As used herein, the term "substituted terephthalyl" refers to a terephthalyl component having at least one substituted atom or group. The terephthalyl column bottoms coproduct stream 160 can include at least 1, at least 100, at least 500 parts per billion by weight, or at least 1, at least 50, at least 1000, at least 2500, at least 5000, at least 7500, or at least 10,000 parts per million by weight, or at least 1, at least 2, or at least 5 weight percent and/or not more than 25, not more than 20, not more than 15, not more than 10, not more than 5, not more than 2, not more than 1, not more than 0.5, not more than 0.1, not more than 0.05, or not more than 0.01 weight percent of substituted terephthalyl components, based on the total weight of the terephthalyl column bottoms coproduct stream 160.

As discussed in further detail herein, all or a portion of the terephthalyl column bottoms coproduct stream 160 may be introduced into one or more downstream chemical recycling facilities alone or in combination with one or more other coproduct streams, streams resulting from one or more of the other downstream chemical recycling facilities, and/or streams of waste plastic, including mixed waste plastic that is unprocessed, partially processed, and/or processed.

Referring again to FIG. 3, the predominantly light organics stream 146 from the product separation zone 220 may be introduced into a light organics separation zone 230. In the light organics separation zone 230, the stream 146 may be separated to remove the principal solvent (e.g., methanol in methanolysis) and to separate out the principal glycol (e.g., ethylene glycol in methanolysis) from an organic coproduct (or coproducts) lighter than and heavier than the principal glycol.

In an embodiment or in combination with any embodiment mentioned herein, a solvent stream 150 withdrawn from the light organics separation zone 230 can include at least 50, at least 55, at least 60, at least 65, at least 70, at least 75, at least 80, at least 85, at least 90, at least 95, or at least 99 weight percent of the principal solvent, based on the total weight of the stream 150. When the solvolysis facility 30 is a methanolysis facility, this stream 150 may comprise at least 50, at least 55, at least 60, at least 65, at least 70, at least 75, at least 80, at least 85, at least 90, at least 95, or at least 99 weight percent of methanol, based on the total weight of the stream. All or a portion of the stream may be recycled back to one or more locations within the solvolysis facility for further use.

In an embodiment or in combination with any embodiment mentioned herein, at least one light organics solvolysis coproduct stream 152 (also referred to as a "light organics" stream) can also be withdrawn from the light organics separation zone 230 and may include at least 40, at least 45, at least 50, at least 55, at least 60, at least 65, at least 70, at least 75, at least 80, at least 85, at least 90, or at least 95 weight percent of components with a boiling point lower than the boiling point of the principal terephthalyl (or DMT) that are not the principal glycol (or ethylene glycol) or the principal solvent (or methanol). Additionally, or in the alternative, the coproduct stream can comprise not more than 60, not more than 55, not more than 50, not more than 45, not more than 40, not more than 35, not more than 30, not more than 25, not more than 20, not more than 15, not more than 10, not more than 5, not more than 3, not more than 2, not more than 1 weight percent of components with a boiling point higher than the boiling point of DMT and the stream 152 itself can have a boiling point lower than the boiling point of the principal terephthalyl (or DMT).

In an embodiment or in combination with any embodiment mentioned herein, the light organics coproduct stream can comprise at least 5, at least 10, at least 15, at least 20, at least 25, at least 30, at least 35, at least 40, at least 45, at least 50, at least 55, at least 60, at least 65, at least 70, at least 75, at least 80, at least 85, or at least 90 weight percent of components having a boiling point lower than the boiling point of the principal glycol (or, if methanolysis of PET, lower than ethylene glycol).

In an embodiment or in combination with any embodiment mentioned herein, a light organics solvolysis coproduct stream 152 may be produced in the solvolysis facility that comprises the principal solvent (e.g., methanol). For example, the light organics coproduct stream 152 can include at least 2, at least 5, at least 10, at least 15, at least 20, at least 25, at least 30, at least 35, at least 40, at least 45, at least 50, or at least 55 weight percent and/or not more than 90, not more than 85, not more than 80, not more than 75, not more than 70, not more than 65, not more than 60, not more than 55, not more than 50, not more than 45, not more than 40, not more than 35, or not more than 30 weight percent of the principal solvent.

In addition, this coproduct stream 152 may also include acetaldehyde in an amount of at least 1, at least 5, at least 10, at least 50, at least 100, at least 250, at least 500, at least 750, or at least 1000 ppm and/or not more than 90, not more than 85, not more than 80, not more than 75, not more than 70, not more than 65, not more than 60, not more than 55, not more than 50, not more than 45, not more than 40, not more than 35, not more than 30, not more than 25, not more than 20, not more than 15, not more than 10, not more than 5, not more than 3, not more than 2, not more than 1, not more than 0.5, not more than 0.1, or not more than 0.05 weight percent, based on the total weight of the coproduct stream, or the acetaldehyde can be present in an amount of 1 ppm to 50 weight percent, 50 ppm to 0.5 weight percent, or 100 ppm to 0.05 weight percent, based on the total weight of the coproduct stream.

Further, the light organics coproduct stream 152 may also include para-dioxane (or p-dioxane) in amount of at least 1, at least 5, at least 10, at least 50, at least 100, at least 250, at least 500, at least 750, or at least 1000 ppm and/or not more than 60, not more than 55, not more than 50, not more than 45, not more than 40, not more than 35, not more than 30, not more than 25, not more than 20, not more than 15, not more than 10, not more than 5, not more than 3, not more than 2, not more than 1, not more than 0.5, not more than 0.1, or not more than 0.05 weight percent, based on the total weight of the coproduct stream, or the p-dioxane can be present in an amount of 1 ppm to 50 weight percent, 50 ppm to 0.5 weight percent, or 100 ppm to 0.05 weight percent, based on the total weight of the coproduct stream.

This light organics coproduct stream 152 may further include at least one additional component selected from the group consisting of tetrahydrofuran (THF), methyl acetate, silicates, 2,5-methyl dioxolane, 1,4-cyclohexanedimethanol, 2-ethyl-1-hexanol, 2,2,4,4,-tetramethyl-1,3-cyclobutanediol, 2,2,4-trimethyl-3-pentenal, 2,2,4-trimethyl-3-pentenol, 2,2,4-trimethylpentane, 2,4-dimethyl-3-pentanone (DIPK), isobutyl isobutyrate, methyl formate, n-butanol, acetic acid, dibutyl ether, heptane, dibutyl terephthalate, dimethyl phthalate, dimethyl 1,4-cyclohexanedicarboxylate, 2-methoxyethanol, 2-methyl-1,3-dioxolane, 1,1-dimethoxy-2-butene, 1,1-dimethoxyethane, 1,3-propanediol, 2,5-dimethyl-1,3,5-hexadiene, 2,5-dimethyl-2,4-hexadiene, alpha-methyl styrene, diethylene glycol methyl ether, diethylene glycol formal, dimethoxydimethyl silane, dimethyl ether, diisopropyl ketone, EG benzoate, hexamethylcyclotrisiloxane, hexamethyldisiloxane, methoxytrimethylsilane, methyl 4-ethylbenzoate, methyl caprylate, methyl glycolate, methyl lactate, methyl laurate, methyl methoxyethyl terephthalic acid, methyl nonanoate, methyl oleate, methyl palmitate, methyl stearate, methyl-4-acetyl benzoate, octamethylcyclotetrasiloxane, styrene, trimethylsilanol, 1,1-dimethyoxy-2-butene, 4-methyl morpholine, 1,3,3-trimethoxypropane, methyl myristate, dimethyl adipate, n-methyl-caprolactam, dimethyl azelate, neopentyl glycol, and combinations thereof.

In an embodiment or in combination with any embodiment mentioned herein, the additional component can be selected from the group consisting of silanes, 2,5-methyl dioxolane, 2-ethyl-1-hexanol, 2,2,4,4,-tetramethyl-1,3-cyclobutanediol, 2,2,4-trimethyl-3-pentenal, 2,2,4-trimethyl-3-pentenol, 2,2,4-trimethylpentane, 2,4-dimethyl-3-pentanone (DIPK), isobutyl isobutyrate, methyl formate, n-butanol, dibutyl ether, heptane, dibutyl terephthalate, dimethyl 1,4-cyclohexanedicarboxylate, 1,1-dimethoxy-2-butene, 1,3-propanediol, 2,5-dimethyl-1,3,5-hexadiene, 2,5-dimethyl-2,4-hexadiene, alpha-methyl styrene, diethylene glycol formal, dimethoxydimethyl silane, dimethyl ether, diisopropyl ketone, hexamethylcyclotrisiloxane, hexamethyldisiloxane, methoxytrimethylsilane, methyl 4-ethylbenzoate, methyl caproate, methyl lactate, methyl laurate, methyl methoxyethyl terephthalic acid, methyl nonanoate, methyl oleate, methyl palmitate, methyl stearate, octamethylcyclotetrasiloxane, styrene, trimethylsilanol, 1,1-dimethyoxy-2-butene, 4-methyl morpholine, 1,3,3-trimethoxypropane, methyl myristate, dimethyl adipate, n-methyl-caprolactam, dimethyl azelate, neopentyl glycol, and combinations thereof.

In an embodiment or in combination with any embodiment mentioned herein, the additional component can be selected from the group consisting of of 2,2,4,4,-tetramethyl-1,3-cyclobutanediol, 2,2,4-trimethyl-3-pentenal, 2,2,4-trimethyl-3-pentenol, 2,2,4-trimethylpentane, 2,4-dimethyl-3-pentanone (DIPK), isobutyl isobutyrate, dimethoxydimethyl silane, methoxytrimethylsilane, methyl nonanoate, methyl oleate, methyl stearate, and combinations thereof.

In an embodiment or in combination with any embodiment mentioned herein, the additional component can be selected from the group consisting of 1,1-dimethyoxy-2-butene, 4-methyl morpholine, 1,3,3-trimethoxypropane, methyl myristate, dimethyl adipate, n-methyl-caprolactam, dimethyl azelate, neopentyl glycol, and combinations thereof.

In an embodiment or in combination with any embodiment mentioned herein, the light organics coproduct stream 152 has an average boiling point lower than the boiling point of the principal solvent (e.g., methanol when the solvolysis facility is a methanolysis facility). In an embodiment or in combination with any embodiment mentioned herein, the light organics coproduct stream 152 may have an average boiling point lower than the boiling point of the principal glycol (e.g., ethylene glycol for solvolysis of PET).

Figure 4:
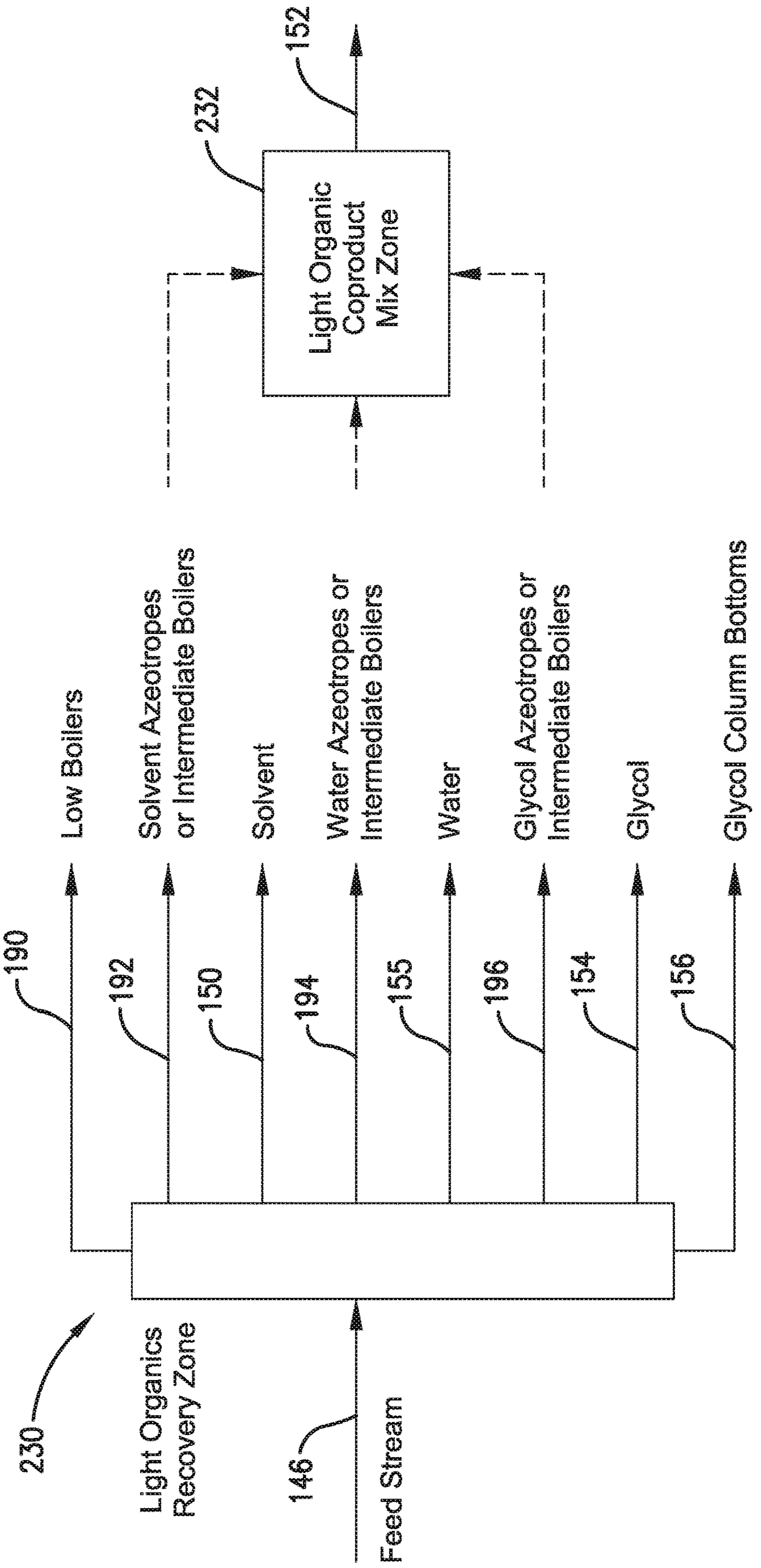
FIG. 4 is a block flow diagram illustrating the separation of a light organics stream from the PET solvolysis facility shown in FIG. 3.

Turning now to FIG. 4, a schematic representation of several streams withdrawn from the light organics separation zone 230 shown in FIG. 3 is shown. In particular, as shown in FIG. 4, at least one solvent stream 150, at least one water stream 155, at least one glycol stream 154, and one or more coproduct streams selected from the group consisting of a low boiler stream 190, a solvent azeotrope or intermediate boilers stream 192, a water azeotrope or intermediate boilers stream 194, and a glycol azeotrope or intermediate boilers stream 196 may be withdrawn from the light organics separation zone 230. Additionally, a glycol column bottoms coproduct stream 156 may also be withdrawn from the light organics separation zone 230, as discussed in detail previously. It should be understood that each of the streams above are named according to the component present in a predominant amount. That is, the name of the stream used above reflects the main component in that stream present in an amount of at least 50, at least 55, at least 60, at least 65, at least 70, at least 75, at least 80, or at least 85 weight percent, based on the total weight of that stream.

As shown in FIG. 4, a feed stream 146, which can include at least 50, at least 55, at least 60, at least 65, at least 70, at least 75, at least 80, at least 85, or at least 90 weight percent of organic components having a boiling point greater than the boiling point of the principal terephthalyl (or DMT), based on the total weight of organic components in the stream (excluding DMT), may be introduced into the light organics separation zone 230. As shown in FIG. 3, this stream 146 may originate from a product separation zone and/or from a reaction zone of the solvolysis (or methanolysis) facility. The light organics separation zone 230 generally shown in FIG. 4 may employ any suitable type of separation technology, including, for example, distillation, extraction, decanting, and combinations thereof. Two or more different types of separation techniques may be used in series or in parallel in order to provide the product and coproduct streams shown in FIG. 4.

As shown in FIG. 4, the feed stream 146 introduced into the light organics recovery zone 230 may be separated into one or more additional streams, including, for example, a low boiler stream 190, a solvent azeotrope or intermediate boilers stream 192, a solvent stream 150, a water azeotrope or intermediate boilers stream 194, a water stream 155, a glycol azeotrope or intermediate boilers stream 196, a glycol stream 154, and a glycol column bottoms stream 156. The light organics coproduct stream 152 withdrawn from the light organics recovery zone shown in FIG. 3 can include one or more of these streams, along or in combination. For example, as generally shown in FIG. 4, at least two, or three or more of the streams can be combined to form the light organics coproduct stream 152. Such a combination can be performed, for example, in a light organics coproduct mix zone 232, or one or more streams may simply be combined in a tank or other device (not shown). In some cases, at least three, at least four, or even at least five of the streams shown in FIG. 4 can be combined to form the light organics coproduct stream 152. All, or a portion, of these streams, alone or in combination, can be sent to one or more downstream processing or recycling facility as described herein.

In an embodiment or in combination with any embodiment mentioned herein, the light organics coproduct stream 152 may comprise at least one azeotrope. As used here, the term "azeotrope" refers to a mixture of two or more components having a constant boiling point when the mixture is being boiled off. The light organics coproduct stream 152 may include components that form azeotropes with the principal solvent (e.g., methanol), that form azeotropes with water, and/or that form azeotropes with the principal glycol (e.g., ethylene glycol). When formed, two or more of the azeotropes or azeotrope-containing streams may be combined to form at least a portion of the light organics coproduct stream 152, or one or more of the azeotropes may be separately routed to one or more downstream chemical processing facilities shown in FIGS. 1*a* and 1 *b*.

In an embodiment or in combination with any embodiment mentioned herein, the light organic coproduct stream 152 comprises at least 5, at least 10, at least 15, at least 20, at least 25, at least 30, at least 35, at least 40, at least 45, at least 50, at least 55, at least 60, at least 65, at least 70, at least 75, at least 80, or at least 85 and/or not more than 99, not more than 95, not more than 90, not more than 85, not more than 80, not more than 75, not more than 70, not more than 65, or not more than 60 weight percent of a principal solvent azeotrope, based on the total weight of said light organic coproduct stream. In an embodiment or in combination with any embodiment mentioned herein, the light organic coproduct stream 152 comprises at least 5, at least 10, at least 15, at least 20, at least 25, at least 30, at least 35, at least 40, at least 45, at least 50, at least 55, at least 60, at least 65, at least 70, at least 75, at least 80, or at least 85 and/or not more than 99, not more than 95, not more than 90, not more than 85, not more than 80, not more than 75, not more than 70, not more than 65, or not more than 60 weight percent of a methanol (or other principal solvent) azeotrope, based on the total weight of said light organic coproduct stream 152. In an embodiment or in combination with any embodiment mentioned herein, the light organic coproduct stream 152 may not be or comprise an azeotrope with the principal solvent (or methanol), or may include such an azeotrope in an amount of not more than 10, not more than 5, not more than 3, not more than 2, not more than 1, or not more than 0.5 weight percent, based on the total weight of the stream 152.

In an embodiment or in combination with any embodiment mentioned herein, the light organic coproduct stream 152 may comprise an intermediate boilers stream having a boiling point between the boiling point of the low boilers and the boiling point of the principal solvent. It may include at least 50, at least 55, at least 60, at least 65, at least 70, at least 75, at least 80, at least 85, or at least 90 weight percent of components having a boiling point between the boiling point of low boilers and the boiling point of the principal solvent, based on the total weight of the stream. This may be referred to as a solvent intermediate boilers stream and may not comprise or be a solvent (or methanol) azeotrope, or it can include not more than 20, not more than 15, not more than 10, not more than 5, not more than 3, not more than 2, or not more than 1 weight percent of such components, based on the total weight of the stream.

In an embodiment or in combination with any embodiment mentioned herein, light organic coproduct stream comprises at least 5, at least 10, at least 15, at least 20, at least 25, at least 30, at least 35, at least 40, at least 45, at least 50, at least 55, at least 60, at least 65, at least 70, at least 75, at least 80, or at least 85 and/or not more than 99, not more than 95, not more than 90, not more than 85, not more than 80, not more than 75, not more than 70, not more than 65, or not more than 60 weight percent of a water azeotrope, based on the total weight of said light organic coproduct stream 152.

In an embodiment or in combination with any embodiment mentioned herein, the light organic coproduct stream 152 may comprise an intermediate boilers stream having a boiling point between the boiling point of the principal solvent (or methanol) and the boiling point of water. This may be referred to as a water intermediate boilers stream and may not comprise a water azeotrope, or may comprise not more than 20, not more than 15, not more than 10, not more than 5, not more than 2, not more than 1, or not more than 0.5 weight percent of a water azeotrope, based on the total weight of the stream.

In an embodiment or in combination with any embodiment mentioned herein, light organics coproduct stream 152 comprises at least 5, at least 10, at least 15, at least 20, at least 25, at least 30, at least 35, at least 40, at least 45, at least 50, at least 55, at least 60, at least 65, at least 70, at least 75, at least 80, or at least 85 and/or not more than 99, not more than 95, not more than 90, not more than 85, not more than 80, not more than 75, not more than 70, not more than 65, or not more than 60 weight percent of a principal glycol (or ethylene glycol) azeotrope, based on the total weight of said light organics coproduct stream 152, or it can be present in an amount in the range of from 5 to 99 weight percent, 10 to 95 weight percent, or 15 to 85 weight percent, based on the total weight of the stream.

In an embodiment or in combination with any embodiment mentioned herein, light organic coproduct stream comprises at least 5, at least 10, at least 15, at least 20, at least 25, at least 30, at least 35, at least 40, at least 45, at least 50, at least 55, at least 60, at least 65, at least 70, at least 75, at least 80, or at least 85 weight percent and/or not more than 99, not more than 95, not more than 90, not more than 85, not more than 80, not more than 75, not more than 70, not more than 65, or not more than 60 weight percent of an azeotrope of ethylene glycol (or another principal glycol), based on the total weight of said light organics coproduct stream, or it can be present in an amount in the range of from 5 to 99 weight percent, 10 to 95 weight percent, or 15 to 85 weight percent, based on the total weight of the stream.

In an embodiment or in combination with any embodiment mentioned herein, the light organics coproduct stream 152 may comprise an intermediate boilers stream having a boiling point between the boiling point of water and the boiling point of the principal glycol (or ethylene glycol). This may be referred to as a glycol intermediate boilers stream and may not comprise or be a glycol (or ethylene glycol) azeotrope, or may comprise not more than 20, not more than 15, not more than 10, not more than 5, not more than 2, not more than 1, or not more than 0.5 weight percent of a glycol azeotrope, based on the total weight of the stream.

Additionally, in an embodiment or in combination with any embodiment mentioned herein, the light organics coproduct stream 152 withdrawn from the solvolysis (or methanolysis) facility may include at least 2, at least 5, at least 10, at least 15, at least 20, at least 25, at least 30, at least 35, at least 40, at least 45, at least 50, or at least 55 weight percent and/or not more than 90, not more than 85, not more than 80, not more than 75, not more than 70, not more than 65, not more than 60, not more than 55, not more than 50, not more than 45, not more than 40, not more than 35, or not more than 30 weight percent of the principal solvent (or methanol), or it can be present in an amount in the range of from 2 to 90 weight percent, 5 to 85 weight percent, or 10 to 70 percent, based on the total weight of the stream 152.

Similarly, in an embodiment or in combination with any embodiment mentioned herein, the light organics coproduct stream 152 withdrawn from the solvolysis (or methanolysis) facility may include at least 2, at least 5, at least 10, at least 15, at least 20, at least 25, at least 30, at least 35, at least 40, at least 45, at least 50, or at least 55 weight percent and/or not more than 90, not more than 85, not more than 80, not more than 75, not more than 70, not more than 65, not more than 60, not more than 55, not more than 50, not more than 45, not more than 40, not more than 35, or not more than 30 weight percent of the principal glycol (or ethylene glycol), or it can be present in an amount in the range of from 2 to 90 weight percent, 5 to 85 weight percent, or 10 to 70 weight percent, based on the total weight of the stream. The light organics coproduct stream 152 may include at least 2, at least 5, at least 10, at least 15, at least 20, at least 25, or at least 30 and/or not more than 50, not more than 45, not more than 40, not more than 35, not more than 30, not more than 25, not more than 20, not more than 15, or not more than 10 weight percent water, based on the total weight of the stream, or it can be present in an amount in the range of from 2 to 50 weight percent, 5 to 45 weight percent, or 5 to 65 weight percent, based on the total weight of the stream 152.

As discussed in further detail herein, all or a portion of the light organics coproduct stream 152 (or one or more streams making up the light organics coproduct stream 152) may be introduced into one or more downstream chemical recycling facilities alone or in combination with one or more other coproduct streams, streams resulting from one or more of the other downstream chemical recycling facilities, and/or streams of waste plastic, including mixed plastic waste (unprocessed, partially processed, or processed).

Referring again to FIG. 4, the low boiler stream 190 removed from the light organics recovery zone 230 may comprise predominantly components having a boiling point lower than the boiling point of the principal solvent (or methanol) and/or lower than the boiling point of any lower-boiling solvent azeotropes, when present. In an embodiment or in combination with any embodiment mentioned herein, the low boiler stream 190 may comprise at least 35, at least 40, at least 45, at least 50, at least 55, at least 60, at least 65, at least 70, at least 75, at least 80, at least 85, at least 90, or at least 95 weight percent of components having a boiling point lower than the principal solvent, based on the total weight of the low boiler stream 190.

In an embodiment or in combination with any embodiment mentioned herein, a solvent stream 150 may also be withdrawn from the light organics separation zone 230 and can include at least 2, at least 5, at least 10, at least 15, at least 25, at least 40, at least 50, at least 55, at least 60, at least 65, at least 70, at least 75, at least 80, at least 85, at least 90, at least 95, or at least 99 weight percent of the principal solvent, based on the total weight of the stream 150. When the solvolysis facility is a methanolysis facility, this stream may comprise at least 2, at least 5, at least 10, at least 15, at least 25, at least 30, at least 40, at least 50, at least 55, at least 60, at least 65, at least 70, at least 75, at least 80, at least 85, at least 90, at least 95, or at least 99 weight percent of methanol, based on the total weight of the stream. All or a portion of the stream may be recycled back to the inlet of the solvolysis facility for further use.

Referring again to FIG. 4, in an embodiment or in combination with any embodiment mentioned herein, a water stream 155 may also be removed from the light organics recovery zone 230 of the solvolysis facility. The water stream 155 may comprise at least 45, at least 50, at least 55, at least 60, at least 65, at least 70, at least 75, at least 80, at least 85, at least 90, or at least 95 weight percent of water, based on the total weight of the stream 155. Depending on the content of organic components in the water stream 155, it may optionally be sent to a downstream water processing facility prior to further disposal and/or use.

Additionally, as shown in FIGS. 3 and 4, a stream predominantly comprising the principal glycol 154 may also be withdrawn from the light organics separation zone 230. In an embodiment or in combination with any embodiment mentioned herein, the stream of principal glycol 154 (such as ethylene glycol) can include at least 55, at least 60, at least 65, at least 70, at least 75, at least 80, at least 85, at least 90, at least 95, or at least 99 weight percent of the principal glycol, based on the total weight of the stream 154. The principal glycol stream 154 may also include recycle content, such that the principal glycol product stream 154 has a recycle content of at least 50, at least 55, at least 60, at least 65, at least 70, at least 75, at least 80, at least 85, at least 90, or at least 95 weight percent, based on the total weight of the stream. The principal glycol (or ethylene glycol) can comprise r-glycol (or r-ethylene glycol).

As shown in FIG. 3, a glycol-containing coproduct stream 156 may also be withdrawn from the light organics separation zone 230. The term "glycol bottoms" or "glycol column bottoms" or "glycol sludge" (or, "EG bottoms," "EG column bottoms" or "EG sludge," in methanolysis of PET) refers to components that have a boiling point (or azeotrope) higher than the boiling point of the principal glycol (or EG) but lower than the principal terephthalyl (or DMT).

In an embodiment or in combination with any embodiment mentioned herein, the glycol column bottoms coproduct stream 156 can comprise at least 50, at least 55, at least 60, at least 65, at least 70, at least 75, at least 80, at least 85, at least 90, or at least 95 weight percent of components with a boiling point higher than the boiling point of the principal glycol (e.g., ethylene glycol) and lower than the boiling point of the principal terephthalyl. The glycol column bottoms coproduct stream 156 can comprise not more than 60, not more than 55, not more than 50, not more than 45, not more than 40, not more than 35, not more than 30, not more than 25, not more than 20, not more than 15, not more than 10, not more than 5, not more than 2, not more than 1 weight percent of components with a boiling point lower than the boiling point of the principal glycol (e.g., ethylene glycol). The glycol column bottoms coproduct stream 156 can have a boiling point higher than the boiling point of the principal glycol (or EG) and lower than the boiling point of the principal terephthalyl (or DMT).

In an embodiment or in combination with any embodiment mentioned herein, the glycol bottoms coproduct stream 156 can comprise the principal glycol and at least one other glycol. For example, the glycol column bottoms coproduct stream 156 can comprise at least 0.5, at least 1, at least 2, at least 3, at least 5, or at least 8 and/or not more than 30, not more than 25, not more than 20, not more than 15, not more than 12, or not more than 10 weight percent of the primary glycol (or ethylene glycol), based on the total weight of the coproduct stream 156. The principal glycol (or ethylene glycol) may be present as itself (in a free state) or as a moiety in another compound.

Other examples of possible principal glycols (depending on the PET or other polymer being processed) may include, but are not limited to, diethylene glycol, triethylene glycol, 1,4-cyclohexane-dimethanol, propane-1,3-diol, butane-1,4-diol, pentane-1,5-diol, hexane-1,6-diol, neopentyl glycol, 3-methylpentanediol-(2,4), 2-methylpentanediol-(1,4), 2,2,4-trimethylpentane-diol-(1,3), 2-ethylhexanediol-(1,3), 2,2-diethylpropane-diol-(1,3), hexanediol-(1,3), 1,4-di-(hydroxyethoxy)-benzene, 2,2-bis-(4-hydroxycyclohexyl)-propane, 2,4-dihydroxy-1,1,3,3-tetramethyl-cyclobutane, 2,2,4,4 tetramethylcyclobutanediol, 2,2-bis-(3-hydroxyethoxyphenyl)-propane, 2,2-bis-(4-hydroxypropoxyphenyl)-propane, isosorbide, hydroquinone, BDS-(2,2-(sulfonylbis)4,1-phenyleneoxy))bis(ethanol), and combinations thereof. The other glycol may not be or comprise ethylene glycol. Moieties of these glycols may also be present in any oligomers of polyester in this or other coproduct streams. Additionally, other non-terephthalyl and/or non-glycol components may also be present in these streams. Examples of such components include, isophthalates and other acid residues that boil higher than the principal terephthalyl.

In an embodiment or in combination with any embodiment mentioned herein, the glycol other than the principal glycol (or ethylene glycol in the case of methanolysis) can be present in the glycol column bottoms coproduct stream 156 in an amount of at least 15, at least 20, at least 25, at least 30, at least 35, at least 40, at least 45, at least 50, at least 55, at least 60, at least 65, at least 70, or at least 75 and/or not more than 99, not more than 95, not more than 90, not more than 85, not more than 80, not more than 75, not more than 70, not more than 65, not more than 60, not more than 55, not more than 50, not more than 45, not more than 40, or not more than 35 weight percent, based on the total weight of glycols in the glycol column bottoms coproduct stream 156.

In an embodiment or in combination with any embodiment mentioned herein, the weight ratio of the at least one glycol other than the principal glycol to the principal glycol in the glycol column bottoms coproduct stream 156 is at least 0.5:1, at least 0.55:1, at least 0.65:1, at least 0.70:1, at least 0.75:1, at least 0.80:1, at least 0.85:1, at least 0.90:1, at least 0.95:1, at least 0.97:1, at least 0.99:1, at least 1:1, at least 1.05:1, at least 1.1:1, at least 1.15:1, at least 1.2:1, at least or at least 1.25:1. Additionally, or in the alternative, the weight ratio of the at least one glycol other than the principal glycol to the principal glycol in the glycol column bottoms coproduct stream 156 is not more than 5:1, not more than 4.5:1, not more than 4:1, not more than 3.5:1, not more than 3:1, not more than 2.5:1, not more than 2:1, not more than 1.5:1, not more than 1.25:1, or not more than 1:1, or in the range of from 0.5:1 to 5:1, from 0.70:1 to 3:1, or 0.80:1 to 2.5:1.

In an embodiment or in combination with any embodiment mentioned herein, the solvolysis facility 30 may produce two or more coproduct streams, which can include two or more heavy organic coproduct streams, two or more light organic coproduct streams, or combinations of light and heavy organic coproduct streams. All or a portion of one or more of the solvolysis coproduct stream or streams (shown as stream 110 in FIGS. 1*a* and 1*b*) may be introduced into at least one of the downstream processing facilities including, for example, the pyrolysis facility 60, the cracking facility 70, the POX gasification facility 50, the energy recovery facility 80, and any of the other optional facilities mentioned previously.

In an embodiment or in combination with any embodiment mentioned herein, two or more (or portions of two or more) solvolysis coproduct streams may be introduced into the same downstream processing facility, while, in other cases, two or more (or portions of two or more) solvolysis coproduct streams may be introduced into different downstream processing facilities. In some embodiments, at least 90, at least 95, at least 97, at least 99 weight percent, or all, of a single coproduct stream may be introduced into one downstream facility, while, in other embodiments, the stream may be divided amongst two or more downstream facilities, such that not more than 60, not more than 55, not more than 50, not more than 45, not more than 40, not more than 35, or not more than 30 weight percent of a single coproduct stream may be introduced into one of the downstream processing facilities.

Referring again to FIGS. 1*a* and 1 *b*, in an embodiment or in combination with any embodiment mentioned herein, at least a portion of at least one solvolysis coproduct stream 110 may be combined with at least a portion of the PO-enriched plastic stream 114 withdrawn from the pre-processing facility 20 as shown in FIGS. 1*a* and 1 *b*. The amount of a single coproduct stream 110 (or all coproduct streams when two or more are combined) in the combined stream with the PO-enriched plastic may vary and can be, for example, at least 1, at least 5, at least 10, at least 15, at least 20, at least 25, at least 30, at least 35, at least 40, at least 45, or at least 50 and/or not more than 90, not more than 85, not more than 80, not more than 75, not more than 70, not more than 65, not more than 60, not more than 55, not more than 50, or not more than 40 weight percent, based on the total weight of the combined stream. As shown in FIGS. 1*a* and 1 *b*, the combined stream may then be introduced into one or more locations of the chemical recycling facility or downstream processing facilities, including, for example into a POX gasification facility 50, a pyrolysis facility 60, a cracker facility 70, and/or an energy generation facility 80, as well as a separation facility and/or for further sale and/or use, as shown in FIG. 1*b*.

Liquification/Dehalogenation

As shown in FIGS. 1*a* and 1 *b*, the PO-enriched waste plastic stream 114 (with or without being combined with a solvolysis coproduct stream 110) may optionally be introduced into a liquification zone or step prior to being introduced into one or more of the downstream processing facilities. As used herein, the term "liquification" zone or step refers to a chemical processing zone or step in which at least a portion of the incoming plastic is liquefied. The step of liquefying plastic can include chemical liquification, physical liquification, or combinations thereof. Exemplary methods of liquefying the polymer introduced into the liquification zone can include (i) heating/melting; (ii) dissolving in a solvent; (iii) depolymerizing; (iv) plasticizing, and combinations thereof. Additionally, one or more of options (i) through (iv) may also be accompanied by the addition of a blending or liquification agent to help facilitate the liquification (reduction of viscosity) of the polymer material. As such, a variety of rheology modification agents (e.g., solvents, depolymerization agents, plasticizers, and blending agents) can be used the enhance the flow and/or dispersibility of the liquified waste plastic.

When added to the liquification zone 40, at least 50, at least 55, at least 60, at least 65, at least 70, at least 75, at least 80, at least 85, at least 90, at least 95, or at least 99 weight percent of the plastic (usually waste plastic) undergoes a reduction in viscosity. In some cases, the reduction in viscosity can be facilitated by heating (e.g., addition of steam directly or indirectly contacting the plastic), while, in other cases, it can be facilitated by combining the plastic with a solvent capable of dissolving it. Examples of suitable solvents can include, but are not limited to, alcohols such as methanol or ethanol, glycols such as ethylene glycol, diethylene glycol, triethylene glycol, neopentyl glycol, cyclohexanedimethanol, glycerin, pyrolysis oil, motor oil, and water. As shown in FIG. 1*a*, the solvent stream 141 can be added directly to the liquification zone 40, or it can be combined with one or more streams fed to the liquification zone 40 (not shown in FIG. 1).

In an embodiment or in combination with any embodiment mentioned herein, the solvent can comprise a recycle content solvent having, for example, at least 1, at least 5, at least 10, at least 15, at least 20, at least 25, at least 30, at least 35, at least 40, at least 45, at least 50, at least 55, at least 60, at least 65, at least 70, at least 75, at least 80, at least 85, at least 90, or at least 95 weight percent recycle content material, based on the total weight of the stream. Alternatively, or in addition, the recycle content of the solvent in line 141 can be not more than 99.9, not more than 99, not more than 95, not more than 90, not more than 85, not more than 80, not more than 75, not more than 70, not more than 65, not more than 60, not more than 55, not more than 50, not more than 45, not more than 40, not more than 35, not more than 30, not more than 25, not more than 20, not more than 15, not more than 10, not more than 5, or not more than 1 weight percent, based on the total weight of the stream. Or it can be in the range of from 1 to 99 weight percent, 5 to 90 weight percent, or 10 to 75 weight percent, based on the total weight of the stream.

The recycle content may originate from one or more streams within chemical recycling facility 10 such as, for example, from a solvolysis coproduct stream (e.g., formed from solvolysis of a stream of waste plastic stream including PET) and/or from a pyrolysis oil stream (e.g., formed from pyrolysis of waste plastic stream including polyolefin and/or byproducts from solvolysis of waste PET). Several examples of streams that can be introduced as solvent 141 into liquification zone 40 are shown in FIGS. 1*a* and 1 *b*. All or a portion of each of these streams may be used as a solvent. The solvent stream 141 can be introduced directly into a liquification tank (not shown in FIGS. 1*a* and 1*b*) of the liquification zone 40 separately from the waste plastic stream so that the combination of the solvent and waste plastic is carried out in the liquification tank and/or the solvent can be combined with one or more streams introduced into the liquification zone 40 so that the combined stream is introduced into the liquification tank of the liquification zone 40.

In an embodiment or in combination with any embodiment mentioned herein, the solvent can comprise a stream withdrawn from one or more other facilities within the chemical recycling facility. For example, the solvent can comprise a stream withdrawn from at least one of the solvolysis facility 30, the pyrolysis facility 60, and the cracking facility 70. The solvent can be or comprise at least one of the solvolysis coproducts described herein or can be or comprise pyrolysis oil.

In some cases, the plastic can be depolymerized such that, for example, the number average chain length of the plastic is reduced by contact with a depolymerization agent. In an embodiment or in combination with any embodiment mentioned herein, at least one of the previously-listed solvents may be used as a depolymerization agent, while, in one or more other embodiments, the depolymerization agent can include an organic acid (e.g., acetic acid, citric acid, butyric acid, formic acid, lactic acid, oleic acid, oxalic, stearic acid, tartaric acid, and/or uric acid) or inorganic acid such as sulfuric acid (for polyolefin). The depolymerization agent may reduce the melting point and/or viscosity of the polymer by reducing its number average chain length.

Alternatively, or additionally, a plasticizer can be used in the liquification zone to reduce the viscosity of the plastic. Plasticizers for polyethylene include, for example, dioctyl phthalate, dioctyl terephthalate, glyceryl tribenzoate, polyethylene glycol having molecular weight of up to 8,000 Daltons, sunflower oil, paraffin wax having molecular weight from 400 to 1,000 Daltons, paraffinic oil, mineral oil, glycerin, EPDM, and EVA. Plasticizers for polypropylene include, for example, dioctyl sebacate, paraffinic oil, isooctyl tallate, plasticizing oil (Drakeol 34), naphthenic and aromatic processing oils, and glycerin. Plasticizers for polyesters include, for example, polyalkylene ethers (e.g., polyethylene glycol, polytetramethylene glycol, polypropylene glycol or their mixtures) having molecular weight in the range from 400 to 1500 Daltons, glyceryl monostearate, octyl epoxy soyate, epoxidized soybean oil, epoxy tallate, epoxidized linseed oil, polyhydroxyalkanoate, glycols (e.g., ethylene glycol, pentamethylene glycol, hexamethylene glycol, etc.), phthalates, terephthalates, trimellitate, and polyethylene glycol di-(2-ethylhexoate). When used, the plasticizer may be present in an amount of at least 0.1, at least 0.5, at least 1, at least 2, or at least 5 weight percent and/or not more than 10, not more than 8, not more than 5, not more than 3, not more than 2, or not more than 1 weight percent, based on the total weight of the stream, or it can be in a range of from 0.1 to 10 weight percent, 0.5 to 8 weight percent, or 1 to 5 weight percent, based on the total weight of the stream.

Further, one or more of the methods of liquifying the waste plastic stream can also include adding at least one blending agent to the plastic before, during, or after the liquification process. Such blending agents may include for example, emulsifiers and/or surfactants, and may serve to more fully blend the liquified plastic into a single phase, particularly when differences in densities between the plastic components of a mixed plastic stream result in multiple liquid or semi-liquid phases. When used, the blending agent may be present in an amount of at least 0.1, at least 0.5, at least 1, at least 2, or at least 5 weight percent and/or not more than 10, not more than 8, not more than 5, not more than 3, not more than 2, or not more than 1 weight percent, based on the total weight of the stream, or it can be in a range of from 0.1 to 10 weight percent, 0.5 to 8 weight percent, or 1 to 5 weight percent, based on the total weight of the stream.

When combined with the PO-enriched plastic stream 114 as generally shown in FIG. 1*a*, the solvolysis coproduct stream 110 (which can include one or more solvolysis coproducts described herein) may be added before introduction of the PO-enriched waste plastic stream 114 into the liquification zone 40 (as shown by line 113) and/or after removal of the liquified plastic stream from the liquification zone 40 (as shown by line 115). In an embodiment or in combination with any embodiment mentioned herein, at least a portion or all of one or more coproduct streams may also be introduced directly into the liquification zone, as shown in FIG. 1*b*. In an embodiment or in combination with any embodiment mentioned herein, at least a portion of the PO-enriched waste plastic stream 114 can bypass the liquification zone 40 altogether in line 117 and may optionally combined with at least one solvolysis coproduct stream 110 as also shown in FIG. 1*b*.

Additionally, as shown in FIGS. 1*a* and 1 *b*, a portion of the pyrolysis oil stream 143 withdrawn from the pyrolysis facility 60 can be combined with the PO-enriched plastic stream 114 to form a liquified plastic. Although shown as being introduced directly into the liquification zone 40, all or a portion of the pyrolysis oil stream 143 may be combined with the PO-enriched plastic stream 114 prior to introduction into the liquification zone 40, or after the PO-enriched plastic stream 114 exits the liquification zone 40. When used, the pyrolysis oil can be added at one or more locations described herein, alone or in combination with one or more other solvent streams.

In an embodiment or in combination with any embodiment mentioned herein, the feed stream to one or more of the downstream chemical recycling facilities from the liquification zone 40 can comprise at least 1, at least 5, at least 10, at least 15, at least 20, at least 25, at least 30, at least 35, at least 40, at least 45, at least 50, at least 55, at least 60, at least 65, at least 70, at least 75, at least 80, at least 85, at least 90, or at least 95 weight percent of one or more solvolysis coproduct streams, based on the total weight of the feed stream introduced into the downstream processing facility or facilities.

For example, the feed streams 116, 118, 120, and 122 to each of the POX facility 50, the pyrolysis facility 60, the cracking facility 70, the energy recovery facility 80, and/or any other facility 90 of the chemical recycling facility 10 may include PO-enriched waste plastic and an amount of one or more solvolysis coproducts described herein. One or more of streams 116, 118, 120, and 122 can include not more than 95, not more than 90, not more than 85, not more than 80, not more than 75, not more than 70, not more than 65, not more than 60, not more than 55, not more than 50, not more than 45, not more than 40, not more than 35, not more than 30, not more than 25, not more than 20, not more than 15, not more than 10, not more than 5, not more than 2, or not more than 1 weight percent of one or more solvolysis coproduct streams, based on the total weight of the stream 116, 118, 120, and/or 122. These amounts may apply to a single stream or two or more of these streams in combination.

Additionally, or in the alternative, the feed stream to the pyrolysis facility 60, the POX facility 50, the cracking facility 70, the energy recovery facility 80, and/or any other facility 90 can comprise not more than 95, not more than 90, not more than 85, not more than 80, not more than 75, not more than 70, not more than 65, not more than 60, not more than 55, not more than 50, not more than 45, not more than 40, not more than 35, not more than 30, not more than 25, not more than 20, not more than 15, not more than 10, not more than 5, not more than 2, or not more than 1 weight percent of one or more solvolysis coproduct streams, based on the total weight of the feed stream introduced into the downstream processing facility or facilities.

Additionally, in some embodiments when the feed to the solvolysis facility includes waste automotive carpet material, the waste automotive carpet material (including densified waste automotive carpet material) can be added to the liquification zone along with the waste plastic stream, while, in other embodiments, at least a portion of the waste automotive carpet material can be added to the predominantly liquid stream removed from the liquification zone.

Alternatively, or in addition, the liquified (or reduced viscosity) plastic stream withdrawn from the liquification zone 40 can include at least 1, at least 5, at least 10, at least 15, at least 20, at least 25, at least 30, at least 35, at least 40, at least 45, at least 50, at least 55, at least 60, at least 65, at least 70, at least 75, at least 80, at least 85, at least 90, or at least 95 weight percent and/or not more than 95, not more than 90, not more than 85, not more than 80, not more than 75, not more than 70, not more than 65, not more than 60, not more than 55, not more than 50, not more than 45, not more than 40, not more than 35, not more than 30, not more than 25, not more than 20, not more than 15, not more than 10, not more than 5, not more than 2, or not more than 1 weight percent of PO, based on the total weight of the stream, or the amount of PO can be in the range of from 1 to 95 weight percent, 5 to 90 weight percent, or 10 to 85 weight percent, based on the total weight of the stream.

In an embodiment or in combination with any embodiment mentioned herein, the liquified plastic stream may be a melted plastic stream or may comprise a plastic dissolved in a liquid solvent. As used herein, the term "dissolved" means at least partially broken down via chemical and/or physical mechanisms.

In an embodiment or in combination with any embodiment mentioned herein, the liquified plastic stream exiting the liquification zone 40 can have a viscosity of less than 3,000, less than 2,500, less than 2,000, less than 1,500, less than 1,000, less than 800, less than 750, less than 700, less than 650, less than 600, less than 550, less than 500, less than 450, less than 400, less than 350, less than 300, less than 250, less than 150, less than 100, less than 75, less than 50, less than 25, less than 10, less than 5, or less than 1 poise, measured using a Brookfield R/S rheometer with V80-40 vane spindle operating at a shear rate of 10 rad/s and a temperature of 350° C. In an embodiment or in combination with any embodiment mentioned herein, the viscosity (measured at 350° C. and 10 rad/s and expressed in poise) of the liquified plastic stream exiting the liquification zone is not more than 95, not more than 90, not more than 75, not more than 50, not more than 25, not more than 10, not more than 5, or not more than 1 percent of the viscosity of the PO-enriched stream introduced into the liquification zone 40.

Figure 5:
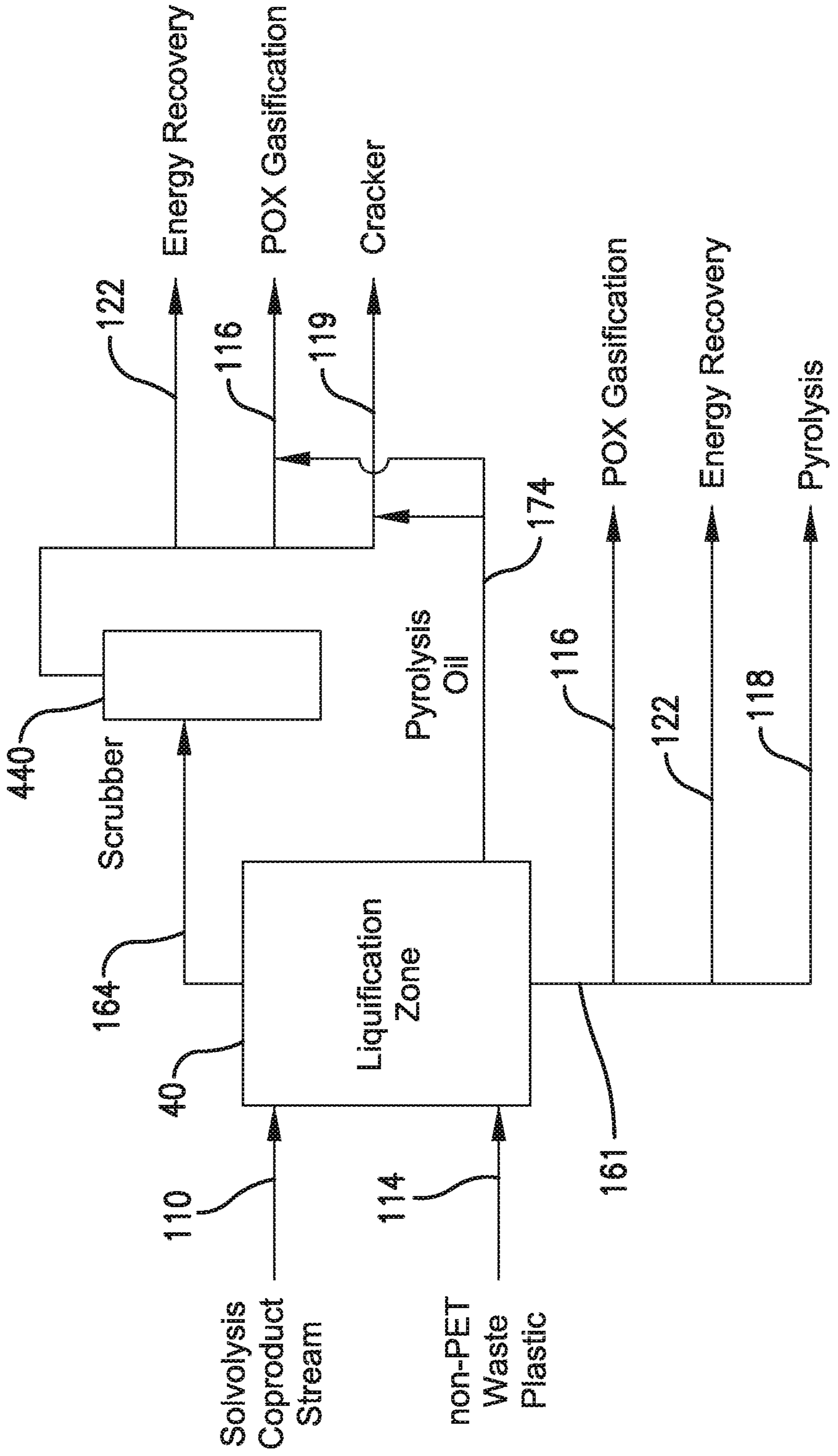
FIG. 5 is a block flow diagram illustrating a portion of the chemical recycling facility shown in FIG. 1*a*, particularly highlighting the liquification zone and its relation to other facilities and processes according to embodiments of the present technology.

Turning now to FIG. 5, a schematic diagram of an exemplary liquification zone 40 is shown, particularly illustrating various feed and product streams, as well as possible locations for such product streams to be routed within the chemical recycling facilities shown in FIGS. 1*a* and 1 *b*. It should be understood that FIG. 5 depicts one exemplary embodiment of a liquification zone, and certain features depicted in FIG. 5 may be omitted and/or additional features described elsewhere herein may be added to the system depicted in FIG. 5.

As shown in FIG. 5, at least one solvolysis coproduct stream 110 and a non-PET waste plastic stream (e.g., a PO-enriched stream) 114 may be fed into the liquification zone 40. The solvolysis coproduct stream 110 introduced into the liquification zone 40 can include one or more of a polyolefin-containing coproduct stream, a reactor purge coproduct stream, a light organic coproduct stream, a terephthalyl sludge coproduct stream, and a glycol sludge coproduct stream originating from the solvolysis (or methanolysis) facility as discussed previously. The solvolysis coproduct stream 110 introduced into the liquification zone 40 may include at least one, at least two, at least three, at least four, or all of at least a portion of these streams, combined prior to or within the liquification zone 40. The feed to the liquification zone 40 (whether in a single or a combined stream) can comprise at least 5, at least 10, at least 15, at least 20, at least 25, at least 30, at least 35, at least 40, at least 45, at least 50, at least 55, at least 60, at least 65, at least 70, or at least 75 and/or not more than 99, not more than 95, not more than 90, not more than 85, not more than 80, not more than 75, not more than 70, not more than 65, not more than 60, not more than 55, or not more than 50 weight percent of the at least one solvolysis coproduct stream, based on the total weight of the feed stream or streams.

In an embodiment or in combination with any embodiment mentioned herein, the feed to the liquification zone 40 may comprise at least 5, at least 10, at least 15, at least 20, at least 25, at least 30, at least 35, at least 40, at least 45, at least 50, at least 55, at least 60, at least 65, at least 70, or at least 75 and/or not more than 99, not more than 95, not more than 90, not more than 85, not more than 80, not more than 75, not more than 70, not more than 65, not more than 60, not more than 55, or not more than 50 weight percent of non-PET plastic, such as waste plastic, based on the total weight of the feed stream or streams. The waste plastic can comprise predominantly polyolefin such as, for example, polyethylene and/or polypropylene withdrawn from a preprocessing facility as shown in FIGS. 1*a* and 1*b*. Such a stream can comprise at least 5, at least 10, at least 15, at least 20, at least 25, at least 30, at least 35, at least 40, at least 45, at least 50, at least 55, at least 60, at least 65, at least 70, at least 75, at least 80, at least 85, at least 90, or at least 95 weight percent polyolefin, based on the total weight of the stream or streams. Or it can include not more than 99, not more than 95, not more than 90, not more than 85, not more than 80, not more than 75, not more than 70, not more than 65, not more than 60, not more than 55, not more than 50, not more than 45, not more than 40, not more than 35, not more than 30, not more than 25, not more than 20, or not more than 15 weight percent polyolefin, based on the total weight of the stream or streams.

The non-PET waste plastic may further comprise at least 1, at least 2, at least 5, at least 10, at least 15, at least 20, at least 25, at least 30, at least 35, or at least 40 and/or not more than 50, not more than 45, not more than 40, not more than 35, not more than 30, not more than 25, not more than 20, not more than 15, not more than 10, not more than 7, or not more than 5 weight percent of PET, based on the total weight of the stream or streams, or it can be present in an amount in the range of from 1 to 40 weight percent, 2 to 20 weight percent, or 5 to 10 weight percent, based on the total weight of the stream or streams.

In an embodiment or in combination with any embodiment mentioned herein, the weight ratio of waste plastic to the solvolysis coproduct stream when combined is at least 0.75:1, at least 0.90:1, at least 1:1, at least 1.5:1, at least 2:1, at least 3:1, at least 4:1, at least 5:1, at least 6:1, at least 7:1, at least 8:1, at least 9:1, at least 10:1, at least 11:1, at least 12:1, at least 13:1, at least 14:1, at least 15:1, at least 16:1, at least 17:1, at least 18:1, at least 19:1, or at least 20:1 and/or not more than 100:1, not more than 75:1, not more than 70:1, not more than 65:1, not more than 60:1, not more than 50:1, not more than 45:1, not more than 40:1, not more than 35:1, not more than 30:1, not more than 25:1, not more than 20:1, or not more than 15:1, or it can be in the range of from 0.75:1 to 100:1, 1:1 to 50:1, or 1.5:1 to 20:1.

As shown in FIG. 5, at least one predominantly vapor stream 164 and at least one predominantly liquid stream 161 may be withdrawn from the liquification zone 40. In an embodiment or in combination with any embodiment mentioned herein, at least a portion of the vapor 164 may optionally be sent to a scrubber 440, such as a caustic or amine scrubber, which can employ a scrubbing fluid to remove all or a part of undesirable components, such as chlorine and other halogens, as well as sulfur, carbon dioxide, aldehydes, and combinations thereof. The scrubber 440 can remove at least 10, at least 20, at least 30, at least 40, at least 50, at least 60, at least 70, at least 80, at least 90, or at least 95 weight percent of one or more undesirable components introduced into the scrubber, based on the total amount of the undesirable components introduced into the scrubber 440.

The resulting vapor stream 164 may then be introduced into one or more of an energy recovery facility, a POX gasification facility, and a cracker facility. Optionally, at least a portion of the stream introduced into a POX gasification facility and/or a cracker facility may be combined with a stream of pyrolysis oil (or pyrolysis gas, not shown), and the combined stream may be introduced into the downstream facility. In some embodiments, the combined stream can include at least 5, at least 10, at least 15, at least 20, at least 25, at least 30, at least 35, at least 40, at least 45, or at least 50 and/or not more than 99, not more than 90, not more than 85, not more than 80, not more than 75, not more than 70, not more than 65, or not more than 60 weight percent of the liquification vapor, based on the total weight of the stream. Alternatively, or in addition, the combined stream can include at least 5, at least 10, at least 15, at least 20, at least 25, at least 30, at least 35, or at least 40 and/or not more than 80, not more than 75, not more than 70, not more than 65, not more than 60, not more than 55, or not more than 50 weight percent of pyrolysis oil, based on the total weight of the stream. In an embodiment or in combination with any embodiment mentioned herein, at least a portion of the vapor stream may be cooled and/or compressed (via a compressor 450 as shown in FIG. 1*b*) prior to introduction into one or more of the downstream processing facilities.

Additionally, as shown in FIG. 5, the predominantly liquid stream 161 withdrawn from the liquification zone 40 may be introduced into at least one of (i) a POX gasification facility; (ii) a energy recovery facility; and (iii) a pyrolysis facility. In an embodiment or in combination with any embodiment mentioned herein, the predominantly liquid stream may be introduced into at least one, at least two, or all three facilities, alone or in combination with one or more other streams, as described in detail herein.

Figure 6:
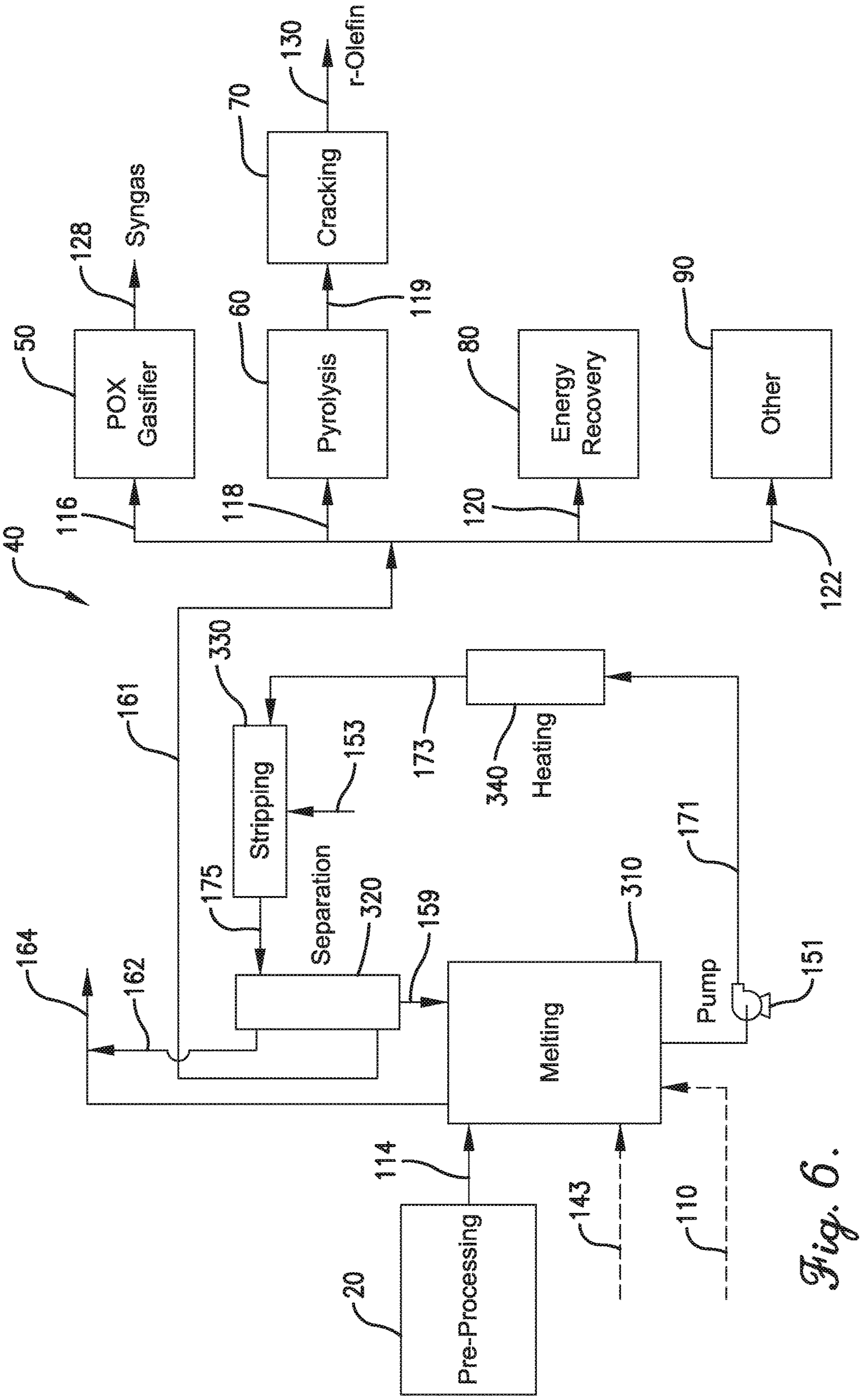
FIG. 6 is a block flow diagram illustrating an exemplary liquification zone of FIG. 5 according to embodiments of the present technology.

FIG. 6 shows the basic components in a liquification system that may be used as the liquification zone 40 in the chemical recycling facility illustrated in FIGS. 1*a* and 1 *b*. It should be understood that FIG. 6 depicts one exemplary embodiment of a liquification system. Certain features depicted in FIG. 6 may be omitted and/or additional features described elsewhere herein may be added to the system depicted in FIG. 6.

As shown in FIG. 6, a waste plastic feed, such as the PO-enriched waste plastic stream 114, may be derived from a waste plastic source, such as the preprocessing facility 20 discussed herein. The waste plastic feed, such as the PO-enriched waste plastic stream 114, may be introduced into the liquification zone 40, which FIG. 6 depicts as containing at least one melt tank 310, at least one circulation loop pump 312, at least one external heat exchanger 340, at least one stripping column 330, and at least one disengagement vessel 320. These various exemplary components and their functionality in the liquification zone 40 are discussed in greater detail below.

In an embodiment or in combination with any embodiment mentioned herein, and as shown in FIG. 6, the liquification zone 40 includes a melt tank 310 and a heater. The melt tank 310 receives the waste plastic feed, such as PO-enriched waste plastic stream 114, and the heater heats the waste plastic. In an embodiment or in combination with any embodiment mentioned herein, the melt tank 310 can include one or more continuously stirred tanks. When one or more rheology modification agents (e.g., solvents, depolymerization agents, plasticizers, and blending agents) are used in the liquification zone, such rheology modification agents can be added to and/or mixed with the PO-enriched plastic in or prior to the melt tank 310.

In an embodiment or in combination with any embodiment mentioned herein (not shown in FIG. 6), the heater of the liquification zone 40 can take the form of internal heat exchange coils located in the melt tank 310, a jacketing on the outside of the melt tank 310, a heat tracing on the outside of the melt tank 310, and/or electrical heating elements on the outside of the melt tank 310. Alternatively, as shown in FIG. 6, the heater of the liquification zone 40 can include an external heat exchanger 340 that receives a stream of liquified plastic 171 from the melt tank 310, heats it, and returns at least a portion of the heated liquified plastic stream 173 to the melt tank 310.

As shown in FIG. 6, when an external heat exchanger 340 is used to provide heat for the liquification zone 40, a circulation loop can be employed to continuously add heat to the PO-enriched material. In an embodiment or in combination with any embodiment mentioned herein, the circulation loop includes the melt tank 310, the external heat exchanger 340, conduits, shown as line 171, connecting the melt tank and the external heat exchanger, and a pump 151 for circulating liquified waste plastic in the circulation loop. When a circulation loop is employed, the liquified PO-enriched material produced can be continuously withdrawn from the liquification zone 40 as a fraction of the circulating PO-enriched stream via conduit 161 shown in FIG. 6.

In an embodiment or in combination with any embodiment mentioned herein, the liquification zone 40 may optionally contain equipment for removing halogens from the PO-enriched material. When the PO-enriched material is heated in the liquification zone 40, halogen enriched gases can evolve. By disengaging the evolved halogen-enriched gasses from the liquified PO-enriched material, the concentration of halogens in the PO-enriched material can be reduced.

In an embodiment or in combination with any embodiment mentioned herein, dehalogenation can be promoted by sparging a stripping gas (e.g., steam) into the liquified PO-enriched material either in the melt tank 310 or at another location in the circulation loop. As shown in FIG. 6, a stripper 330 and a disengagement vessel 320 can be provided in the circulation loop downstream of the external heat exchanger 340 and upstream of the melt tank 310. As shown in FIG. 6, the stripper 330 can receive the heated liquified plastic stream 173 from the external heat exchanger 340 and provide for the sparging of a stripping gas 153 into the liquified plastic. Sparging of a stripping gas 153 into the liquified plastic can create a two-phase medium in the stripper 330.

This two-phase medium introduced into the disengagement vessel 320 via stream 175 can then be flowed (e.g., by gravity) through the disengagement vessel 320, where a halogen-enriched gaseous phase is disengaged from a halogen-depleted liquid phase and removed from the disengagement vessel 320 via stream 162. Alternatively, as shown in FIG. 6, a portion of the heated liquefied plastic 173 from the external heat exchanger 340 may bypass the stripper 330 and be introduced directly into the disengagement vessel 320.

In an embodiment or in combination with any embodiment mentioned herein, a first portion of the halogen-depleted liquid phase discharged from an outlet of the disengagement vessel can be returned to the melt tank 310 in line 159, while a second portion of the halogen-depleted liquid phase can be discharged from the liquification zone as the dehalogenated, liquified, PO-enriched product stream 161. The disengaged halogen-enriched gaseous stream from the disengagement vessel 162 and from the melt tank 310 in line 164 can be removed from the liquification zone 40 for further processing and/or disposal.

In an embodiment or in combination with any embodiment mentioned herein, the dehalogenated liquified waste plastic stream 161 exiting the liquification zone 40 can have a halogen content of less than 500, less than 400, less than 300, less than 200, less than 100, less than 50, less than 10, less than 5, less than 2, less than 1, less than 0.5, or less than 0.1 ppmw. The halogen content of the liquified plastic stream 161 exiting the liquification zone 40 is not more than 95, not more than 90, not more than 75, not more than 50, not more than 25, not more than 10, or not more than 5 percent by weight of the halogen content of the PO-enriched stream introduced into the liquification zone.

As shown in FIG. 6, at least a portion of the dehalogenated liquified waste plastic stream 161 may be introduced into a downstream POX gasifier at a POX gasification facility 50 to produce a syngas composition and/or a downstream pyrolysis reactor at a pyrolysis facility 60 to produce pyrolysis vapors (i.e., pyrolysis gas and pyrolysis oil) and pyrolysis residue. Alternatively, or in addition, at least a portion of the dehalogenated liquified waste plastic stream 161 may be introduced into an energy recovery facility 80 and/or one or more other facilities, such as a separation or solidification facility.

In an embodiment or in combination with any embodiment mentioned herein, the chemical recycling facility 10 may not include a liquification zone 40. Alternatively, the chemical recycling facility may include a liquification zone 40 but may not include any type of dehalogenation zone or equipment.

Referring again to FIGS. 1*a* and 1 *b*, at least a portion of a PO-enriched plastic stream 114 from the preprocessing facility 20 and/or from liquification zone 40 (alone or in combination with one or more solvolysis coproduct streams 110) may be introduced into one or more of the downstream processing facilities including, for example, the pyrolysis facility 60, the cracking facility 70, the POX gasification facility 50, the energy recovery facility 80, and any of the other optional facilities 90 as discussed in detail below.

Pyrolysis

In an embodiment or in combination with any embodiment mentioned herein, the chemical recycling facility 10 generally depicted in FIGS. 1*a* and 1*b* may comprise a pyrolysis facility. As used herein the term "pyrolysis" refers to the thermal decomposition of one or more organic materials at elevated temperatures in an inert (i.e., substantially oxygen free) atmosphere. A "pyrolysis facility" is a facility that includes all equipment, lines, and controls necessary to carry out pyrolysis of waste plastic and feedstocks derived therefrom.

Figure 7:
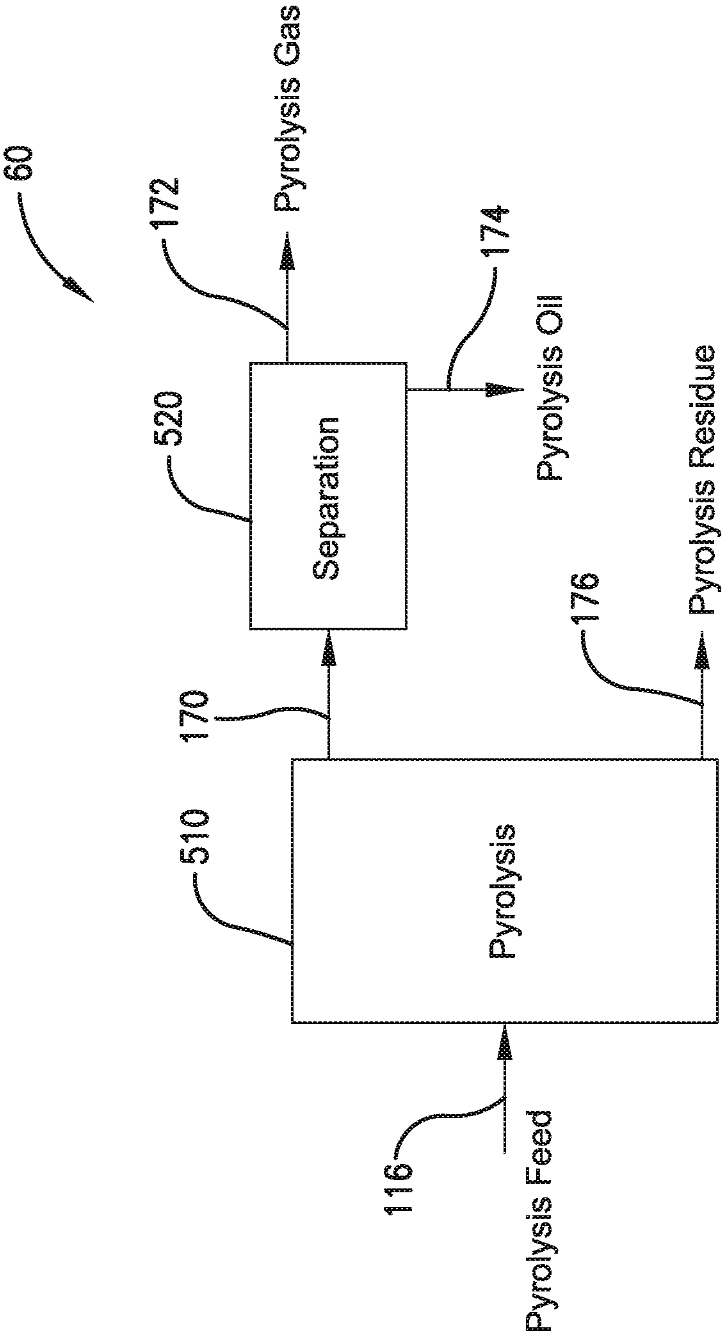
FIG. 7 is a block flow diagram illustrating the main steps of a pyrolysis process and facility for converting waste plastic into a pyrolyzed product streams according to embodiments of the present technology.

FIG. 7 depicts an exemplary pyrolysis facility 60 for converting a waste plastic stream 116, such as the liquefied waste plastic from a liquification zone, into a pyrolysis gas, a pyrolysis oil, and a pyrolysis residue. It should be understood that FIG. 7 depicts one exemplary embodiment of the present technology. Thus, certain features depicted in FIG. 7 may be omitted and/or additional features described elsewhere herein may be added to the system depicted in FIG. 7.

In an embodiment or in combination with any embodiment mentioned herein, a feed stream 116 to the pyrolysis facility 60 may comprise at least one of (i) at least one solvolysis coproduct stream as described previously, and (ii) a PO-enriched stream of waste plastic. One or more of these streams may be introduced into the pyrolysis facility 60 continuously or one or more of these streams may be introduced intermittently. When multiple types of feed streams are present, each may be introduced separately, or all or a portion of the streams may be combined so that the combined stream may be introduced into the pyrolysis facility 60. The combining, when performed, may take place in a continuous or batch manner. The feed introduced into the pyrolysis facility 60 can be in the form of liquified plastic (e.g., liquified, melted, plasticized, depolymerized, or combinations thereof), plastic pellets or particulates, or a slurry thereof.

In general, and as depicted in FIG. 5, the pyrolysis facility 60 includes a pyrolysis reactor 510 and a separator 520 for separating the product stream from the reactor. Although not depicted in FIG. 5, the separator 520 of the pyrolysis facility 60 can include various types of equipment including, but not limited to a filter system, a multistage separator, a condenser, and/or a quench tower.

While in the pyrolysis reactor 510, at least a portion of the feed may be subjected to a pyrolysis reaction that produces a pyrolysis effluent comprising a pyrolysis oil, a pyrolysis gas, and a pyrolysis residue. As used herein, the term "pyrolysis gas" refers to a composition obtained from pyrolysis that is gaseous at 25° C. at 1 atm. As used herein, the terms "pyrolysis oil" or "pyoil" refers to a composition obtained from pyrolysis that is liquid at 25° C. and 1 atm. As used herein, the term "pyrolysis residue" refers to a composition obtained from pyrolysis that is not pyrolysis gas or pyrolysis oil and that comprises predominantly pyrolysis char and pyrolysis heavy waxes. As used herein, the term "pyrolysis char" refers to a carbon-containing composition obtained from pyrolysis that is solid at 200° C. and 1 atm. As used herein, the term "pyrolysis heavy waxes," refers to C20+ hydrocarbons obtained from pyrolysis that are not pyrolysis char, pyrolysis gas, or pyrolysis oil. The pyrolysis gas and pyrolysis oil may exit the pyrolysis reactor 500 as a pyrolysis vapor stream 170.

Pyrolysis is a process that involves the chemical and thermal decomposition of the introduced feed. Although all pyrolysis processes may be generally characterized by a reaction environment that is substantially free of oxygen, pyrolysis processes may be further defined, for example, by the pyrolysis reaction temperature within the reactor, the residence time in the pyrolysis reactor, the reactor type, the pressure within the pyrolysis reactor, and the presence or absence of pyrolysis catalysts.

In an embodiment or in combination with any embodiment mentioned herein, the pyrolysis reactor 510 can be, for example, a film reactor, a screw extruder, a tubular reactor, a tank, a stirred tank reactor, a riser reactor, a fixed bed reactor, a fluidized bed reactor, a rotary kiln, a vacuum reactor, a microwave reactor, or an autoclave. The pyrolysis reactor 510 comprises a film reactor, such as a falling film reactor or an up-flow film reactor.

In an embodiment or in combination with any embodiment mentioned herein, the pyrolysis reaction can involve heating and converting the feedstock in an atmosphere that is substantially free of oxygen or in an atmosphere that contains less oxygen relative to ambient air. For example, the atmosphere within the pyrolysis reactor 510 may comprise not more than 5, not more than 4, not more than 3, not more than 2, not more than 1, or not more than 0.5 percent of oxygen gas based on the interior volume of the reactor 510.

In an embodiment or in combination with any embodiment mentioned herein, a lift gas and/or a feed gas may be used to introduce the feedstock into the pyrolysis reactor 510 and/or facilitate various reactions within the pyrolysis reactor 510. For instance, the lift gas and/or the feed gas may comprise, consist essentially of, or consist of nitrogen, carbon dioxide, and/or steam. The lift gas and/or feed gas may be added with the waste plastic stream 116 prior to introduction into the pyrolysis reactor 510 and/or may be added directly to the pyrolysis reactor 510. The lift gas and/or feed gas can include steam and/or a reducing gas such as hydrogen, carbon monoxide, and combinations thereof.

Furthermore, the temperature in the pyrolysis reactor 510 can be adjusted so as to facilitate the production of certain end products. In an embodiment or in combination with any embodiment mentioned herein, the pyrolysis temperature in the pyrolysis reactor 510 can be at least 325° C., at least 350° C., at least 375° C., at least 400° C., at least 425° C., at least 450° C., at least 475° C., at least 500° C., at least 525° C., at least 550° C., at least 575° C., at least 600° C., at least 625° C., at least 650° C., at least 675° C., at least 700° C., at least 725° C., at least 750° C., at least 775° C., or at least 800° C.

Additionally or alternatively, the pyrolysis temperature in the pyrolysis reactor can be not more than 1,100° C., not more than 1,050° C., not more than 1,000° C., not more than 950° C., not more than 900° C., not more than 850° C., not more than 800° C., not more than 750° C., not more than 700° C., not more than 650° C., not more than 600° C., not more than 550° C., not more than 525° C., not more than 500° C., not more than 475° C., not more than 450° C., not more than 425° C., or not more than 400° C. More particularly, the pyrolysis temperature in the pyrolysis reactor can range from 325 to 1,100° C., 350 to 900° C., 350 to 700° C., 350 to 550° C., 350 to 475° C., 425 to 1,100° C., 425 to 800° C., 500 to 1,100° C., 500 to 800° C., 600 to 1,100° C., 600 to 800° C., 650 to 1,000° C., or 650 to 800° C.

In an embodiment or in combination with any embodiment mentioned herein, the residence times of the feedstocks within the pyrolysis reactor can be at least 0.1, at least 0.2, at least 0.3, at least 0.5, at least 1, at least 1.2, at least 1.3, at least 2, at least 3, or at least 4 seconds. Alternatively, the residence times of the feedstocks within the pyrolysis reactor can be at least 1, at least 2, at least 3, at least 4, at least 5, at least 6, at least 7, at least 8, at least 9, at least 10, at least 20, at least 30, at least 45, at least 60, at least 75, or at least 90 minutes. Additionally, or alternatively, the residence times of the feedstocks within the pyrolysis reactor can be less than 6, less than 5, less than 4, less than 3, less than 2, less than 1, or less than 0.5 hours. Furthermore, the residence times of the feedstocks within the pyrolysis reactor can be less than 100, less than 90, less than 80, less than 70, less than 60, less than 50, less than 40, less than 30, less than 20, less than 10, less than 9, less than 8, less than 7, less than 6, less than 5, less than 4, less than 3, less than 2, or less than 1 seconds. More particularly, the residence times of the feedstocks within the pyrolysis reactor can range from 0.1 to 10 seconds, 0.5 to 10 seconds, 30 minutes to 4 hours, or 30 minutes to 3 hours, or 1 hour to 3 hours, or 1 hour to 2 hours.

In an embodiment or in combination with any embodiment mentioned herein, the pressure within the pyrolysis reactor can be maintained at a pressure of at least 0.1, at least 0.2, or at least 0.3 bar and/or not more than 60, not more than 50, not more than 40, not more than 30, not more than 20, not more than 10, not more than 8, not more than 5, not more than 2, not more than 1.5, or not more than 1.1 bar. The pressure within the pyrolysis reactor can be maintained at atmospheric pressure or within the range of 0.1 to 100 bar, or 0.1 to 60 bar, or 0.1 to 30 bar, or 0.1 to 10 bar, or 1.5 bar, 0.2 to 1.5 bar, or 0.3 to 1.1 bar. The pressure within the pyrolysis reactor can be at least 10, at least 20, at least 30, at least 40, at least 50, at least 60, or at least 70 bar and/or not more than 100, not more than 95, not more than 90, not more than 85, not more than 80, not more than 75, not more than 70, not more than 65, or not more than 60 bar. As used herein, the term "bar" refers to gauge pressure, unless otherwise noted.

In an embodiment or in combination with any embodiment mentioned herein, a pyrolysis catalyst may be introduced into the feed stream 116 prior to introduction into the pyrolysis reactor 510 and/or introduced directly into the pyrolysis reactor 510. The catalyst can be homogenous or heterogeneous and may include, for example, certain types of zeolites and other mesostructured catalysts. In some embodiments, the pyrolysis reaction may not be catalyzed (e.g., carried out in the absence of a pyrolysis catalyst), but may include a non-catalytic, heat-retaining inert additive, such as sand, in the reactor 510 in order to facilitate the heat transfer. Such catalyst-free pyrolysis processes may be referred to as "thermal pyrolysis."

In an embodiment or in combination with any embodiment mentioned herein, the pyrolysis reaction may occur in the substantial absence of a pyrolysis catalyst, at a temperature in the range of 350 to 600° C., at a pressure ranging from 0.1 to 100 bar, and at a residence time of 0.2 seconds to 4 hours, or 0.5 hours to 3 hours.

In an embodiment or in combination with any embodiment mentioned herein, the pyrolysis effluent or pyrolysis vapors may comprise at least 1, at least 5, at least 10, at least 15, at least 20, at least 25, at least 30, at least 35, at least 40, at least 45, at least 50, at least 55, at least 60, at least 65, at least 70, or at least 75 weight percent of the pyrolysis oil, which may be in the form of vapors in the pyrolysis effluent upon exiting the heated reactor; however, these vapors may be subsequently condensed into the resulting pyrolysis oil. Additionally, or alternatively, the pyrolysis effluent or pyrolysis vapors may comprise not more than 99, not more than 95, not more than 90, not more than 85, not more than 80, not more than 75, not more than 70, not more than 65, not more than 60, not more than 55, not more than 50, not more than 45, not more than 40, not more than 35, not more than 30, or not more than 25 weight percent of the pyrolysis oil, which may be in the form of vapors in the pyrolysis effluent upon exiting the heated reactor. The pyrolysis effluent or pyrolysis vapors may comprise in the range of 20 to 99 weight percent, 25 to 80 weight percent, 30 to 85 weight percent, 30 to 80 weight percent, 30 to 75 weight percent, 30 to 70 weight percent, or 30 to 65 weight percent of the pyrolysis oil, based on the total weight of the pyrolysis effluent or pyrolysis vapors.

In an embodiment or in combination with any embodiment mentioned herein, the pyrolysis effluent or pyrolysis vapors may comprise at least 1, at least 5, at least 10, at least 15, at least 20, at least 25, at least 30, at least 35, at least 40, at least 45, at least 50, at least 55, at least 60, at least 65, at least 70, at least 75, or at least 80 weight percent of the pyrolysis gas. Additionally, or alternatively, the pyrolysis effluent or pyrolysis vapors may comprise not more than 99, not more than 95, not more than 90, not more than 85, not more than 80, not more than 75, not more than 70, not more than 65, not more than 60, not more than 55, not more than 50, or not more than 45 weight percent of the pyrolysis gas. The pyrolysis effluent may comprise 1 to 90 weight percent, 10 to 85 weight percent, 15 to 85 weight percent, 20 to 80 weight percent, 25 to 80 weight percent, 30 to 75 weight percent, or 35 to 75 weight percent of the pyrolysis gas, based on the total weight of the stream.

In an embodiment or in combination with any embodiment mentioned herein, the pyrolysis effluent or pyrolysis vapors may comprise at least 0.5, at least 1, at least 2, at least 3, at least 4, at least 5, at least 6, at least 7, at least 8, at least 9, or at least 10 weight percent of the pyrolysis residue. Additionally, or alternatively, the pyrolysis effluent may comprise not more than 60, not more than 50, not more than 40, not more than 30, not more than 25, not more than 20, not more than 15, not more than 10, not more than 9, not more than 8, not more than 7, not more than 6, or not more than 5 weight percent of the pyrolysis residue. The pyrolysis effluent may comprise in the range of 0.1 to 25 weight percent, 1 to 15 weight percent, 1 to 8 weight percent, or 1 to 5 weight percent of the pyrolysis residue, based on the total weight of the stream.

In an embodiment or in combination with any embodiment mentioned herein, the pyrolysis effluent or pyrolysis vapors may comprise not more than 15, not more than 14, not more than 13, not more than 12, not more than 11, not more than 10, not more than 9, not more than 8, not more than 7, not more than 6, not more than 5, not more than 4, not more than 3, not more than 2, not more than 1, or not more than 0.5 weight percent of free water. As used herein, "free water" refers to water previously added (as liquid or steam) to the pyrolysis unit and water generated in the pyrolysis unit.

The pyrolysis system described herein may produce a pyrolysis effluent that can be separated into a pyrolysis oil stream 174, a pyrolysis gas stream 172, and a pyrolysis residue stream 176, each of which may be directly used in various downstream applications based on their formulations. The various characteristics and properties of the pyrolysis oil, pyrolysis gas, and pyrolysis residue are described below. It should be noted that, while all of the following characteristics and properties may be listed separately, it is envisioned that each of the following characteristics and/or properties of the pyrolysis gas, pyrolysis oil, and/or pyrolysis residue are not mutually exclusive and may be combined and present in any combination.

In an embodiment or in combination with any embodiment mentioned herein, the pyrolysis oil may predominantly comprise hydrocarbons having from 4 to 30 carbon atoms per molecule (e.g., C4 to C30 hydrocarbons). As used herein, the term "Cx" or "Cx hydrocarbon," refers to a hydrocarbon compound including "x" total carbons per molecule, and encompasses all olefins, paraffins, aromatics, heterocyclic, and isomers having that number of carbon atoms. For example, each of normal, iso, and tert-butane and butene and butadiene molecules would fall under the general description "C4." The pyrolysis oil may have a C4-C30 hydrocarbon content of at least 55, at least 60, at least 65, at least 70, at least 75, at least 80, at least 85, at least 90, or at least 95 weight percent based on the total weight of the pyrolysis oil stream 174.

In an embodiment or in combination with any embodiment mentioned herein, the pyrolysis oil can predominantly comprise C5 to C25 hydrocarbons, C5 to C22 hydrocarbons, or C5 to C20 hydrocarbons. For example, the pyrolysis oil may comprise at least 55, at least 60, at least 65, at least 70, at least 75, at least 80, at least 85, at least 90, or at least 95 weight percent of C5 to C25 hydrocarbons, C5 to C22 hydrocarbons, or C5 to C20 hydrocarbons, based on the total weight of the pyrolysis oil. The pyrolysis oil may have a C5-C12 hydrocarbon content of at least 5, at least 10, at least 15, at least 20, at least 25, at least 30, at least 35, at least 40, at least 45, at least 50, or at least 55 weight percent based on the total weight of the pyrolysis oil. Additionally, or alternatively, the pyrolysis oil may have a C5-C12 hydrocarbon content of not more than 95, not more than 90, not more than 85, not more than 80, not more than 75, not more than 70, not more than 65, not more than 60, not more than 55, or not more than 50 weight percent. The pyrolysis oil may have a C5-C12 hydrocarbon content in the range of 10 to 95 weight percent, 20 to 80 weight percent, or 35 to 80 weight percent, based on the total weight of the stream.

In an embodiment or in combination with any embodiment mentioned herein, the pyrolysis oil may also include various amounts of olefins and aromatics depending on reactor conditions and whether or not a catalyst is employed. The pyrolysis oil comprises at least 1, at least 5, at least 10, at least 15, at least 20, at least 25, at least 30, at least 35, or at least 40 weight percent of olefins and/or aromatics based on the total weight of the pyrolysis oil. Additionally, or alternatively, the pyrolysis oil may include not more than 90, not more than 80, not more than 70, not more than 60, not more than 50, not more than 45, not more than 40, not more than 35, not more than 30, not more than 25, not more than 20, not more than 15, not more than 10, not more than 5, or not more than 1 weight percent of olefins and/or aromatics. As used herein, the term "aromatics" refers to the total amount (in weight) of any compounds containing an aromatic moiety, such as benzene, toluene, xylene, and styrene.

In an embodiment or in combination with any embodiment mentioned herein, the pyrolysis oil may have a paraffin (e.g., linear or branch alkanes) content of at least 5, at least 10, at least 15, at least 20, at least 25, at least 30, at least 35, at least 40, at least 45, at least 50, at least 55, at least 60, or at least 65 weight percent based on the total weight of the pyrolysis oil. Additionally, or alternatively, the pyrolysis oil may have a paraffin content of not more than 99, not more than 97, not more than 95, not more than 93, not more than 90, not more than 85, not more than 80, not more than 75, not more than 70, not more than 65, not more than 60, not more than 55, not more than 50, not more than 45, not more than 40, not more than 35, or not more than 30 weight percent. The pyrolysis oil may have a paraffin content in the range of 25 to 90 weight percent, 35 to 90 weight percent, or 50 to 80 weight percent.

In an embodiment or in combination with any embodiment mentioned herein, the pyrolysis oil may have a mid-boiling point of at least 75° C., at least 80° C., at least 85° C., at least 90° C., at least 95° C., at least 100° C., at least 105° C., at least 110° C., or at least 115° C. and/or not more than 250° C., not more than 245° C., not more than 240° C., not more than 235° C., not more than 230° C., not more than 225° C., not more than 220° C., not more than 215° C., not more than 210° C., not more than 205° C., not more than 200° C., not more than 195° C., not more than 190° C., not more than 185° C., not more than 180° C., not more than 175° C., not more than 170° C., not more than 165° C., not more than 160° C., not more than 155° C., not more than 150° C., not more than 145° C., not more than 140° C., not more than 135° C., not more than 130° C., not more than 125° C., or not more than 120° C., as measured according to ASTM D-5399. The pyrolysis oil may have a mid-boiling point in the range of 75 to 250° C., 90 to 225° C., or 115 to 190° C. As used herein, "mid-boiling point" refers to the median boiling point temperature of the pyrolysis oil, where 50 percent by volume of the pyrolysis oil boils above the mid-boiling point and 50 percent by volume boils below the mid-boiling point.

In an embodiment or in combination with any embodiment mentioned herein, the boiling point range of the pyrolysis oil may be such that at least 90 percent of the pyrolysis oil boils off at a temperature of 250° C., of 280° C., of 290° C., of 300° C., or of 310° C., as measured according to ASTM D-5399.

Turning to the pyrolysis gas, the pyrolysis gas can have a methane content of at least 1, at least 2, at least 3, at least 4, at least 5, at least 6, at least 7, at least 8, at least 9, at least 10, at least 11, at least 12, at least 13, at least 14, or at least 15 and/or not more than 50, not more than 45, not more than 40, not more than 35, not more than 30, not more than 25, or not more than 20 weight percent based on the total weight of the pyrolysis gas. In an embodiment or in combination with any embodiment mentioned herein, the pyrolysis gas can have a methane content in the range of 1 to 50 weight percent, 5 to 50 weight percent, or 15 to 45 weight percent.

In an embodiment or in combination with any embodiment mentioned herein, the pyrolysis gas can have a C3 and/or C4 hydrocarbon content (including all hydrocarbons having 3 or 4 carbon atoms per molecule) of at least 5, at least 10, at least 15, at least 20, at least 25, at least 30, at least 35, at least 40, at least 45, at least 50, at least 55, or at least 60 and/or not more than 99, not more than 95, not more than 90, not more than 85, not more than 80, not more than 75, not more than 70, or not more than 65 weight percent based on the total weight of the pyrolysis gas. The pyrolysis gas can have a C3 hydrocarbon content, a C4 hydrocarbon content, or combined C3 and C4 hydrocarbon content in the range of 10 to 90 weight percent, 25 to 90 weight percent, or 25 to 80 weight percent.

In an embodiment or in combination with any embodiment mentioned herein, the pyrolysis gas can make up at least 10, at least 20, at least 30, at least 40, or at least 50 weight percent of the total effluent from the pyrolysis reactor and the pyrolysis gas can have a combined ethylene and propylene content of at least 25, at least 40, at least 50, at least 60, at least 70, or at least 75 percent by total weight of the pyrolysis gas.

Turning to the pyrolysis residue, in an embodiment or in combination with any embodiment mentioned herein, the pyrolysis residue comprises at least 20, at least 25, at least 30, at least 35, at least 40, at least 45, at least 50, at least 55, at least 60, at least 65, at least 70, at least 75, at least 80, or at least 85 weight percent of C20+ hydrocarbons based on the total weight of the pyrolysis residue. As used herein, "C20+ hydrocarbon" refers to hydrocarbon compounds containing at least 20 total carbons per molecule, and encompasses all olefins, paraffins, and isomers having that number of carbon atoms.

In an embodiment or in combination with any embodiment mentioned herein, the pyrolysis residue comprises at least 1, at least 2, at least 5, at least 10, at least 15, at least 20, at least 25, at least 30, at least 35, at least 40, at least 45, at least 50, at least 55, at least 60, at least 65, at least 70, at least 75, at least 80, at least 85, at least 90, at least 95, or at least 99 weight percent of carbon-containing solids based on the total weight of the pyrolysis residue. Additionally, or alternatively, the pyrolysis residue comprises not more than 99, not more than 90, not more than 80, not more than 70, not more than 60, not more than 50, not more than 40, not more than 30, not more than 20, not more than 10, not more than 9, not more than 8, not more than 7, not more than 6, not more than 5, or not more than 4 weight percent of carbon-containing solids. As used herein, "carbon-containing solids" refer to carbon-containing compositions that are derived from pyrolysis and are solid at 25° C. and 1 atm. The carbon-containing solids comprise at least 20, at least 30, at least 40, at least 50, at least 60, at least 70, at least 80, or at least 90 weight percent of carbon based on the total weight of the carbon-containing solids.

In an embodiment or in combination with any embodiment mentioned herein, at least a portion of the pyrolysis gas, pyrolysis oil, and pyrolysis residue may be routed to one or more of the other chemical processing facilities, including, for example, the energy recovery facility 80, the partial oxidation facility 50, one or more of the other facilities 90 discussed previously, and the cracking facility 70. In some embodiments, at least a portion of the pyrolysis gas stream 172 and/or at least a portion of the pyrolysis oil (pyoil) stream 174 can be introduced into the energy recovery facility 80, the cracking facility 70, the POX gasification facility 50, and combinations thereof, while the pyrolysis residue stream 176 may be introduced into the POX gasification facility 50 and/or the energy recovery facility 80. In some embodiments, at least a portion of the pyrolysis gas stream 172, pyrolysis oil stream 174, and/or pyrolysis residue stream 176 may be routed to one or more separation facilities (not shown in FIG. 1) to thereby form more purified streams of the pyrolysis gas, pyrolysis oil, and/or pyrolysis residue, which may then be routed to the energy recovery facility 80, the cracking facility 70, and/or the POX gasification facility 50. Additionally, or alternatively, all or a portion of the pyrolysis oil stream 176 can be combined with the PO-enriched waste plastic stream 114 to provide a liquified plastic stream fed to one or more of the downstream facilities as discussed herein.

Cracking

In an embodiment or in combination with any embodiment mentioned herein, at least a portion of one or more streams from the pyrolysis facility 60, or from one or more of the other facilities shown in FIGS. 1*a* and 1 *b*, may be introduced into a cracking facility 70. As used herein, the term "cracking" refers to breaking down complex organic molecules into simpler molecules by the breaking of carbon-carbon bonds. A "cracking facility" is a facility that includes all equipment, lines, and controls necessary to carry out cracking of a feedstock derived from waste plastic. A cracking facility can include one or more cracker furnaces, as well as a downstream separation zone including equipment used to process the effluent of the cracker furnace(s). As used herein, the terms "cracker" and "cracking" are used interchangeably.

Figure 8A:
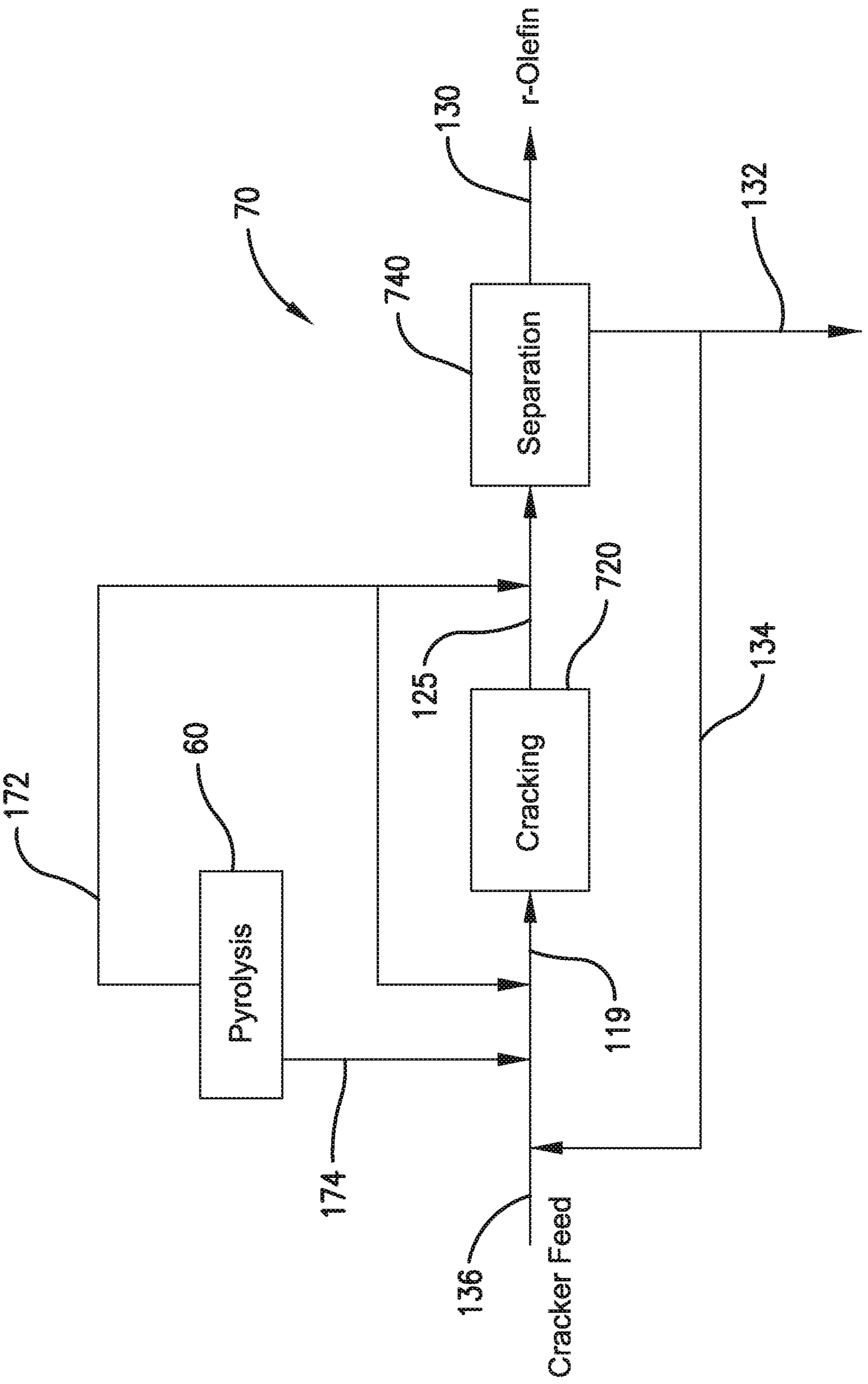
FIG. 8A is a block flow diagram illustrating the main steps of an integrated pyrolysis process and facility and a cracking process and facility according to embodiments of the present technology.

Turning now to FIG. 8*a*, a cracking facility 70 configured according to an embodiment or in combination with any embodiment mentioned herein of the present technology is shown. In general, the cracker facility 70 includes a cracker furnace 720 and a separation zone 740 downstream of the cracker furnace 720 for separating the furnace effluent into various end products, such as a recycle content olefin (r-olefin) stream 130. As shown in FIG. 8*a*, at least a portion of the pyrolysis gas stream 172 and/or pyrolysis oil stream 174 from a pyrolysis facility 60 can be sent to the cracking facility 70 via cracker feed stream 119. The pyrolysis oil stream 174 may be introduced into the inlet of the cracker furnace 720, while the pyrolysis gas stream 172 can be introduced into a location upstream or downstream of the furnace 720. As also shown in FIG. 8*a*, a stream of paraffin 132 (e.g., ethane and/or propane) may be withdrawn from the separation zone and may include recycle-content paraffin (r-paraffin). All or a portion of the paraffin may be recycled via stream 134 to the inlet of cracker furnace 720 as also shown in FIG. 8*a*. When used, the pyrolysis oil stream, pyrolysis gas stream 172, and recycled paraffin stream 174 may optionally be combined with a stream of cracker feed 136 to form the feed stream 119 to the cracking facility 720.

In an embodiment or in combination with any embodiment mentioned herein, a feed stream 119 to the cracking facility 70 may comprise at least one of (i) one or more solvolysis coproduct streams 110 as described previously, (ii) a PO-enriched stream of waste plastic 114, and (iii) a pyrolysis stream (e.g., pyrolysis gas 172 and/or pyrolysis oil 174). One or more of these streams may be introduced into the cracking facility 70 continuously or one or more of these streams may be introduced intermittently. When multiple types of feed streams are present, each may be introduced separately or all, or a portion of, the streams may be combined so that the combined stream may be introduced into the cracking facility 70. The combining, when performed, may take place in a continuous or batch manner. The feed stream or streams introduced into the cracking facility 70 can be in the form of a predominantly gas stream, a predominantly liquid stream, or combinations thereof.

As shown in FIG. 8*a*, a stream of pyrolysis gas 172 and/or pyrolysis oil 174 may be introduced into a cracker facility 70 along with or as the cracker feed stream 136. In some embodiments, the cracker feed stream 119 can comprise at least 1, at least 5, at least 10, at least 15, at least 20, at least 25, at least 30, at least 35, at least 40, at least 45, at least 50, at least 55, at least 60, at least 65, at least 70, at least 75, at least 80, at least 85, at least 90, or at least 95 weight percent of pyrolysis gas, pyrolysis oil, or pyrolysis gas and pyrolysis oil combined, based on the total weight of the stream 119. Alternatively, or in addition, the cracker feed stream 119 can comprise not more than 95, not more than 90, not more than 85, not more than 80, not more than 75, not more than 70, not more than 65, not more than 60, not more than 55, not more than 50, not more than 45, not more than 40, not more than 35, not more than 30, not more than 25, or not more than 20 weight percent of pyrolysis gas, pyrolysis oil, or a combination of pyrolysis gas and pyrolysis oil, based on the total weight of the stream 119, or it can include these components in an amount in the range of from 1 to 95 weight percent, 5 to 90 weight percent, or 10 to 85 percent, based on the total weight of the stream 119.

In some embodiments, the cracker feed stream 119 can include at least 5, at least 10, at least 15, at least 20, at least 25, at least 30, at least 35, at least 40, at least 45, at least 50, at least 55, at least 60, at least 65, at least 70, at least 75, at least 80, at least 85, at least 90, or at least 95 weight percent and/or not more than 95, not more than 90, not more than 85, not more than 80, not more than 75, not more than 70, not more than 65, not more than 60, not more than 55, not more than 50, not more than 45, not more than 40, not more than 35, not more than 30, not more than 25, or not more than 20 weight percent of a hydrocarbon feed other than pyrolysis gas and pyrolysis oil, based on the total weight of the cracker feed stream 119, or it can include a hydrocarbon feed other than pyrolysis gas and pyrolysis oil in an amount of from 5 to 95 weight percent, 10 to 90 weight percent, or 15 to 85 weight percent, based on the total weight of the cracker feed stream 119.

In an embodiment or in combination with any embodiment mentioned herein, the cracker feed stream 119 may comprise a predominantly C2 to C4 hydrocarbon containing composition. As used herein, the term "predominantly C2 to C4 hydrocarbon," refers to a stream or composition containing at least 50 weight percent of C2 to C4 hydrocarbon components. Examples of specific types of C2 to C4 hydrocarbon streams or compositions include propane, ethane, butane, and LPG. The cracker feed stream 119 may comprise at least 50, or at least 55, or at least 60, or at least 65, or at least 70, or at least 75, or at least 80, or at least 85, or at least 90, or at least 95, in each case wt. % based on the total weight of the feed, and/or not more than 100, or not more than 99, or not more than 95, or not more than 92, or not more than 90, or not more than 85, or not more than 80, or not more than 75, or not more than 70, or not more than 65, or not more than 60, in each case weight percent C2 to C4 hydrocarbons or linear alkanes, based on the total weight of the feed. The cracker feed stream 119 can comprise predominantly propane, predominantly ethane, predominantly butane, or a combination of two or more of these components.

In an embodiment or in combination with any embodiment mentioned herein, the cracker feed stream 119 may comprise a predominantly C5 to C22 hydrocarbon containing composition. As used herein, "predominantly C5 to C22 hydrocarbon" refers to a stream or composition comprising at least 50 weight percent of C5 to C22 hydrocarbon components. Examples include gasoline, naphtha, middle distillates, diesel, kerosene.

In an embodiment or in combination with any embodiment mentioned herein, the cracker feed stream 119 may comprise at least 20, or at least 25, or at least 30, or at least 35, or at least 40, or at least 45, or at least 50, or at least 55, or at least 60, or at least 65, or at least 70, or at least 75, or at least 80, or at least 85, or at least 90, or at least 95, in each case wt. % and/or not more than 100, or not more than 99, or not more than 95, or not more than 92, or not more than 90, or not more than 85, or not more than 80, or not more than 75, or not more than 70, or not more than 65, or not more than 60, in each case weight percent C5 to C22, or C5 to C20 hydrocarbons, based on the total weight of the stream, or it can include C5 to C22 in an amount in the range of from 20 to 100 weight percent, 25 to 95 weight percent, or 30 to 85 weight percent, based on the total weight of the stream.

In an embodiment or in combination with any embodiment mentioned herein, the cracker feed stream 119 may have a C15 and heavier (C15+) content of at least 0.5, or at least 1, or at least 2, or at least 5, in each case weight percent and/or not more than 40, or not more than 35, or not more than 30, or not more than 25, or not more than 20, or not more than 18, or not more than 15, or not more than 12, or not more than 10, or not more than 5, or not more than 3, in each case weight percent, based on the total weight of the feed, or it can be in the range of from 0.5 to 40 weight percent, 1 to 35 weight percent, or 2 to 30 weight percent, based on the total weight of the stream.

In an embodiment or in combination with any embodiment mentioned herein, the feed to the cracker furnace can comprise vacuum gas oil (VGO), hydrogenated vacuum gas oil (HVGO), or atmospheric gas oil (AGO). The cracker feed stream 119 can comprise at least 5, at least 10, at least 15, at least 20, at least 25, at least 30, at least 35, at least 40, at least 45, at least 50, at least 55, at least 60, at least 65, at least 70, at least 75, at least 80, at least 85, or at least 90 and/or not more than 99, not more than 95, not more than 90, not more than 85, not more than 80, not more than 75, not more than 70, not more than 65, not more than 60, not more than 55, or not more than 50 weight percent of at least one gas oil, based on the total weight of the stream, or it can be present in an amount in the range of from 5 to 99 weight percent, 10 to 90 weight percent, or 15 to 85 weight percent, or 5 to 50 weight percent, based on the total weight of the stream 119.

When two or more streams from the chemical recycling facility are combined with another to form the cracker feed stream, such a combination may occur upstream of, or within, the cracking furnace. Alternatively, the different feed streams may be introduced separately into the furnace, and may pass through a portion, or all, of the furnace simultaneously while being isolated from one another by feeding into separate tubes within the same furnace (e.g., a split furnace). Alternatively, at least a portion of the stream or streams from the chemical recycling facility may be introduced into the cracker facility at a location downstream of the cracker furnace, but upstream of one or more pieces of equipment in the separation facility.

Figure 8B:
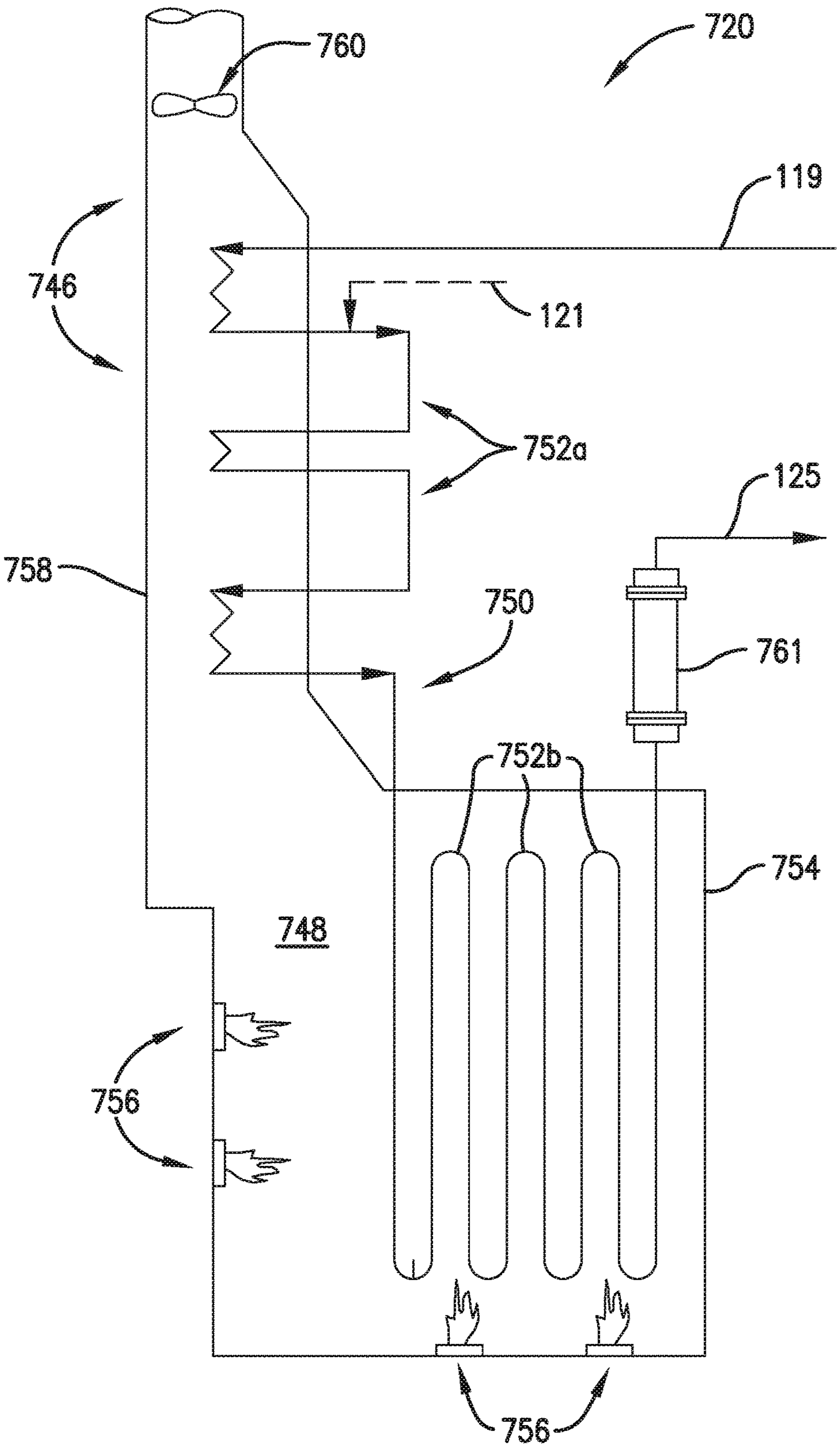
FIG. 8B is a schematic diagram of a cracking furnace according to embodiments of the present technology.
Figure 9:
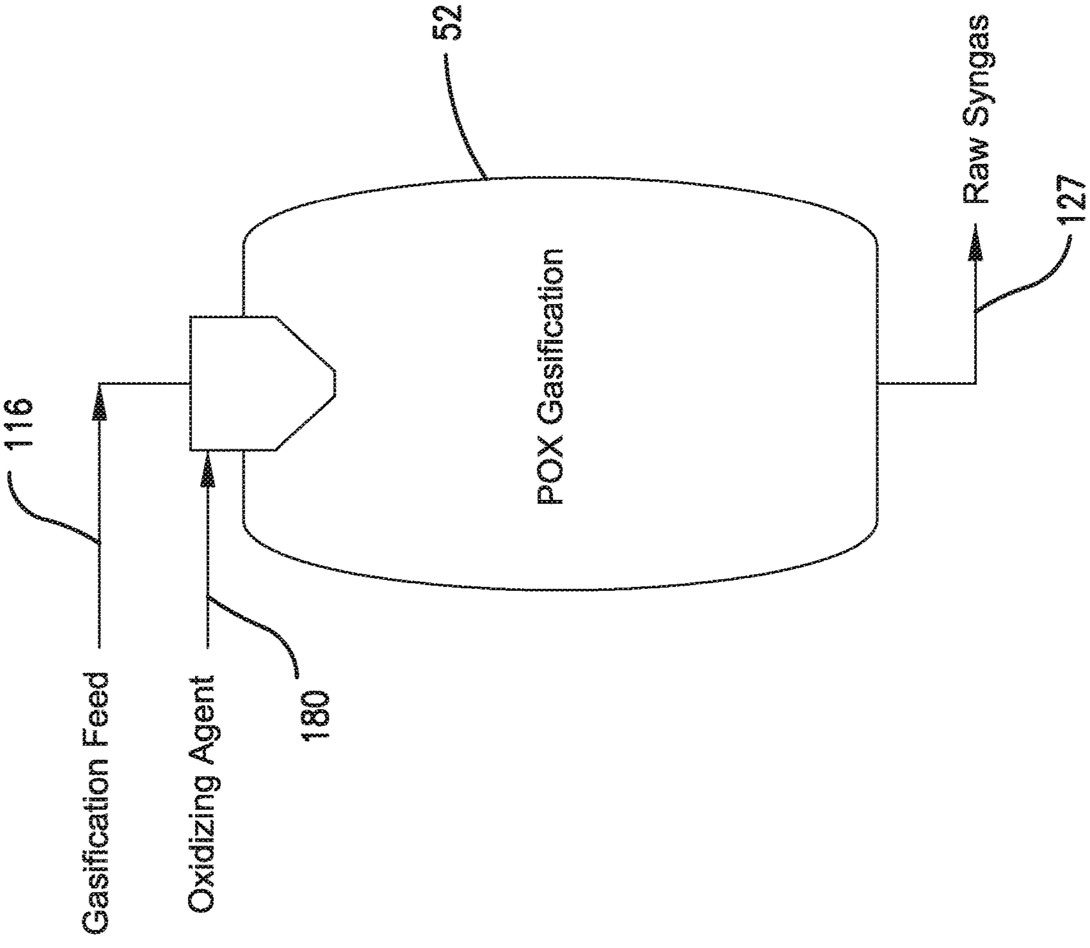
FIG. 9 is a schematic diagram of a POx reactor according to embodiments of the present technology.

As shown in FIG. 8*a*, the cracker feed stream 119 is introduced into a cracker furnace 720. Turning now to FIG. 8*b*, a schematic diagram of a cracker furnace 720 suitable for use in a chemical recycling facility and/or cracker facility as described herein is shown. As shown in FIG. 8*b*, the cracking furnace 720 can include a convection section 746, a radiant section 748, and a cross-over section 750 located between the convection 746 and radiant sections 748. The convection section 746 is the portion of the furnace that receives heat from hot flue gases and includes a bank of tubes or coils 752 through which a cracker stream passes. In the convection section 746, the cracker stream is heated by convection from the hot flue gasses passing therethrough. Although shown in FIG. 8*b* as including horizontally-oriented convection section tubes 752*a* and vertically-oriented radiant section tubes 752*b*, it should be understood that the tubes can be configured in any suitable configuration. For example, the convection section tubes 752*a* may be vertical. The radiant section tubes 752*b* may be horizontal. Additionally, although shown as a single tube, the cracker furnace 720 may comprise one or more tubes or coils that may include at least one split, bend, U, elbow, or combinations thereof. When multiple tubes or coils are present, such may be arranged in parallel and/or in series.

The radiant section 748 is the section of the furnace 720 into which heat is transferred into the heater tubes primarily by radiation from the high-temperature gas. The radiant section 748 also includes a plurality of burners 756 for introducing heat into the lower portion of the furnace 720. The furnace 720 includes a fire box 754 which surrounds and houses the tubes 752*b* within the radiant section 748 and into which the burners 756 are oriented. The cross-over section 750 includes piping for connecting the convection 746 and radiant 748 sections and may transfer the heated cracker stream from one section to the other within or external to the interior of the furnace 720.

As hot combustion gases ascend upwardly through the furnace stack, the gases may pass through the convection section 746, wherein at least a portion of the waste heat may be recovered and used to heat the cracker stream passing through the convection section 746. The cracking furnace 720 may have a single convection (preheat) section and a single radiant section, while, in other embodiments, the furnace may include two or more radiant sections sharing a common convection section. At least one induced draft (I.D.) fan 760 near the stack may control the flow of hot flue gas and heating profile through the furnace 720, and one or more heat exchangers 761 may be used to cool the furnace effluent. A liquid quench (not shown) may be used in addition to, or alternatively with, the exchanger 761 (e.g., transfer line heat exchanger or TLE) on the outlet of the furnace shown in FIG. 6*b* for cooling the cracked olefin-containing effluent 125.

In one or more embodiments, the pyrolysis gas may be introduced into the inlet of the cracker furnace, or all or a portion of the pyrolysis gas may be introduced downstream of the furnace outlet, at a location upstream of or within the separation zone of the cracker facility. When introduced into or upstream of the separation zone, the pyrolysis gas can be introduced upstream of the last stage of compression, or prior to the inlet of at least one fractionation column in the fractionation section of the separation zone.

Prior to entering the cracker facility 70, in one or more embodiments, a stream of raw pyrolysis gas 172 from a pyrolysis facility may undergo one or more separation steps to remove one or more components from the stream. Examples of such components can include, but are not limited to, halogens, aldehydes, oxygenated compounds, nitrogen-containing compounds, sulfur-containing compounds, carbon dioxide, water, vaporized metals, and combinations thereof. In one or more embodiments, the pyrolysis gas stream 172 introduced into the cracker facility 70 comprises at least 0.1, at least 0.5, at least 1, at least 1.5, at least 2, at least 2.5, at least 3, at least 3.5, at least 4, at least 4.5, or at least 5 and/or not more than 30, not more than 25, not more than 20, not more than 15, not more than 10, not more than 5, not more than 3, not more than 2, or not more than 1 weight percent of one or more aldehyde components, based on the total weight of the pyrolysis gas stream 172.

In an embodiment or in combination with any embodiment mentioned herein, the cracker facility 70 may comprise a single cracking furnace, or it can have at least 2, or at least 3, or at least 4, or at least 5, or at least 6, or at least 7, or at least 8 or more cracking furnaces operated in parallel. Any one or each furnace(s) may be gas cracker, or a liquid cracker, or a split furnace. The furnace can be a gas cracker receiving a cracker feed stream containing at least 50 wt. %, or at least 75 wt. %, or at least 85 wt. % or at least 90 wt. % ethane, propane, LPG, or a combination thereof through the furnace, or through at least one coil in a furnace, or through at least one tube in the furnace, based on the weight of all cracker feed to the furnace.

In an embodiment or in combination with any embodiment mentioned herein, the cracking furnace 720 can be a liquid or naphtha cracker receiving a cracker feed stream containing at least 50 wt. %, or at least 75 wt. %, or at least 85 wt. % liquid (when measured at 25° C. and 1 atm) hydrocarbons having a carbon number from C5-C22.

In an embodiment or in combination with any embodiment mentioned herein, the cracker feed stream 119 can be cracked in a gas furnace. A gas furnace is a furnace having at least one coil which receives (or operated to receive or configured to receive), at the inlet of the coil at the entrance to the convection zone, a predominately vapor-phase feed (more than 50% of the weight of the feed is vapor) ("gas coil"). The gas coil can receive a predominately C2-C4 feedstock, or a predominately a C2-C3 feedstock, to the inlet of the coil in the convection section, or alternatively, having at least one coil receiving more than 50 wt. % ethane and/or more than 50% propane and/or more than 50% LPG, or in any one of these cases at least 60 wt. %, or at least 70 wt. %, or at least 80 wt. %, based on the weight of the cracker feed to the coil, or alternatively based on the weight of the cracker feed to the convection zone.

The gas furnace may have more than one gas coil. In an embodiment or in combination with any embodiment mentioned herein, at least 25% of the coils, or at least 50% of the coils, or at least 60% of the coils, or all the coils in the convection zone or within a convection box of the furnace are gas coils. The gas coil receives, at the inlet of the coil at the entrance to the convection zone, a vapor-phase feed in which at least 60 wt. %, or at least 70 wt. %, or at least 80 wt. %, or at least 90 wt. %, or at least 95 wt. %, or at least 97 wt. %, or at least 98 wt. %, or at least 99 wt. %, or at least 99.5 wt. %, or at least 99.9 wt. % of feed is vapor.

In an embodiment or in combination with any embodiment mentioned herein, the feed stream can be cracked in a split furnace. A split furnace is a type of gas furnace. A split furnace contains at least one gas coil and at least one liquid coil within the same furnace, or within the same convection zone, or within the same convection box. A liquid coil is a coil which receives, at the inlet of coil at the entrance to the convection zone, a predominately liquid phase feed (more than 50% of the weight of the feed is liquid) ("liquid coil").

In an embodiment or in combination with any embodiment mentioned herein, the cracker feed stream 119 can be cracked in a thermal gas cracker.

In an embodiment or in combination with any embodiment mentioned herein, the cracker feed stream 119 can be cracked in a thermal steam gas cracker in the presence of steam. Steam cracking refers to the high-temperature cracking (decomposition) of hydrocarbons in the presence of steam. When present, steam may be introduced via line 121 shown in FIG. 8*b*.

In an embodiment or in combination with any embodiment mentioned herein, when two or more streams from the chemical recycling facility 10 shown in FIG. 1 are combined with another of the streams from the facility 10 to form the cracker feed stream 119, such a combination may occur upstream of, or within, the cracking furnace 720. Alternatively, the different feed streams may be introduced separately into the furnace 720, and may pass through a portion, or all, of the furnace 720 simultaneously while being isolated from one another by feeding into separate tubes within the same furnace 720 (e.g., a split furnace). Alternatively, at least a portion of the stream or streams from the chemical recycling facility may be introduced into the cracker facility at a location downstream of the cracker furnace, but upstream of one or more pieces of equipment in the separation facility.

The heated cracker stream 119 then passes through the cracking furnace 720, wherein the hydrocarbon components therein are thermally cracked to form lighter hydrocarbons, including olefins such as ethylene, propylene, and/or butadiene. The residence time of the cracker stream the furnace 720 can be at least 0.15, or at least 0.2, or at least 0.25, or at least 0.3, or at least 0.35, or at least 0.4, or at least 0.45, in each case seconds and/or not more than 2, or not more than 1.75, or not more than 1.5, or not more than 1.25, or not more than 1, or not more than 0.9, or not more than 0.8, or not more than 0.75, or not more than 0.7, or not more than 0.65, or not more than 0.6, or not more than 0.5, in each case seconds, or it can be in the range of from 0.15 to 2 seconds, 0.20 to 1.75 seconds, or 0.25 to 1.5 seconds.

The temperature of the cracked olefin-containing effluent 125 withdrawn from the furnace outlet can be at least 640, or at least 650, or at least 660, or at least 670, or at least 680, or at least 690, or at least 700, or at least 720, or at least 730, or at least 740, or at least 750, or at least 760, or at least 770, or at least 780, or at least 790, or at least 800, or at least 810, or at least 820, in each case ° C. and/or not more than 1000, or not more than 990, or not more than 980, or not more than 970, or not more than 960, or not more than 950, or not more than 940, or not more than 930, or not more than 920, or not more than 910, or not more than 900, or not more than 890, or not more than 880, or not more than 875, or not more than 870, or not more than 860, or not more than 850, or not more than 840, or not more than 830, in each case ° C., in the range of from 730 to 900° C., 750 to 875° C., or 750 to 850° C.

In an embodiment or in combination with any embodiment mentioned herein, the yield of olefin—ethylene, propylene, butadiene, or combinations thereof—can be at least 15, or at least 20, or at least 25, or at least 30, or at least 35, or at least 40, or at least 45, or at least 50, or at least 55, or at least 60, or at least 65, or at least 70, or at least 75, or at least 80, in each case percent. As used herein, the term "yield" refers to the mass of product produced from the mass of feedstock/mass of feedstock×100%. The olefin-containing effluent stream comprises at least 30, or at least 40, or at least 50, or at least 60, or at least 70, or at least 75, or at least 80, or at least 85, or at least 90, or at least 95, or at least 97, or at least 99, in each case weight percent of ethylene, propylene, or ethylene and propylene, based on the total weight of the effluent stream.

In an embodiment or in combination with any embodiment mentioned herein, the olefin-containing effluent stream 125 can comprise at least 10, at least 15, at least 20, at least 25, at least 30, at least 35, at least 40, at least 45, at least 50, at least 55, at least 60, at least 65, at least 70, at least 75, at least 80, at least 85, or at least 90 weight percent of C2 to C4 olefins. The stream 125 may comprise predominantly ethylene, predominantly propylene, or predominantly ethylene and propylene, based on the total weight of the olefin-containing effluent stream 125. The weight ratio of ethylene-to-propylene in the olefin-containing effluent stream 125 can be at least 0.2:1, at least 0.3:1, at least 0.4:1, at least 0.5:1, at least 0.6:1, at least 0.7:1, at least 0.8:1, at least 0.9:1, at least 1:1, at least 1.1:1, at least 1.2:1, at least 1.3:1, at least 1.4:1, at least 1.5:1, at least 1.6:1, at least 1.7:1, at least 1.8:1, at least 1.9:1, or at least 2:1 and/or not more than 3:1, not more than 2.9:1, not more than 2.8:1, not more than 2.7:1, not more than 2.5:1, not more than 2.3:1, not more than 2.2:1, not more than 2.1:1, not more than 2:1, not more than 1.7:1, not more than 1.5:1, or not more than 1.25:1.

Turning again to FIG. 6*a*, in an embodiment or in combination with any embodiment mentioned herein, when introduced into the cracker facility 70, the pyrolysis gas 172 may be introduced into the inlet of the cracker furnace 720, or all or a portion of the pyrolysis gas may be introduced downstream of the furnace outlet, at a location upstream of or within the separation zone 740 of the cracker facility 70. When introduced into or upstream of the separation zone 740, the pyrolysis gas can be introduced upstream of the last stage of compression, or prior to the inlet of at least one fractionation column in the fractionation section of the separation zone 740.

Prior to entering the cracker facility 70, in an embodiment or in combination with any embodiment mentioned herein, a stream of raw pyrolysis gas from a pyrolysis facility may undergo one or more separation steps to remove one or more components from the stream. Examples of such components can include, but are not limited to, halogens, aldehydes, oxygenated compounds, nitrogen-containing compounds, sulfur-containing compounds, carbon dioxide, water, vaporized metals, and combinations thereof. The pyrolysis gas stream 172 introduced into the cracker facility 70 comprises at least 0.1, at least 0.5, at least 1, at least 1.5, at least 2, at least 2.5, at least 3, at least 3.5, at least 4, at least 4.5, or at least 5 and/or not more than 30, not more than 25, not more than 20, not more than 15, not more than 10, not more than 5, not more than 3, not more than 2, or not more than 1 weight percent of one or more aldehyde components, based on the total weight of the pyrolysis gas stream 172.

In an embodiment or in combination with any embodiment mentioned herein, the total ethylene content of the pyrolysis gas stream 172 can be at least 1, at least 2, at least 5, at least 7, at least 10, at least 15, at least 20, at least 25, or at least 30 weight percent and/or not more than 60, not more than 55, not more than 50, not more than 45, not more than 40, or not more than 35 weight percent, based on the total weight of the stream 172. Alternatively, or in addition, the total propylene content of the pyrolysis gas stream 172 can be at least 1, at least 2, at least 5, at least 7, at least 10, at least 15, at least 20, at least 25, or at least 30 weight percent and/or not more than 60, not more than 55, not more than 50, not more than 45, not more than 40, or not more than 35 weight percent, based on the total weight of the stream 172. The combined amount of ethylene and propylene in the pyrolysis gas stream 172 can be at least 2, at least 5, at least 10, at least 15, at least 20, at least 25, at least 30, at least 35, at least 40, or at least 45 weight percent and/or not more than 85, not more than 80, not more than 75, not more than 70, not more than 65, not more than 60, not more than 55, not more than 50, or not more than 45 weight percent, based on the total weight of the stream.

Upon exiting the cracker furnace outlet, the olefin-containing effluent stream 125 may be cooled rapidly (e.g., quenched) in order to prevent production of large amounts of undesirable by-products and to minimize fouling in downstream equipment. In an embodiment or in combination with any embodiment mentioned herein, the temperature of the olefin-containing effluent from the furnace can be reduced by 35 to 485° C., 35 to 375° C., or 90 to 550° C. to a temperature of 500 to 760° C. during the quench or cooling step.

The resulting cooled effluent stream can be then separated in a vapor-liquid separator, and the vapor can be compressed in a gas compressor having, for example, between 1 and 5 compression stages with optional inter-stage cooling and liquid removal. The pressure of the gas stream at the outlet of the first set of compression stages is in the range of from 7 to 20 bar gauge (barg), 8.5 to 18 barg, or 9.5 to 14 barg. The resulting compressed stream is then treated for removal of acid gases, including halogens, CO, $CO_2$, and $H_2S$ by contact with an acid gas removal agent. Examples of acid gas removal agents can include, but are not limited to, caustic and various types of amines. In an embodiment or in combination with any embodiment mentioned herein, a single contactor may be used, while, in other embodiments, a dual column absorber-stripper configuration may be employed.

The treated compressed olefin-containing stream may then be further compressed in another compressor, optionally with inter-stage cooling and liquid separation. The resulting compressed stream, which has a pressure in the range of 20 to 50 barg, 25 to 45 barg, or 30 to 40 barg. Any suitable moisture removal method can be used including, for example, molecular sieves or other similar process. The resulting stream may then be passed to the fractionation section, wherein the olefins and other components may be separated in to various high-purity product or intermediate streams. In some embodiments, all or a portion of the pyrolysis gas may be introduced prior to and/or after one or more stages of the second compressor. Similarly, the pressure of the pyrolysis gas is within 20, within 50, within 100, or within 150 psi of the pressure of the stream with which it is being combined.

In an embodiment or in combination with any embodiment mentioned herein, a feed stream from the quench section may be introduced into at least one column within a fractionation section of the separation zone. As used herein, the term "fractionation" refers to the general process of separating two or more materials having different boiling points. Examples of equipment and processes that utilize fractionation include, but are not limited to, distillation, rectification, stripping, and vapor-liquid separation (single stage).

In an embodiment or in combination with any embodiment mentioned herein, the fractionation section of the cracker facility may include one or more of a demethanizer, a deethanizer, a depropanizer, an ethylene splitter, a propylene splitter, a debutanizer, and combinations thereof. As used herein, the term "demethanizer," refers to a column whose light key component is methane. Similarly, "deethanizer," and "depropanizer," refer to columns with ethane and propane as the light key component, respectively.

Any suitable arrangement of columns may be used so that the fractionation section provides at least one olefin product stream and at least one paraffin stream. In an embodiment or in combination with any embodiment mentioned herein, the fractionation section can provide at least two olefin streams, such as ethylene and propylene, and at least two paraffin streams, such as ethane and propane, as well as additional streams including, for example, methane and lighter components and butane and heavier components.

In an embodiment or in combination with any embodiment mentioned herein, the olefin stream withdrawn from the fractionation section can comprise at least 50, at least 55, at least 60, at least 65, at least 70, at least 75, at least 80, at least 85, at least 90, or at least 95 weight percent and/or not more than 100, not more than 99, not more than 97, not more than 95, not more than 90, not more than 85, or not more than 80 weight percent of olefins, based on the total weight of the olefin stream. The olefins can be predominantly ethylene or predominantly propylene. The olefin stream can comprise at least 50, at least 55, at least 60, at least 65, at least 70, at least 75, at least 80, at least 85, at least 90, or at least 95 weight percent and/or not more than 99, not more than 97, not more than 95, not more than 90, not more than 85, not more than 80, not more than 75, not more than 70, or not more than 65 weight percent of ethylene, based on the total weight of olefins in the olefin stream. The olefin stream may comprise at least 20, at least 25, at least 30, at least 35, at least 40, at least 45, at least 50, at least 55, or at least 60 weight percent and/or not more than 80, not more than 75, not more than 70, not more than 65, not more than 60, not more than 55, not more than 50, or not more than 45 weight percent of ethylene, based on the total weight of the olefin stream, or it can be present in an amount in the range of from 20 to 80 weight percent, 25 to 75 weight percent, or 30 to 70 weight percent, based on the total weight of the olefin stream.

Alternatively, or in addition, the olefin stream can comprise at least 50, at least 55, at least 60, at least 65, at least 70, at least 75, at least 80, at least 85, at least 90, or at least 95 weight percent and/or not more than 99, not more than 97, not more than 95, not more than 90, not more than 85, not more than 80, not more than 75, not more than 70, or not more than 65 weight percent of propylene, based on the total weight of olefins in the olefin stream. In an embodiment or in combination with any embodiment mentioned herein, the olefin stream may comprise at least 20, at least 25, at least 30, at least 35, at least 40, at least 45, at least 50, at least 55, or at least 60 weight percent and/or not more than 80, not more than 75, not more than 70, not more than 65, not more than 60, not more than 55, not more than 50, or not more than 45 weight percent of propylene, based on the total weight of the olefin stream, or it can be present in an amount in the range of from 20 to 80 weight percent, 25 to 75 weight percent, or 30 to 70 weight percent, based on the total weight of the olefin stream.

As the compressed stream passes through the fractionation section, it passed through a demethanizer column, wherein the methane and lighter (CO, $CO_2$, $H_2$) components are separated from the ethane and heavier components. The demethanizer can be operated at a temperature of at least −145, or at least −142, or at least −140, or at least −135, in each case ° C. and/or not more than −120, not more than −125, not more than −130, not more than −135° C. The bottoms stream from the demethanizer column includes at least 50, or at least 55, or at least 60, or at least 65, or at least 70, or at least 75, or at least 80, or at least 85, or at least 90, or at least 95 or at least 99, in each case percent of the total amount of ethane and heavier components.

In an embodiment or in combination with any embodiment mentioned herein, all or a portion of the stream introduced into the fractionation section can be introduced into a deethanizer column, wherein the C2 and lighter components are separated from the C3 and heavier components by fractional distillation. The deethanizer can be operated with an overhead temperature of at least −35, or at least −30, or at least −25, or at least −20, in each case ° C. and/or not more than −5, not more than −10, not more than −15, not more than −20° C., and an overhead pressure of at least 3, or at least 5, or at least 7, or at least 8, or at least 10, in each case barg and/or not more than 20, or not more than 18, or not more than 17, or not more than 15, or not more than 14, or not more than 13, in each case barg. The deethanizer column recovers at least 60, or at least 65, or at least 70, or at least 75, or at least 80, or at least 85, or at least 90, or at least 95, or at least 97, or at least 99, in each case percent of the total amount of C2 and lighter components introduced into the column in the overhead stream. The overhead stream removed from the deethanizer column comprises at least 50, or at least 55, or at least 60, or at least 65, or at least 70, or at least 75, or at least 80, or at least 85, or at least 90, or at least 95, in each case weight percent of ethane and ethylene, based on the total weight of the overhead stream.

In an embodiment or in combination with any embodiment mentioned herein, the C2 and lighter overhead stream from a deethanizer can be further separated in an ethane-ethylene fractionator column (ethylene fractionator or ethylene splitter). In the ethane-ethylene fractionator column, an ethylene and lighter component stream can be withdrawn from the overhead of the column or as a side stream from the top half of the column, while the ethane and any residual heavier components are removed in the bottoms stream. The ethylene fractionator may be operated at an overhead temperature of at least −45, or at least −40, or at least −35, or at least −30, or at least −25, or at least −20, in each case ° C. and/or not more than −15, or not more than −20, or not more than −25, in each case ° C., and an overhead pressure of at least 10, or at least 12, or at least 15, in each case barg and/or not more than 25, not more than 22, not more than 20 barg. The overhead stream, which may be enriched in ethylene, can include at least 70, or at least 75, or at least 80, or at least 85, or at least 90, or at least 95, or at least 97, or at least 98, or at least 99, in each case weight percent ethylene, based on the total weight of the stream and may be sent to downstream processing unit for further processing, storage, or sale.

The bottoms stream from the ethane-ethylene fractionator may include at least 40, or at least 45, or at least 50, or at least 55, or at least 60, or at least 65, or at least 70, or at least 75, or at least 80, or at least 85, or at least 90, or at least 95, or at least 98, in each case weight percent ethane, based on the total weight of the bottoms stream. All or a portion of the recovered ethane may be recycled to the inlet of the cracker furnace as additional feedstock, alone or in combination with the pyrolysis oil and/or pyrolysis gas, as discussed previously.

In some embodiments, at least a portion of the compressed stream may be separated in a depropanizer, wherein C3 and lighter components are removed as an overhead vapor stream, while C4 and heavier components exit the column in the liquid bottoms. The depropanizer can be operated with an overhead temperature of at least 20, or at least 35, or at least 40, in each case ° C. and/or not more than 70, 65, 60, 55° C., and an overhead pressure of at least 10, or at least 12, or at least 15, in each case barg and/or not more than 20, or not more than 17, or not more than 15, in each case barg. The depropanizer column recovers at least 60, or at least 65, or at least 70, or at least 75, or at least 80, or at least 85, or at least 90, or at least 95, or at least 97, or at least 99, in each case percent of the total amount of C3 and lighter components introduced into the column in the overhead stream. In an embodiment or in combination with any embodiment mentioned herein, the overhead stream removed from the depropanizer column comprises at least or at least 50, or at least 55, or at least 60, or at least 65, or at least 70, or at least 75, or at least 80, or at least 85, or at least 90, or at least 95, or at least 98, in each case weight percent of propane and propylene, based on the total weight of the overhead stream.

In an embodiment or in combination with any embodiment mentioned herein, the overhead stream from the depropanizer may be introduced into a propane-propylene fractionator (propylene fractionator or propylene splitter), wherein the propylene and any lighter components are removed in the overhead stream and the propane and any heavier components exit the column in the bottoms stream. The propylene fractionator may be operated at an overhead temperature of at least 20, or at least 25, or at least 30, or at least 35, in each case ° C. and/or not more than 55, not more than 50, not more than 45, not more than 40° C., and an overhead pressure of at least 12, or at least 15, or at least 17, or at least 20, in each case barg and/or not more than 20, or not more than 17, or not more than 15, or not more than 12, in each case barg. The overhead stream, which is enriched in propylene, can include at least 70, or at least 75, or at least 80, or at least 85, or at least 90, or at least 95, or at least 97, or at least 98, or at least 99, in each case weight percent propylene, based on the total weight of the stream and may be sent to downstream processing unit for further processing, storage, or sale.

The bottoms stream from the propane-propylene fractionator may include at least 40, or at least 45, or at least 50, or at least 55, or at least 60, or at least 65, or at least 70, or at least 75, or at least 80, or at least 85, or at least 90, or at least 95, or at least 98, in each case weight percent propane, based on the total weight of the bottoms stream. All or a portion of the recovered propane may be recycled to the cracker furnace as additional feedstock, alone or in combination with pyrolysis oil and/or pyrolysis gas, as discussed previously.

In an embodiment or in combination with any embodiment mentioned herein, at least a portion of the compressed stream may be sent to a debutanizer column for separating C4 and lighter components, including butenes, butanes and butadienes, from C5 and heavier (C5+) components. The debutanizer can be operated with an overhead temperature of at least 20, or at least 25, or at least 30, or at least 35, or at least 40, in each case ° C. and/or not more than 60, or not more than 65, or not more than 60, or not more than 55, or not more than 50, in each case ° C. and an overhead pressure of at least 2, or at least 3, or at least 4, or at least 5, in each case barg and/or not more than 8, or not more than 6, or not more than 4, or not more than 2, in each case barg. The debutanizer column recovers at least 60, or at least 65, or at least 70, or at least 75, or at least 80, or at least 85, or at least 90, or at least 95, or at least 97, or at least 99, in each case percent of the total amount of C4 and lighter components introduced into the column in the overhead stream.

In an embodiment or in combination with any embodiment mentioned herein, the overhead stream removed from the debutanizer column comprises at least 30, or at least 35, or at least 40, or at least 45, or at least 50, or at least 55, or at least 60, or at least 65, or at least 70, or at least 75, or at least 80, or at least 85, or at least 90, or at least 95, in each case weight percent of butadiene, based on the total weight of the overhead stream. The bottoms stream from the debutanizer includes mainly C5 and heavier components, in an amount of at least 50, or at least 60, or at least 70, or at least 80, or at least 90, or at least 95 weight percent, based on the total weight of the stream. The debutanizer bottoms stream may be sent for further separation, processing, storage, sale or use. In an embodiment or in combination with any embodiment mentioned herein, the overhead stream from the debutanizer, or the C4s, can be subjected to any conventional separation methods such as extraction or distillation processes to recover a more concentrated stream of butadiene.

In an embodiment or in combination with any embodiment mentioned herein, at least a portion of one or more of the above streams may be introduced into one or more of the facilities shown in FIGS. 1*a* and 1 *b*, while, in other embodiments, all or a portion of the streams withdrawn from the separation zone of the cracking facility may be routed to further separation and/or storage, transportation, sale, and/or use.

Partial Oxidation (POX) Gasification

In an embodiment or in combination with any embodiment mentioned herein, the chemical recycling facility may also comprise a partial oxidation (POX) gasification facility. As used herein, the term "partial oxidation" to high temperature conversion of a carbon-containing feed into syngas (carbon monoxide, hydrogen, and carbon dioxide), where the conversion is carried out in the presence of a sub-stoichiometric amount of oxygen. The conversion can be of a hydrocarbon-containing feed and can be carried out with an amount of oxygen that is less than the stoichiometric amount of oxygen needed for complete oxidation of the feed—i.e., all carbon oxidized to carbon dioxide and all hydrogen oxidized to water. The reactions occurring within a partial oxidation (POX) gasifier include conversion of a carbon-containing feed into syngas, and specific examples include, but are not limited to partial oxidation, water gas shift, water gas—primary reactions, Boudouard, oxidation, methanation, hydrogen reforming, steam reforming, and carbon dioxide reforming. The feed to POX gasification can include solids, liquids, and/or gases. A "partial oxidation facility" or "POX gasification facility" is a facility that includes all equipment, lines, and controls necessary to carry out POX gasification of waste plastic and feedstocks derived therefrom.

In the POX gasification facility, the feed stream may be converted to syngas in the presence of a sub-stoichiometric amount of oxygen. In an embodiment or in combination with any embodiment mentioned herein, the feed stream to the POX gasification facility may comprise one or more of a PO-enriched waste plastic, at least one solvolysis coproduct stream, a pyrolysis stream (including pyrolysis gas, pyrolysis oil, and/or pyrolysis residue), and at least one stream from the cracking facility. One or more of these streams may be introduced into the POX gasification facility continuously or one or more of these streams may be introduced intermittently. When multiple types of feed streams are present, each may be introduced separately, or all or a portion of the streams may be combined so that the combined stream may be introduced into the POX gasification facility. The combining, when present, may take place in a continuous or batch manner. The feed stream can be in the form of a gas, a liquid or liquified plastic, solids (usually comminuted), or a slurry.

The POX gasification facility includes at least one POX gasification reactor. An exemplary POX gasification reactor 52 is shown in FIG. 7. The POX gasification unit may comprise a gas-fed, a liquid-fed, or a solid-fed reactor (or gasifier). In an embodiment or in combination with any embodiment mentioned herein, the POX gasification facility may perform liquid-fed POX gasification. As used herein, "liquid-fed POX gasification" refers to a POX gasification process where the feed to the process comprises predominately (by weight) components that are liquid at 25° C. and 1 atm. Additionally, or alternatively, POX gasification unit may perform gas-fed POX gasification. As used herein, "gas-fed POX gasification" refers to a POX gasification process where the feed to the process comprises predominately (by weight) components that are gaseous at 25° C. and 1 atm.

Additionally, or alternatively, POX gasification unit may conduct solid-fed POX gasification. As used herein, "solid-fed POX gasification" refers to a POX gasification process where the feed to the process comprises predominately (by weight) components that are solid at 25° C. and 1 atm.

Gas-fed, liquid-fed, and solid-fed POX gasification processes can be co-fed with lesser amounts of other components having a different phase at 25° C. and 1 atm. Thus, gas-fed POX gasifiers can be co-fed with liquids and/or solids, but only in amounts that are less (by weight) than the amount of gasses fed to the gas-phase POX gasifier; liquid-fed POX gasifiers can be co-fed with gasses and/or solids, but only in amounts (by weight) less than the amount of liquids fed to the liquid-fed POX gasifier; and solid-fed POX gasifiers can be co-fed with gasses and/or liquids, but only in amounts (by weight) less than the amount of solids fed to the solid-fed POX gasifier.

In an embodiment or in combination with any embodiment mentioned herein, the total feed to a gas-fed POX gasifier can comprise at least 60, at least 70, at least 80, at least 90, or at least 95 weight percent of components that are gaseous at 25° C. and 1 atm; the total feed to a liquid-fed POX gasifier can comprise at least 60, at least 70, at least 80, at least 90, or at least 95 weight percent of components that are liquid at 25° C. and 1 atm; and the total feed to a solid-fed POX gasifier can comprise at least 60, at least 70, at least 80, at least 90, or at least 95 weight percent of components that are solids at 25° C. and 1 atm.

As generally shown in FIG. 7, the gasification feeds stream 116 may be introduced into a gasification reactor along with an oxidizing agent stream 180. The feedstock stream 116 and the oxidizing agent stream 180 may be sprayed through an injector assembly into a pressurized gasification zone having, for example, a pressure, typically at least 500, at least 600, at least 800, or at least 1,000 psig, (or at least 35, at least 40, at least 55, or at least 70 barg).

In an embodiment or in combination with any embodiment mentioned herein, the oxidizing agent in stream 180 comprises an oxidizing gas that can include air, oxygen-enriched air, or molecular oxygen (O2). The oxidizing agent can comprise at least 25, at least 35, at least 40, at least 50, at least 60, at least 70, at least 80, at least 90, at least 95, at least 97, at least 99, or at least 99.5 mole percent of molecular oxygen based on the total moles of all components in the oxidizing agent stream 180 injected into the reaction (combustion) zone of the gasification reactor 52. The particular amount of oxygen as supplied to the reaction zone can be sufficient to obtain near or maximum yields of carbon monoxide and hydrogen obtained from the gasification reaction relative to the components in the feed stream 116, considering the amount relative to the feed stream, and the amount of feed charged, the process conditions, and the reactor design.

The oxidizing agent can include other oxidizing gases or liquids, in addition to or in place of air, oxygen-enriched air, and molecular oxygen. Examples of such oxidizing liquids suitable for use as oxidizing agents include water (which can be added as a liquid or as steam) and ammonia. Examples of such oxidizing gases suitable for use as oxidizing agents include carbon monoxide, carbon dioxide, and sulfur dioxide.

In an embodiment or in combination with any embodiment mentioned herein, an atomization enhancing fluid is fed to the gasification zone along with the feedstock and oxidizing agent. As used herein, the term "atomization enhancing fluid" refers to a liquid or gas operable to reduce viscosity to decrease dispersion energy, or increase energy available to assist dispersion. The atomization enhancing fluid may be mixed with the plastic-containing feedstock before the feedstock is fed into the gasification zone or separately added to the gasification zone, for example to an injection assembly coupled with the gasification reactor. In an embodiment or in combination with any embodiment mentioned herein, the atomization enhancing fluid is water and/or steam. However, in an embodiment or in combination with any embodiment mentioned herein, steam and/or water is not supplied to the gasification zone.

In an embodiment or in combination with any embodiment mentioned herein, a gas stream enriched in carbon dioxide or nitrogen (e.g., greater than the molar quantity found in air, or at least 2, at least 5, at least 10, or at least 40 mole percent) is charged into the gasifier. These gases may serve as carrier gases to propel a feedstock to a gasification zone. Due to the pressure within the gasification zone, these carrier gases may be compressed to provide the motive force for introduction into the gasification zone. This gas stream may be compositionally the same as or different than the atomization enhancing fluid. In an embodiment or in combination with any embodiment mentioned herein, this gas stream also functions as the atomization enhancing fluid.

In an embodiment or in combination with any embodiment mentioned herein, a gas stream enriched in hydrogen ($H_2$) (e.g., at least 1, at least 2, at least 5, at least 10, at least 20, at least 30, at least 40, at least 50, at least 60, at least 70, at least 80, or at least 90 mole percent is charged into the gasifier. Hydrogen may be added to affect the partial oxidation reactions so as to control the resulting syngas composition.

In an embodiment or in combination with any embodiment mentioned herein, no gas stream containing more than 0.01 or more than 0.02 mole percent of carbon dioxide is charged to the gasifier or gasification zone. Alternatively, no gas stream containing more than 77, more than 70, more than 50, more than 30, more than 10, more than 5, or more than 3 mole percent nitrogen is charged to the gasifier or gasification zone. Furthermore, a gaseous hydrogen stream more than 0.1, more than 0.5, more than 1, or more than 5 mole percent hydrogen is not charged to the gasifier or to the gasification zone. Moreover, a stream of methane gas containing more than 0.1, more than 0.5, more than 1, or more than 5 mole percent methane is not charged to the gasifier or to the gasification zone. In certain embodiments, the only gaseous stream introduced to the gasification zone is the oxidizing agent.

The gasification process can be a partial oxidation (POX) gasification reaction, as described previously. Generally, to enhance the production of hydrogen and carbon monoxide, the oxidation process involves partial, rather than complete, oxidization of the gasification feedstock and, therefore, may be operated in an oxygen-lean environment, relative to the amount needed to completely oxidize 100 percent of the carbon and hydrogen bonds. In an embodiment or in combination with any embodiment mentioned herein, the total oxygen requirements for the gasifier may be at least 5, at least 10, at least 15, or at least 20 percent in excess of the amount theoretically required to convert the carbon content of the gasification feedstock to carbon monoxide. In general, satisfactory operation may be obtained with a total oxygen supply of 10 to 80 percent in excess of the theoretical requirements. For example, examples of suitable amounts of oxygen per pound of carbon may be in the range of 0.4 to 3.0, 0.6 to 2.5, 0.9 to 2.5, or 1.2 to 2.5 pounds free oxygen per pound of carbon.

Mixing of the feedstock stream and the oxidizing agent may be accomplished entirely within the reaction zone by introducing the separate streams of feedstock and oxidizing agent so that they impinge upon each other within the reaction zone. In an embodiment or in combination with any embodiment mentioned herein, the oxidizing agent stream is introduced into the reaction zone of the gasifier as high velocity to both exceed the rate of flame propagation and to improve mixing with the feedstock stream. In an embodiment or in combination with any embodiment mentioned herein, the oxidant may be injected into the gasification zone in the range of 25 to 500, 50 to 400, or 100 to 400 feet per second. These values would be the velocity of the gaseous oxidizing agent stream at the injector-gasification zone interface, or the injector tip velocity. Mixing of the feedstock stream and the oxidizing agent may also be accomplished outside of the reaction zone. For example, in an embodiment or in combination with any embodiment mentioned herein, the feedstock, oxidizing agent, and/or atomization enhancing fluid can be combined in a conduit upstream of the gasification zone or in an injection assembly coupled with the gasification reactor.

In an embodiment or in combination with any embodiment mentioned herein, the gasification feedstock stream, the oxidizing agent, and/or the atomization enhancing fluid can optionally be preheated to a temperature of at least 200°

C., at least 300° C., or at least 400° C. However, the gasification process employed does not require preheating the feedstock stream to efficiently gasify the feedstock and a pre-heat treatment step may result in lowering the energy efficiency of the process.

In an embodiment or in combination with any embodiment mentioned herein, the type of gasification technology employed may be a partial oxidation entrained flow gasifier that generates syngas. This technology is distinct from fixed bed (alternatively called moving bed) gasifiers and from fluidized bed gasifiers. An exemplary gasifier that may be used in depicted in U.S. Pat. No. 3,544,291, the entire disclosure of which is incorporated herein by reference to the extent not inconsistent with the present disclosure. However, in an embodiment or in combination with any embodiment mentioned herein, other types of gasification reactors may also be used within the scope of the present technology.

In an embodiment or in combination with any embodiment mentioned herein, the gasifier/gasification reactor can be non-catalytic, meaning that the gasifier/gasification reactor does not contain a catalyst bed and the gasification process is non-catalytic, meaning that a catalyst is not introduced into the gasification zone as a discrete unbound catalyst. Furthermore, in an embodiment or in combination with any embodiment mentioned herein, the gasification process may not be a slagging gasification process; that is, operated under slagging conditions (well above the fusion temperature of ash) such that a molten slag is formed in the gasification zone and runs along and down the refractory walls.

In an embodiment or in combination with any embodiment mentioned herein, the gasification zone, and optionally all reaction zones in the gasifier/gasification reactor, may be operated at a temperature of at least 1000° C., at least 1100° C., at least 1200° C., at least 1250° C., or at least 1300° C. and/or not more than 2500° C., not more than 2000° C., not more than 1800° C., or not more than 1600° C. The reaction temperature may be autogenous. Advantageously, the gasifier operating in steady state mode may be at an autogenous temperature and does not require application of external energy sources to heat the gasification zone.

In an embodiment or in combination with any embodiment mentioned herein, the gasifier is a predominately gas fed gasifier.

In an embodiment or in combination with any embodiment mentioned herein, the gasifier is a non-slagging gasifier or operated under conditions not to form a slag.

In an embodiment or in combination with any embodiment mentioned herein, the gasifier may not be under negative pressure during operations, but rather can be under positive pressure during operation.

In an embodiment or in combination with any embodiment mentioned herein, the gasifier may be operated at a pressure within the gasification zone (or combustion chamber) of at least 200 psig (1.38 MPa), 300 psig (2.06 MPa), 350 psig (2.41 MPa), 400 psig (2.76 MPa), 420 psig (2.89 MPa), 450 psig (3.10 MPa), 475 psig (3.27 MPa), 500 psig (3.44 MPa), 550 psig (3.79 MPa), 600 psig (4.13 MPa), 650 psig (4.48 MPa), 700 psig (4.82 MPa), 750 psig (5.17 MPa), 800 psig (5.51 MPa), 900 psig (6.2 MPa), 1000 psig (6.89 MPa), 1100 psig (7.58 MPa), or 1200 psig (8.2 MPa). Additionally or alternatively, the gasifier may be operated at a pressure within the gasification zone (or combustion chamber) of not more than 1300 psig (8.96 MPa), 1250 psig (8.61 MPa), 1200 psig (8.27 MPa), 1150 psig (7.92 MPa), 1100 psig (7.58 MPa), 1050 psig (7.23 MPa), 1000 psig (6.89 MPa), 900 psig (6.2 MPa), 800 psig (5.51 MPa), or 750 psig (5.17 MPa).

Examples of suitable pressure ranges include 300 to 1000 psig (2.06 to 6.89 MPa), 300 to 750 psig (2.06 to 5.17 MPa), 350 to 1000 psig (2.41 to 6.89 MPa), 350 to 750 psig (2.06 to 5.17 MPa), 400 to 1000 psig (2.67 to 6.89 MPa), 420 to 900 psig (2.89 to 6.2 MPa), 450 to 900 psig (3.10 to 6.2 MPa), 475 to 900 psig (3.27 to 6.2 MPa), 500 to 900 psig (3.44 to 6.2 MPa), 550 to 900 psig (3.79 to 6.2 MPa), 600 to 900 psig (4.13 to 6.2 MPa), 650 to 900 psig (4.48 to 6.2 MPa), 400 to 800 psig (2.67 to 5.51 MPa), 420 to 800 psig (2.89 to 5.51 MPa), 450 to 800 psig (3.10 to 5.51 MPa), 475 to 800 psig (3.27 to 5.51 MPa), 500 to 800 psig (3.44 to 5.51 MPa), 550 to 800 psig (3.79 to 5.51 MPa), 600 to 800 psig (4.13 to 5.51 MPa), 650 to 800 psig (4.48 to 5.51 MPa), 400 to 750 psig (2.67 to 5.17 MPa), 420 to 750 psig (2.89 to 5.17 MPa), 450 to 750 psig (3.10 to 5.17 MPa), 475 to 750 psig (3.27 to 5.17 MPa), 500 to 750 psig (3.44 to 5.17 MPa), or 550 to 750 psig (3.79 to 5.17 MPa).

Generally, the average residence time of gases in the gasifier reactor can be very short to increase throughput. Since the gasifier may be operated at high temperature and pressure, substantially complete conversion of the feedstock to gases can occur in a very short time frame. In an embodiment or in combination with any embodiment mentioned herein, the average residence time of the gases in the gasifier can be not more than 30, not more than 25, not more than 20, not more than 15, not more than 10, or not more than 7 seconds.

To avoid fouling downstream equipment from the gasifier, and the piping in-between, the resulting raw syngas stream 127 may have a low or no tar content. In an embodiment or in combination with any embodiment mentioned herein, the syngas stream discharged from the gasifier may comprise not more than 4, not more than 3, not more than 2, not more than 1, not more than 0.5, not more than 0.2, not more than 0.1, or not more than 0.01 weight percent of tar based on the weight of all condensable solids in the syngas stream. For purposes of measurement, condensable solids are those compounds and elements that condense at a temperature of 15° C. and 1 atm. Examples of tar products include naphthalenes, cresols, xylenols, anthracenes, phenanthrenes, phenols, benzene, toluene, pyridine, catechols, biphenyls, benzofurans, benzaldehydes, acenaphthylenes, fluorenes, naphthofurans, benzanthracenes, pyrenes, acephenanthrylenes, benzopyrenes, and other high molecular weight aromatic polynuclear compounds. The tar content can be determined by GC-MSD.

Generally, the raw syngas stream 127 discharged from the gasification vessel includes such gases as hydrogen, carbon monoxide, and carbon dioxide and can include other gases such as methane, hydrogen sulfide, and nitrogen depending on the fuel source and reaction conditions.

In an embodiment or in combination with any embodiment mentioned herein, the raw syngas stream 127 (the stream discharged from the gasifier and before any further treatment by way of scrubbing, shift, or acid gas removal) can have the following composition in mole percent on a dry basis and based on the moles of all gases (elements or compounds in gaseous state at 25° C. and 1 atm) in the raw syngas stream 127:

a hydrogen content in the range of 32 to 50 percent, or at least 33, at least 34, or at least 35 and/or not more than 50, not more than 45, not more than 41, not more than 40, or not more than 39 percent, or it can be in the range of 33 to 50 percent, 34 to 45 percent, or 35 to 41 percent, on a dry volume basis;

a carbon monoxide content of at least 40, at least 41, at least 42, or at least 43 and/or not more than 55, not more than 54, not more than 53, or not more than 52 weight percent, based on the total weight of the stream, or in the range of from 40 to 55 weight percent, 41 to 54 weight percent, or 42 to 53 weight percent, based on the total weight of the stream on a dry basis;

a carbon dioxide content of at least 1%, at least 1.5%, at least 2%, at least 3%, at least 4%, at least 5%, at least 6%, or at least 7% by volume and/or not more than 25%, not more than 20%, not more than 15%, not more than 12%, not more than 11%, not more than 10%, not more than 9%, not more than 8%, or not more than 7% by volume on a dry basis;

a methane content of not more than 5000, not more than 2500, not more than 2000, or not more than 1000 ppm by volume methane on a dry basis;

a sulfur content of not more than 1000, not more than 100, not more than 10, or not more than 1 ppm by weight (ppmw);

a soot content of at least 1000, or at least 5000 ppm and/or not more than 50,000, not more than 20,000, or not more than 15,000 ppmw;

a halides content of not more than 1000, not more than 500, not more than 200, not more than 100, or not more than 50 ppmw;

a mercury content of not more than 0.01, not more than 0.005, or not more than 0.001 ppmw;

an arsine content of not more than 0.1 ppm, not more than 0.05, or not more than 0.01 ppmw;

a nitrogen content of not more than 10,000, not more than 3000, not more than 1000, or not more than 100 ppmw nitrogen;

an antimony content of at least 10 ppmw, at least 20 ppmw, at least 30 ppmw, at least 40 ppmw, or at least 50 ppmw, and/or not more than 200 ppmw, not more than 180 ppmw, not more than 160 ppmw, not more than 150 ppmw, or not more than 130 ppmw; and/or a titanium content of at least 10 ppmw, at least 25 ppmw, at least 50 ppmw, at least 100 ppmw, at least 250 ppmw, at least 500 ppmw, or at least 1000 ppmw, and/or not more than 40,000 ppmw, not more than 30,000 ppmw, not more than 20,000 ppmw, not more than 15,000 ppmw, not more than 10,000 ppmw, not more than 7,500 ppmw, or not more than 5,000 ppmw.

In an embodiment or in combination with any embodiment mentioned herein, the syngas comprises a molar hydrogen/carbon monoxide ratio of 0.7 to 2, 0.7 to 1.5, 0.8 to 1.2, 0.85 to 1.1, or 0.9 to 1.05.

The gas components can be determined by Flame Ionization Detector Gas Chromatography (FID-GC) and Thermal Conductivity Detector Gas Chromatography (TCD-GC) or any other method recognized for analyzing the components of a gas stream.

In an embodiment or in combination with any embodiment mentioned herein, the recycle content syngas can have a recycle content of at least 1, at least 5, at least 10, at least 15, at least 20, at least 25, at least 30, at least 35, at least 40, at least 45, at least 50, at least 55, at least 60, at least 65, at least 70, at least 75, at least 80, at least 85, at least 90, at least 95, or at least 99 weight percent, based on the total weight of the syngas stream.

Energy Recovery

In an embodiment or in combination with any embodiment mentioned herein, the chemical recycling facility may also comprise an energy recovery facility. As used herein, an "energy recovery facility" is a facility that generates energy (i.e., thermal energy) from a feedstock via chemical conversion (e.g., combustion) of the feedstock. At least 5, at least 10, at least 15, at least 20, at least 25, at least 30, or at least 35 percent of the total energy generated from combustion can be recovered and used in one or more other processes and/or facilities.

In an embodiment or in combination with any embodiment mentioned herein, the feed stream introduced into the energy recovery facility 80 (FIGS. 1*a* and 1*b*) may comprise one or more of at least a portion of a PO-enriched waste plastic, at least one solvolysis coproduct stream, at least a portion of one or more of pyrolysis gas, pyrolysis oil, and pyrolysis residue, and/or one or more other streams from within the chemical recycling facility. In an embodiment or in combination with any embodiment mentioned herein, one or more of these streams may be introduced into the energy recovery facility continuously or one or more of these streams may be introduced intermittently. When multiple types of feed streams are present, each may be introduced separately, or all or a portion of the streams may be combined so that the combined stream may be introduced into the energy recovery facility. The combining, when present, may take place in a continuous or batch manner. The feed stream may include solids, a melt, a predominantly liquid stream, a slurry, a predominantly gas stream, or combinations thereof.

Any type of energy recovery facility may be used. In some embodiments, the energy recovery facility may comprise at least one furnace or incinerator. The incinerator may be gas-fed, liquid-fed, or solid-fed, or may be configured to accept a gas, liquid, or solid. The incinerator or furnace may be configured to thermally combust at least a portion of the hydrocarbon components in the feed stream with an oxidizing agent. In an embodiment or in combination with any embodiment mentioned herein, the oxidizing agent comprises at least 5, at least 10, at least 15, at least 20, or at least 25 and/or not more than 95, not more than 90, not more than 80, not more than 70, not more than 65, not more than 60, not more than 55, not more than 50, not more than 45, not more than 40, not more than 35, not more than 30, or not more than 25 mole percent oxygen, based on the total moles of oxidizing agent. Other components of the oxidizing agent can include, for example, nitrogen, or carbon dioxide. In other embodiments, the oxidizing agent comprises air.

In the energy recovery facility, at least 50, at least 60, at least 70, at least 80, at least 90, or at least 95 weight percent of the feed introduced therein can be combusted to form energy and combustion gases such as water, carbon monoxide, carbon dioxide, and combinations thereof. In some embodiments, at least a portion of the feed may be treated to remove compounds such as sulfur and/or nitrogen-containing compounds, to minimize the amount of nitrogen and sulfur oxides in the combustion gases.

In an embodiment or in combination with any embodiment mentioned herein, at least a portion of the energy generated may be used to directly or indirectly heat a process stream. For example, at least a portion of the energy may be used to heat water to form steam, or to heat steam and form superheated steam. At least a portion of the energy generated may be used to heat a stream of heat transfer medium (such as, for example, THERMINOL®), which itself, when warmed, may be used to transfer heat to one or more process streams. At least a portion of the energy may be used to directly heat a process stream.

In some embodiments, the process stream heated with at least a portion of the energy from the energy recovery facility may be a process stream from one or more of the facilities discussed herein, including, for example, at least one of a solvolysis facility, a pyrolysis facility, a cracker facility, a POX gasification facility, a solidification facility. The energy recovery facility 80 may be in a separate geographical area or in its own separate facility, while, in one or more other embodiments, at least a portion of the energy recovery facility 80 may be located in or near one of the other facilities. For example, an energy recovery facility 80 within a chemical recycling facility 10 as shown in FIGS. 1*a* and 1*b* may include an energy recovery furnace in the solvolysis facility and another energy recovery furnace in a POX gasification facility.

Other Processing Facilities

In an embodiment or in combination with any embodiment mentioned herein, the chemical processing facility 10 generally shown in FIGS. 1*a* and 1*b* may include at least one other type of downstream chemical recycling facility and/or one or more other systems or facilities for processing one or more of the chemical recycling product or coproduct streams. Examples of suitable types of other facilities can include, but are not limited to, a solidification facility and a product separation facility. Additionally, at least a portion of one or more streams may be transported or sold to an end user or customer, and/or at least a portion of one or more streams may be sent to a landfill or other industrial disposal site.

Solidification Facility

In an embodiment or in combination with any embodiment mentioned herein, the chemical recycling facility 10 may also comprise a solidification facility. As used herein, the term "solidification" refers to causing a non-solid material to become a solid material through a physical means (e.g., cooling) and/or chemical means (e.g., precipitation). A "solidification facility" is a facility that includes all equipment, lines, and controls necessary to carry out solidification of a feedstock derived from waste plastic.

A feed stream introduced into the solidification facility may originate from one or more locations within the chemical recycling facility 10. For example, the feed stream to the solidification facility may comprise at least one of one or more solvolysis coproduct streams, a stream from the pyrolysis facility including pyrolysis oil (pyoil) and/or pyrolysis residue, a predominantly liquid stream from one or more facilities, and combinations thereof. Definitions for pyrolysis oil and pyrolysis residue are provided herein. One or more of these streams may be introduced into the solidification facility continuously or one or more of these streams may be introduced intermittently. When multiple types of feed streams are present, each may be introduced separately, or all, or a portion, of the streams may be combined so that the combined stream may be introduced into the solidification facility. The combining, when performed, may take place in a continuous or batch manner.

The solidification facility may include a cooling zone for cooling and at least partially solidifying the feed stream, followed by an optional size reduction zone. Upon leaving the cooling zone, all or a portion of stream may be a solidified material. In some cases, the solidified material can be in the form of sheets, blocks, or chunks, or it may be in the form of flakes, tablets, pastilles, particles, pellets, micropellets, or a powder. When the feed stream is only partially solidified, the stream withdrawn from the cooling zone may comprise both a solid and a liquid phase. At least a portion of the solid phase may be removed and all or a portion of the liquid phase may be withdrawn from the solidification facility and introduced into another facility, optionally within the chemical recycling facility (such as, for example, the solvolysis facility).

In an embodiment or in combination with any embodiment mentioned herein, the solidification facility may also include a size reduction zone for reducing the size of the solid material and forming a plurality of particles. In an embodiment or in combination with any embodiment mentioned herein, the size reduction may include comminuting, smashing, breaking, or grinding/granulating larger pieces or chunks of solidified material to form the particles. In other embodiments, at least a portion of the feed stream to the solidification facility may be at least partially cooled before being pelletized via conventional pelletization devices. Regardless of how the particles are formed, the resulting solids can have an a D90 particle size of at least 50, at least 75, at least 100, at least 150, at least 250, at least 350, at least 450, at least 500, at least 750 microns, or at least 0.5, at least 1, at least 2, at least 5, or at least 10 mm and/or not more than 50, not more than 45, not more than 40, not more than 30, not more than 35, not more than 30, not more than 25, not more than 20, not more than 15, not more than 10, not more than 5, not more than 2, not more than 1 mm or not more than 750, not more than 500, not more than 250, or not more than 200 microns. The solids may comprise a powder. The solids may comprise pellets of any shape. The solids can have a recycle content of at least 1, at least 5, at least 10, at least 15, at least 20, at least 25, at least 30, at least 35, at least 40, at least 45, at least 50, at least 55, at least 60, at least 65, at least 70, at least 75, at least 80, at least 85, at least 90, or at least 95 weight percent, based on the total weight of the solids.

The solids withdrawn from the solidification facility may be routed to one or more (or two or more) of the pyrolysis facility, the energy recovery facility, and/or the POX gasification facility. The solids can be in the form of solids or may be melted or otherwise at least partially liquified prior to or during transport. In some embodiments, the solids may be combined with a liquid to form a slurry and the slurry may be introduced into one or more chemical recycling facilities as described herein. Examples of suitable liquids can include, but are not limited to, water, alcohols, and combinations thereof. In an embodiment or in combination with any embodiment mentioned herein, at least a portion of the solids can be heated to at least partially melt or liquify the solids and the resulting melt can be introduced into one or more of facilities described above. Optionally, at least a portion of the solids may be sent to an industrial landfill (not shown).

Product Separation Facility

In an embodiment or in combination with any embodiment mentioned herein, at least a portion of one of the streams within the chemical recycling facility 10 shown in FIG. 1 may be separated in a product separation facility (represented by numeral 90 in FIG. 1) to form a product stream suitable for further sale and/or use. For example, at least a portion of one or more of the solvolysis coproduct streams may be further processed in a separation zone to form one or more purified or refined product streams. Examples of suitable processes used in the separation zone can include, but are not limited to, distillation, extraction, decanting, stripping, rectification, and combinations thereof. The refined streams form the product separation zone can include at least 50, at least 55, at least 60, at least 65, at least 70, at least 75, at least 80, at least 85, at least 90, or at least 95 weight percent of a desired component or components, based on the total weight of the refined product stream. Examples of desired components can include certain alcohols or glycols (e.g., ethylene glycol, methanol), alkanes (e.g., ethane, propane, and butane and heavier), and olefins (e.g., propylene, ethylene, and combinations).

As shown in FIG. 1*b*, in one or more embodiments, at least a portion of the light organic coproduct stream from the solvolysis facility may be routed to a separation facility for separating the stream into two or more components. For example, in some embodiments, the stream may be separated into a light glycol stream and a heavy glycol stream, wherein the light glycol stream has a boiling point less than the boiling point of the principal solvent or the principal glycol and the heavy glycol stream has a boiling point greater than the boiling point of the principal solvent or the principal glycol.

In one or more embodiments, the heavier glycol stream may also include one or more modifying glycols originally present in the waste plastic fed to the chemical recycling facility. Examples include, but are not limited to, any of the glycols mentioned previously, including diethylene glycol, 1,4-cyclohexanedimethanol, 2,2,4,4-tetramethyl-1,3-cyclobutanediol, and combinations thereof. In some embodiments, the light and/or heavier glycol stream may also include one or more modifying carboxyl compounds including, but not limited to, isophthalic acid and/or 1,4-cyclohexanedicarboxylic acid.

Weight percentages expressed on the MPW are the weight of the MPW as fed to the first stage separation and prior to addition of any diluents/solutions such as salt or caustic solutions.

When a numerical sequence is indicated, it is to be understood that each number is modified the same as the first number or last number and is in an "or" relationship, i.e. each number is "at least," or "up to" or "not more than" as the case may be. For example, "at least 10 wt. %, 20, 30, 40, 50, 75 . . . " means the same as "at least 10 wt. %, or at least 20 wt. %, or at least 30 wt. %, or at least 40 wt. %, or at least 50 wt. %, or at least 75 wt. %, etc.

All concentrations or amounts are by weight unless otherwise stated.

In aspect 1, there is provided a method for processing waste polymer materials, the method comprising introducing a feed stream comprising waste automotive carpet material into a solvolysis facility.

In aspect 2, there is provided a method for processing waste polymeric materials, the method comprising: (a) introducing a feed comprising waste automotive carpet material and waste plastic into a solvolysis facility; and (b) subjecting the feed to solvolysis to provide a principal terephthalyl, a principal glycol, and at least one coproduct stream.

In aspect 3, there is provided a method for processing waste polymeric materials, the method comprising: (a) introducing a feed stream comprising waste automotive carpet into a solvolysis facility; (b) subjecting the feed stream to solvolysis to form a principal terephthalyl, a principal glycol, and at least one coproduct stream; and (c) introducing at least a portion of the coproduct stream into at least one of the following chemical processing facilities or zones: (i) a partial oxidation gasification facility; (ii) a pyrolysis facility; (iii) a cracking facility; (iv) an energy recovery facility; and (v) a liquification zone.

In aspect 4, a solvolysis composition comprising: waste plastic comprising polyethylene terephthalate (PET), polyolefin (PO), and polyvinyl chloride (PVC); waste automotive carpet material; and a solvolysis solvent in which the waste plastic and the waste automotive carpet material are at least partially dissolved.

In aspect 5 of this disclosure, which can include, but is not limited to aspects 1-4, the waste automotive carpet material comprises fibers of waste automotive carpet material.

In aspect 6 of this disclosure, which can include, but is not limited to aspects 1-5, the waste automotive carpet material comprises densified waste automotive carpet material.

In aspect 7 of this disclosure, which can include, but is not limited to aspects 1-6, the waste automotive carpet material has a has a bulk density of at least 0.22 $g/cm^3$.

In aspect 8 of this disclosure, which can include, but is not limited to aspects 1-7, the feed stream comprises the waste automotive carpet material in an amount in the range of from 10 to 30 weight percent, based on the total weight of the feed stream.

In aspect 9 of this disclosure, which can include, but is not limited to aspects 1-8, the waste automotive carpet material comprises at least 50 weight percent polyester, based on the total weight of the waste automotive carpet material.

In aspect 10 of this disclosure, which can include, but is not limited to aspects 1-9, the waste automotive carpet material comprises not more than 25 weight percent of polymeric components other than polyester based on the total weight of the waste automotive carpet material.

In aspect 11 of this disclosure, which can include, but is not limited to aspects 1-10, the polymeric components other than polyester are selected from the group consisting of polyamides, polyolefins, acrylics, cellulose acetate, wool, and cotton.

In aspect 12 of this disclosure, which can include, but is not limited to aspects 1-11, the polymeric components other than polyester comprise at least one of nylon 6, nylon 6,6, polypropylene, polyethylene, and poly(ethylene-co-vinyl acetate).

In aspect 13 of this disclosure, which can include, but is not limited to aspects 1-12, the automotive carpet waste material comprises adhesive material in an amount in the range of from 0.1 to 15 weight percent, based on the total weight of the automotive carpet waste material.

In aspect 14 of this disclosure, which can include, but is not limited to aspects 1-13, the waste automotive carpet material comprises at least 0.01 and not more than 5 weight percent of one or more fillers, based on the total weight of the waste automotive carpet material.

In aspect 15 of this disclosure, which can include, but is not limited to aspects 1-14, the fillers comprise at least one of calcium carbonate, barium sulfate, and titanium dioxide.

In aspect 16 of this disclosure, which can include, but is not limited to aspects 1-15, the waste automotive carpet material comprises carbon black.

In aspect 17 of this disclosure, which can include, but is not limited to aspects 1-16, at least 5 and not more than 99 weight percent of the waste automotive carpet material is post-consumer waste material, based on the total weight of the waste automotive carpet material.

In aspect 18 of this disclosure, which can include, but is not limited to aspects 1-17, at least 5 and not more than 99 weight percent of the waste automotive carpet material is pre-consumer waste material, based on the total weight of the waste automotive carpet material.

In aspect 19 of this disclosure, which can include, but is not limited to aspects 1-18, the feed stream further comprises waste plastic in an amount of at least about 5 and not more than 99 weight percent based on the total weight of the feed stream.

In aspect 20 of this disclosure, which can include, but is not limited to aspects 1-19, the waste plastic includes at least 5 and not more than 95 weight percent of polyethylene terephthalate, based on the total weight of the feed stream.

In aspect 21 of this disclosure, which can include, but is not limited to aspects 1-20, the waste plastic includes at least 10 and not more than 80 weight percent of polyolefin, based on the total weight of the feed stream.

In aspect 22 of this disclosure, which can include, but is not limited to aspects 1-21, the waste plastic includes at least 0.001 and not more than 10 weight percent of halogens on a dry basis, based on the total weight of plastics in the feed stream.

In aspect 23 of this disclosure, which can include, but is not limited to aspects 1-22, the waste automotive carpet material comprises material from carpet tufts, carpet backing, adhesives, and combinations thereof.

In aspect 24 of this disclosure, which can include, but is not limited to aspects 1-23, the waste automotive carpet material comprises particulates having a D90 of at least 0.1 and not more than 10 mm.

In aspect 25 of this disclosure, which can include, but is not limited to aspects 1-44, the waste automotive carpet material comprises not more than 20 weight percent of carpet fibers.

In aspect 26 of this disclosure, which can include, but is not limited to aspects 1-25, the introducing of step (a) comprises dissolving at least a portion of the waste automotive carpet material and at least a portion of the waste plastic with a solvolysis solvent in a blending zone of the solvolysis facility to form a predominantly liquid feed stream and subjecting at least a portion of the predominantly liquid feed stream to the solvolysis in step (b).

In aspect 27 of this disclosure, which can include, but is not limited to aspects 1-26, the method further comprises purging at least a portion of the coproduct stream from the solvolysis facility.

In aspect 28 of this disclosure, which can include, but is not limited to aspects 1-27, the purging is carried out continuously.

In aspect 29 of this disclosure, which can include, but is not limited to aspects 1-28, the method further comprises introducing at least a portion of the coproduct stream into at least one of the following chemical processing facilities or zones: (i) a partial oxidation gasification facility; (ii) a pyrolysis facility; (iii) a cracking facility; (iv) an energy recovery facility; and (v) a liquification zone.

In aspect 30 of this disclosure, which can include, but is not limited to aspects 1-29, the method further comprises prior to the introducing, separating a stream of mixed waste plastic to form a stream enriched in polyethylene terephthalate and a stream enriched in polyolefin, wherein the waste plastic introduced into the solvolysis facility comprises at least a portion of the stream enriched in polyethylene terephthalate, and further comprising introducing at least a portion of the stream enriched in polyolefin into at least one of the chemical processing facilities or zones (i) through (v).

In aspect 31 of this disclosure, which can include, but is not limited to aspects 1-30, the feed stream comprises the waste automotive carpet material in an amount in the range of from 10 to 30 weight percent, based on the total weight of the feed stream, wherein the waste automotive carpet material comprises at least 50 weight percent polyester, based on the total weight of the waste automotive carpet material, wherein the waste automotive carpet material comprises not more than 25 weight percent of polymeric components other than polyester selected from the group consisting of polyamides, polyolefins, acrylics, cellulose acetate, wool, and cotton, based on the total weight of the waste automotive carpet material, wherein the automotive carpet waste material comprises adhesive material in an amount in the range of from 0.1 to 15 weight percent and fillers in an amount of 0.01 to 5 weight percent, based on the total weight of the waste automotive carpet material.

In aspect 32 of this disclosure, which can include, but is not limited to aspects 1-31, the feed stream further comprises waste plastic in an amount of at least 5 weight percent, based on the total weight of the stream.

In aspect 33 of this disclosure, which can include, but is not limited to aspects 1-32, the waste automotive carpet material comprises at least 50 weight percent polyester, based on the total weight of the waste automotive carpet material, wherein the waste automotive carpet material comprises not more than 25 weight percent of polymeric components other than polyester selected from the group consisting of polyamides, polyolefins, acrylics, cellulose acetate, wool, and cotton, based on the total weight of the waste automotive carpet material, wherein the automotive carpet waste material comprises adhesive material in an amount in the range of from 0.1 to 15 weight percent and fillers in an amount of 0.01 to 5 weight percent, based on the total weight of the waste automotive carpet material.

In aspect 34 of this disclosure, which can include, but is not limited to aspects 1-33, the solvolysis facility is a methanolysis facility.

In aspect 35 of this disclosure, which can include, but is not limited to aspects 1-34, the solvolysis facility is colocated with at least one of (i) a partial oxidation (POX) gasification facility; (ii) a pyrolysis facility; (iii) a cracking facility; (iv) an energy recovery facility; and (v) a liquification zone.

In aspect 36 of this disclosure, which can include, but is not limited to aspects 1-35, the solvolysis facility is operated in a continuous manner.

In aspect 37 of this disclosure, which can include, but is not limited to aspects 1-36, the solvolysis facility has an average feed rate of at least 500 pounds per hour, averaged over one year.

In aspect 38 of this disclosure, which can include, but is not limited to aspects 1-37, the waste plastic is present in an amount in the range of from 10 to 95 weight percent, based on the total weight of the composition.

In aspect 39 of this disclosure, which can include, but is not limited to aspects 1-38, the PO is present in an amount in the range of from 10 to 80 weight percent, based on the total weight of the composition.

In aspect 40 of this disclosure, which can include, but is not limited to aspects 1-39, the PVC is present in an amount in the range of from 0.1 to 8 weight percent, based on the total weight of the waste plastic.

In aspect 41 of this disclosure, which can include, but is not limited to aspects 1-40, the solvent comprises ethylene glycol.

In aspect 42 of this disclosure, which can include, but is not limited to aspects 1-41, the solvent comprises methanol.

Definitions

It should be understood that the following is not intended to be an exclusive list of defined terms. Other definitions may be provided in the foregoing description, such as, for example, when accompanying the use of a defined term in context.

As used herein, the terms “a,” “an,” and “the” mean one or more.

As used herein, the term “and/or,” when used in a list of two or more items, means that any one of the listed items can be employed by itself or any combination of two or more of the listed items can be employed. For example, if a composition is described as containing components A, B, and/or C, the composition can contain A alone; B alone; C alone; A and B in combination; A and C in combination, B and C in combination; or A, B, and C in combination.

As used herein, the phrase “at least a portion” includes at least a portion and up to and including the entire amount or time period.

As used herein, the term “caustic” refers to any basic solution (e.g., strong bases, concentrated weak bases, etc.) that can be used in the technology as a cleaning agent, for killing pathogens, and/or reducing odors.

As used herein, the term “centrifugal density separation” refers to a density separation process where the separation of materials is primarily cause by centrifugal forces.

As used herein, the term “chemical recycling” refers to a waste plastic recycling process that includes a step of chemically converting waste plastic polymers into lower molecular weight polymers, oligomers, monomers, and/or non-polymeric molecules (e.g., hydrogen, carbon monoxide, methane, ethane, propane, ethylene, and propylene) that are useful by themselves and/or are useful as feedstocks to another chemical production process(es).

As used herein, the term “chemical recycling facility” refers to a facility for producing a recycle content product via chemical recycling of waste plastic. A chemical recycling facility can employ one or more of the following steps: (i) preprocessing, (ii) solvolysis, (iii) pyrolysis, (iv) cracking, and/or (v) POX gasification.

As used herein, the term “co-located” refers to the characteristic of at least two objects being situated on a common physical site, and/or within one mile of each other.

As used herein, the terms “comprising,” “comprises,” and “comprise” are open-ended transition terms used to transition from a subject recited before the term to one or more elements recited after the term, where the element or elements listed after the transition term are not necessarily the only elements that make up the subject.

As used herein, the term “conducting” refers to the transport of a material in a batchwise and/or continuous manner.

As used herein, the term “cracking” refers to breaking down complex organic molecules into simpler molecules by the breaking of carbon-carbon bonds.

As used herein, the term “D90” refers to a specified diameter where ninety percent of a distribution of particles has a smaller diameter than the specified diameter and ten percent has a larger diameter than the specified diameter. To ensure that a representative D90 value is obtained, the sample size of the particles should be at least one pound. To determine a D90 for particles in a continuous process, testing should be performed on at least 5 samples that are taken at equal time intervals over at least 24 hours. Testing for D90 is performed using high-speed photography and computer algorithms to generate a particle size distribution. One suitable particle size analyzer for determining D90 values is the Model CPA 4-1 Computerized Particle Analyzer from W.S Tyler of Mentor, Ohio.

As used herein, the term “diameter” means the maximum chord length of a particle (i.e., its largest dimension).

As used herein, the term “density separation process” refers to a process for separating materials based, at least in part, upon the respective densities of the materials. Moreover, the terms “low-density separation stage” and “high-density separation stage” refer to relative density separation processes, wherein the low-density separation has a target separation density less than the target separation density of the high-density separation stage.

As used herein, the term “depleted” refers to having a concentration (on a dry weight basis) of a specific component that is less than the concentration of that component in a reference material or stream.

As used herein, the term “directly derived” refers to having at least one physical component originating from waste plastic.

As used herein, the term “enriched” refers to having a concentration (on a dry weight basis) of a specific component that is greater than the concentration of that component in a reference material or stream.

As used herein, the term “halide” refers to a composition comprising a halogen atom bearing a negative charge (i.e., a halide ion).

As used herein, the term “halogen” or “halogens” refers to organic or inorganic compounds, ionic, or elemental species comprising at least one halogen atom.

As used herein, the terms “having,” “has,” and “have” have the same open-ended meaning as “comprising,” “comprises,” and “comprise” provided above.

As used herein, the term “heavy organic methanolysis coproduct” refers to a methanolysis coproduct with a boiling point greater than DMT.

As used herein, the term “heavy organic solvolysis coproduct” refers to a solvolysis coproduct with a boiling point greater than the principal terephthalyl product of the solvolysis facility.

As used herein, the terms “including,” “include,” and “included” have the same open-ended meaning as “comprising,” “comprises,” and “comprise” provided above.

As used herein, the term “indirectly derived” refers to having an assigned recycle content i) that is attributable to waste plastic, but ii) that is not based on having a physical component originating from waste plastic.

As used herein, the term “isolated” refers to the characteristic of an object or objects being by itself or themselves and separate from other materials, in motion or static.

As used herein, the term “light organic methanolysis coproduct” refers to a methanolysis coproduct with a boiling point less than DMT.

As used herein, the term “light organics solvolysis coproduct” refers to a solvolysis coproduct with a boiling point less than the principal terephthalyl product of the solvolysis facility.

As used herein, the term “methanolysis coproduct” refers to any compound withdrawn from a methanolysis facility that is not dimethyl terephthalate (DMT), ethylene glycol (EG), or methanol.

As used herein, the terms “mixed plastic waste” and “MPW” refer to a mixture of at least two types of waste plastics including, but not limited to the following plastic types: polyethylene terephthalate (PET), one or more polyolefins (PO), and polyvinylchloride (PVC).

As used herein, the term “partial oxidation (POX)” or “POX” refers to high temperature conversion of a carbon-containing feed into syngas, (carbon monoxide, hydrogen, and carbon dioxide), where the conversion is carried out in the presence of a less than stoichiometric amount of oxygen. The feed to POX gasification can include solids, liquids, and/or gases.

As used herein, the term "partial oxidation (POX) reaction" refers to all reactions occurring within a partial oxidation (POX) gasifier in the conversion of a carbon-containing feed into syngas, including but not limited to partial oxidation, water gas shift, water gas—primary reactions, Boudouard, oxidation, methanation, hydrogen reforming, steam reforming, and carbon dioxide reforming.

As used herein, "PET" means a homopolymer of polyethylene terephthalate, or polyethylene terephthalate modified with modifiers or containing residues or moieties of other than ethylene glycol and terephthalic acid, such as isophthalic acid, 1,4-cyclohexanedicarboxylic acid, diethylene glycol, TMCD (2,2,4,4-tetramethyl-1,3-cyclobutanediol), CHDM (cyclohexanedimethanol), propylene glycol, isosorbide, 1,4-butanediol, 1,3-propane diol, and/or NPG (neopentyl glycol), or polyesters having repeating terephthalate units (and whether or not they contain repeating ethylene glycol based units) and one or more residues or moieties of TMCD (2,2,4,4-tetramethyl-1,3-cyclobutanediol), CHDM (cyclohexanedimethanol), propylene glycol, or NPG (neopentyl glycol), isosorbide, isophthalic acid, 1,4-cyclohexanedicarboxylic acid, 1,4-butanediol, 1,3-propane diol, and/or diethylene glycol, or combinations thereof.

As used herein, the term "overhead" refers to the physical location of a structure that is above a maximum elevation of quantity of particulate plastic solids within an enclosed structure.

As used herein, the term "partial oxidation (POX) gasification facility" or "POX Facility" refers to a facility that includes all equipment, lines, and controls necessary to carry out POX gasification of waste plastic and feedstocks derived therefrom.

As used herein, the term "partially processed waste plastic" means waste plastic that has been subjected to at least on automated or mechanized sorting, washing, or comminuted step or process. Partially processed waste plastics may originate from, for example, municipal recycling facilities (MRFs) or reclaimers. When partially processed waste plastic is provided to the chemical recycling facility, one or more preprocessing steps may be skipped.

As used herein, the term "PET solvolysis" refers to a reaction by which a polyester terephthalate-containing plastic feed is chemically decomposed in the presence of a solvent to form a principal terephthalyl product and/or a principal glycol product.

As used herein, the term "physical recycling" (also known as "mechanical recycling") refers to a waste plastic recycling process that includes a step of melting waste plastic and forming the molten plastic into a new intermediate product (e.g., pellets or sheets) and/or a new end product (e.g., bottles). Generally, physical recycling does not substantially change the chemical structure of the plastic, although some degradation is possible.

As used herein, the term "predominantly" means more than 50 percent by weight. For example, a predominantly propane stream, composition, feedstock, or product is a stream, composition, feedstock, or product that contains more than 50 weight percent propane.

As used herein, the term "preprocessing" refers to preparing waste plastic for chemical recycling using one or more of the following steps: (i) comminuting, (ii) particulating, (iii) washing, (iv) drying, and/or (v) separating.

As used herein, the term "pyrolysis" refers to thermal decomposition of one or more organic materials at elevated temperatures in an inert (i.e., substantially oxygen free) atmosphere.

As used herein, the term "pyrolysis char" refers to a carbon-containing composition obtained from pyrolysis that is solid at 200° C. and 1 atm.

As used herein, the term "pyrolysis gas" refers to a composition obtained from pyrolysis that is gaseous at 25° C.

As used herein, the term "pyrolysis heavy waxes" refers to C20+ hydrocarbons obtained from pyrolysis that are not pyrolysis char, pyrolysis gas, or pyrolysis oil.

As used herein, the terms "pyrolysis oil" or "pyoil" refers to a composition obtained from pyrolysis that is liquid at 25° C. and 1 atm.

As used herein, the term "pyrolysis residue" refers to a composition obtained from pyrolysis that is not pyrolysis gas or pyrolysis oil and that comprises predominantly pyrolysis char and pyrolysis heavy waxes.

As used herein, the term "recycle content" and "r-content" refer to being or comprising a composition that is directly and/or indirectly derived from waste plastic.

As used herein, the term "resin ID code" refers to the set of symbols and associated number (1 through 7) appearing on plastic products that identify the plastic resin out of which the product is made, developed originally in 1988 in the United States but since 2008 has been administered by ASTM International.

As used herein, the term "resin ID code 1" refers to plastic products made from polyethylene terephthalate (PET). Such plastic products may include soft drink bottles, mineral water bottles, juice containers, and cooking oil containers.

As used herein, the term "resin ID code 2" refers to plastic products made from high-density polyethylene (HDPE). Such plastic products may include milk jugs, cleaning agent and laundry detergent containers, shampoo bottles, and soap containers.

As used herein, the term "resin ID code 3" refers to plastic products made from polyvinyl chloride (PVC). Such plastic products may include fruit and sweets trays, plastic packing (bubble foil), and food wrap.

As used herein, the term "resin ID code 4" refers to plastic products made from low-density polyethylene (LDPE). Such plastic products may include shopping bags, light weight bottles, and sacks.

As used herein, the term "resin ID code 5" refers to plastic products made from polypropylene (PP). Such plastic products may include furniture, auto parts, industrial fibers, luggage, and toys.

As used herein, the term "resin ID code 6" refers to plastic products made from polystyrene (PS). Such plastic products may include toys, hard packing, refrigerator trays, cosmetic bags, costume jewelry, CD cases, vending cups, and clamshell containers.

As used herein, the term "resin ID code 7" refers to plastic products made from plastics other than those defined as resin ID codes 1-6, including but not limited to, acrylic, polycarbonate, polylactic fibers, nylon, and fiberglass. Such plastic products may include bottles, headlight lenses, and safety glasses.

As used herein, the term "separation efficiency" refers to the degree of separation between at two or more phases or components as defined in FIG. 8.

As used herein, the term "sink-float density separation" refers to a density separation process where the separation of materials is primarily caused by floating or sinking in a selected liquid medium.

As used herein, the term "solvolysis" or "ester solvolysis" refers to a reaction by which an ester-containing feed is chemically decomposed in the presence of a solvent to form a principal carboxyl product and/or a principal glycol product. Examples of solvolysis include, hydrolysis, alcoholysis, and ammonolysis.

As used herein, the term "solvolysis coproduct" refers to any compound withdrawn from a solvolysis facility that is not the principal carboxyl (terephthalyl) product of the solvolysis facility, the principal glycol product of the solvolysis facility, or the principal solvent fed to the solvolysis facility.

As used herein, the term "terephthalyl" refers to a molecule including the following group:

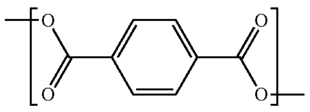

As used herein, the term "principal terephthalyl" refers to the main or key terephthalyl product being recovered from the solvolysis facility.

As used herein, the term "glycol" refers to a component comprising two or more —OH functional groups per molecule.

As used herein, the term "principal glycol" refers to the main glycol product being recovered from the solvolysis facility.

As used herein, the term "target separation density" refers to a density above which materials subjected to a density separation process are preferentially separated into the higher-density output and below which materials are separated in the lower-density output.

As used herein, the terms "waste plastic" and "plastic waste" refer to used, scrap, and/or discarded plastic materials. The waste plastic fed to the chemical recycling facility may be unprocessed or partially processed.

As used herein, the term "unprocessed waste plastic" means waste plastic that has not be subjected to any automated or mechanized sorting, washing, or comminuting. Examples of unprocessed waste plastic include waste plastic collected from household curbside plastic recycling bins or shared community plastic recycling containers.

As used herein, the phrase "at least a portion" includes at least a portion and up to and including the entire amount or time period.

As used herein, the term "waste plastic particulates" refers to waste plastic having a D90 of less than 1 inch.

As used herein, the term "predominantly" means at least 50 weight percent of something, based on its total weight. For example, a composition comprising "predominantly" component A includes at least 50 weight percent of component A, based on the total weight of the composition.

As used herein, "downstream" means a target unit operation, vessel, or equipment that:

a. is in fluid (liquid or gas) communication, or in piping communication, with an outlet stream from the radiant section of a cracker furnace, optionally through one or more intermediate unit operations, vessels, or equipment, or b. was in fluid (liquid or gas) communication, or in piping communication, with an outlet stream from the radiant section of a cracker furnace, optionally through one or more intermediate unit operations, vessels, or equipment, provided that the target unit operation, vessel, or equipment remains within the battery limits of the cracker facility (which includes the furnace and all associated downstream separation equipment).

CLAIMS NOT LIMITED TO DISCLOSED EMBODIMENTS

The preferred forms of the invention described above are to be used as illustration only and should not be used in a limiting sense to interpret the scope of the present invention. Modifications to the exemplary embodiments, set forth above, could be readily made by those skilled in the art without departing from the spirit of the present invention.

The inventors hereby state their intent to rely on the Doctrine of Equivalents to determine and assess the reasonably fair scope of the present invention as it pertains to any apparatus not materially departing from but outside the literal scope of the invention as set forth in the following claims.

What is claimed is:

1. A method for processing waste polymer materials, said method comprising (a) introducing a feed stream comprising waste automotive carpet material into a solvolysis facility; or (a) introducing a feed comprising waste automotive carpet material and waste plastic into a solvolysis facility; and (b) subjecting said feed to solvolysis to provide a principal terephthalyl, a principal glycol, and at least one coproduct stream;

or (a) introducing a feed stream comprising waste automotive carpet into a solvolysis facility;

(b) subjecting said feed stream to solvolysis to form a principal terephthalyl, a principal glycol, and at least one coproduct stream; and (c) introducing at least a portion of said coproduct stream into at least one of the following chemical processing facilities or zones: (i) a partial oxidation gasification facility; (ii) a pyrolysis facility; (iii) a cracking facility; (iv) an energy recovery facility; and (v) a liquification zone, wherein said waste automotive carpet material comprises at least 50 weight percent polyester, based on the total weight of said waste automotive carpet material, wherein said waste automotive carpet material comprises not more than 25 weight percent of polymeric components other than polyester based on the total weight of said waste automotive carpet material, wherein said polymeric components other than polyester are selected from the group consisting of polyamides, polyolefins, acrylics, cellulose acetate, wool, and cotton or wherein said polymeric components other than polyester comprise at least one of nylon 6, nylon 6,6, polypropylene, polyethylene, and poly (ethylene-co-vinyl acetate), wherein said automotive carpet waste material comprises adhesive material in an amount in the range of from 0.1 to 15 weight percent, based on the total weight of said automotive carpet waste material, wherein said waste automotive carpet material comprises at least 0.01 and not more than 5 weight percent of one or more fillers, based on the total weight of said waste automotive carpet material, wherein said fillers comprise at least one of calcium carbonate, barium sulfate, and titanium dioxide or wherein said waste automotive carpet material comprises carbon black; and wherein said solvolysis facility is a methanolysis facility.

2. The method of claim 1, wherein said waste automotive carpet material comprises fibers of waste automotive carpet material.

3. The method of claim 1, wherein said waste automotive carpet material comprises material from carpet tufts, carpet backing, adhesives, and combinations thereof.

4. The method of claim 1, wherein said waste automotive carpet material comprises not more than 20 weight percent of carpet fibers.

5. The method of claim 1, wherein said waste automotive carpet material comprises densified waste automotive carpet material.

6. The method of claim 1, wherein said waste automotive carpet material comprises particulates having a D90 of at least 0.1 and not more than 10 mm.

7. The method of claim 1, wherein said feed stream comprises said waste automotive carpet material in an amount in the range of from 10 to 30 weight percent, based on the total weight of said feed stream.

8. The method of claim 1, wherein at least 5 and not more than 99 weight percent of said waste automotive carpet material is post-consumer waste material, based on the total weight of said waste automotive carpet material or wherein at least 5 and not more than 99 weight percent of said waste automotive carpet material is pre-consumer waste material, based on the total weight of said waste automotive carpet material, and wherein said feed stream further comprises waste plastic in an amount of at least about 5 and not more than 99 weight percent based on the total weight of said feed stream.

9. The method of claim 8, wherein said waste plastic includes at least 5 and not more than 95 weight percent of polyethylene terephthalate, based on the total weight of said feed stream or wherein said waste plastic includes at least 10 and not more than 80 weight percent of polyolefin, based on the total weight of said feed stream or wherein said waste plastic includes at least 0.001 and not more than 10 weight percent of halogens on a dry basis, based on the total weight of plastics in said feed stream.

10. The method of claim 1, wherein said introducing of said feed stream comprises dissolving at least a portion of said waste automotive carpet material with a solvolysis solvent in a blending zone of said solvolysis facility to form a predominantly liquid feed stream and subjecting at least a portion of said predominantly liquid feed stream to solvolysis.

11. The method of claim 1, further comprising purging at least a portion of said coproduct stream from said solvolysis facility and wherein said purging is carried out continuously.

12. The method of claim 1, further comprising introducing at least a portion of said coproduct stream into at least one of the following chemical processing facilities or zones: (i) a partial oxidation gasification facility; (ii) a pyrolysis facility; (iii) a cracking facility; (iv) an energy recovery facility; and (v) a liquification zone.

13. The method of claim 1, wherein said methanolysis facility is co-located with at least one of (i) a partial oxidation (POX) gasification facility; (ii) a pyrolysis facility; (iii) a cracking facility; (iv) an energy recovery facility; and (v) a liquification zone, wherein said methanolysis facility is operated in a continuous manner, and wherein said methanolysis facility has an average feed rate of at least 500 pounds per hour, averaged over one year.

14. A solvolysis composition comprising:

waste plastic comprising polyethylene terephthalate (PET), polyolefin (PO), and polyvinyl chloride (PVC);

waste automotive carpet material; and a solvolysis solvent in which said waste plastic and said waste automotive carpet material are at least partially dissolved, wherein said waste automotive carpet material comprises at least 50 weight percent polyester, based on the total weight of said waste automotive carpet material, wherein said waste automotive carpet material comprises not more than 25 weight percent of polymeric components other than polyester selected from the group consisting of polyamides, polyolefins, acrylics, cellulose acetate, wool, and cotton, based on the total weight of said waste automotive carpet material, and wherein said automotive carpet waste material comprises adhesive material in an amount in the range of from 0.1 to 15 weight percent and fillers in an amount of 0.01 to 5 weight percent, based on the total weight of said waste automotive carpet material.

15. The composition of claim 14, wherein said waste plastic is present in an amount in the range of from 10 to 95 weight percent, based on the total weight of said composition or wherein said PO is present in an amount in the range of from 10 to 80 weight percent, based on the total weight of said composition or wherein said PVC is present in an amount in the range of from 0.1 to 8 weight percent, based on the total weight of said waste plastic.

16. The composition of claim 14, wherein said solvent comprises methanol.

* * * * *